United States Patent [19]
Cochran et al.

[11] 3,984,816
[45] Oct. 5, 1976

[54] EXPANDABLE FUNCTION ELECTRONIC CALCULATOR

[75] Inventors: Michael J. Cochran, Richardson, Tex.; Jerry L. Vandierendonck, Santa Cruz, Calif.

[73] Assignee: Texas Instruments, Inc., Dallas, Tex.

[22] Filed: Aug. 25, 1975

[21] Appl. No.: 607,525

Related U.S. Application Data

[63] Continuation of Ser. No. 360,984, May 16, 1973, abandoned, which is a continuation-in-part of Ser. No. 255,856, May 22, 1972, abandoned.

[52] U.S. Cl. .......................................... 340/172.5
[51] Int. Cl.² ........................................ G06F 3/02
[58] Field of Search ................. 340/172.5; 445/1

[56] References Cited
UNITED STATES PATENTS

| | | | |
|---|---|---|---|
| 3,447,037 | 5/1969 | Nissim | 340/172.5 X |
| 3,453,601 | 7/1969 | Bogert et al. | 340/172.5 |
| 3,553,445 | 1/1971 | Hernandez | 340/172.5 X |
| 3,579,201 | 5/1971 | Langley | 340/172.5 |
| 3,597,600 | 8/1971 | Herendeen | 235/156 |
| 3,641,329 | 2/1972 | DeSandre et al. | 340/172.5 X |
| 3,651,463 | 3/1972 | Rawson et al. | 340/365 S X |
| 3,676,656 | 7/1972 | Schmidt | 235/156 |
| 3,702,988 | 11/1972 | Haney et al. | 340/172.5 |
| 3,760,171 | 9/1973 | Wang et al. | 340/172.5 X |
| 3,781,820 | 12/1973 | Cochran et al. | 340/172.5 |
| 3,781,852 | 12/1973 | White et al. | 340/172.5 X |

*Primary Examiner*—Harvey E. Springborn

[57] ABSTRACT

An electronic portable calculator implemented in MOS/LSI technology and including a scanned keyboard input and display output. The calculator system utilizes a plurality of output terinals on the primary MOS/LSI chip for selectively addressing in timed coded sequence an array of peripheral MOS/LSI chips providing for expanded register and memory capacity and for output printing. Data registers are provided in a sequentially addressed random access memory array, which is addressed by a commutator also used to generate encoded timing signals for other parts of the system and control logic. The keyboard input includes an interface register into which is entered key sense line information along with encoded timing information derived from the encoded timing signals. The contents of the interface register may be entered into the data registers or used to select an address in a program storage memory via a program counter. Bits may be read out in parallel from cells in the data registers and processed through an arithmetic logic unit and then re-entered in the same cells within a bit time or state time, so the data registers do not recirculate in the usual sense.

13 Claims, 76 Drawing Figures

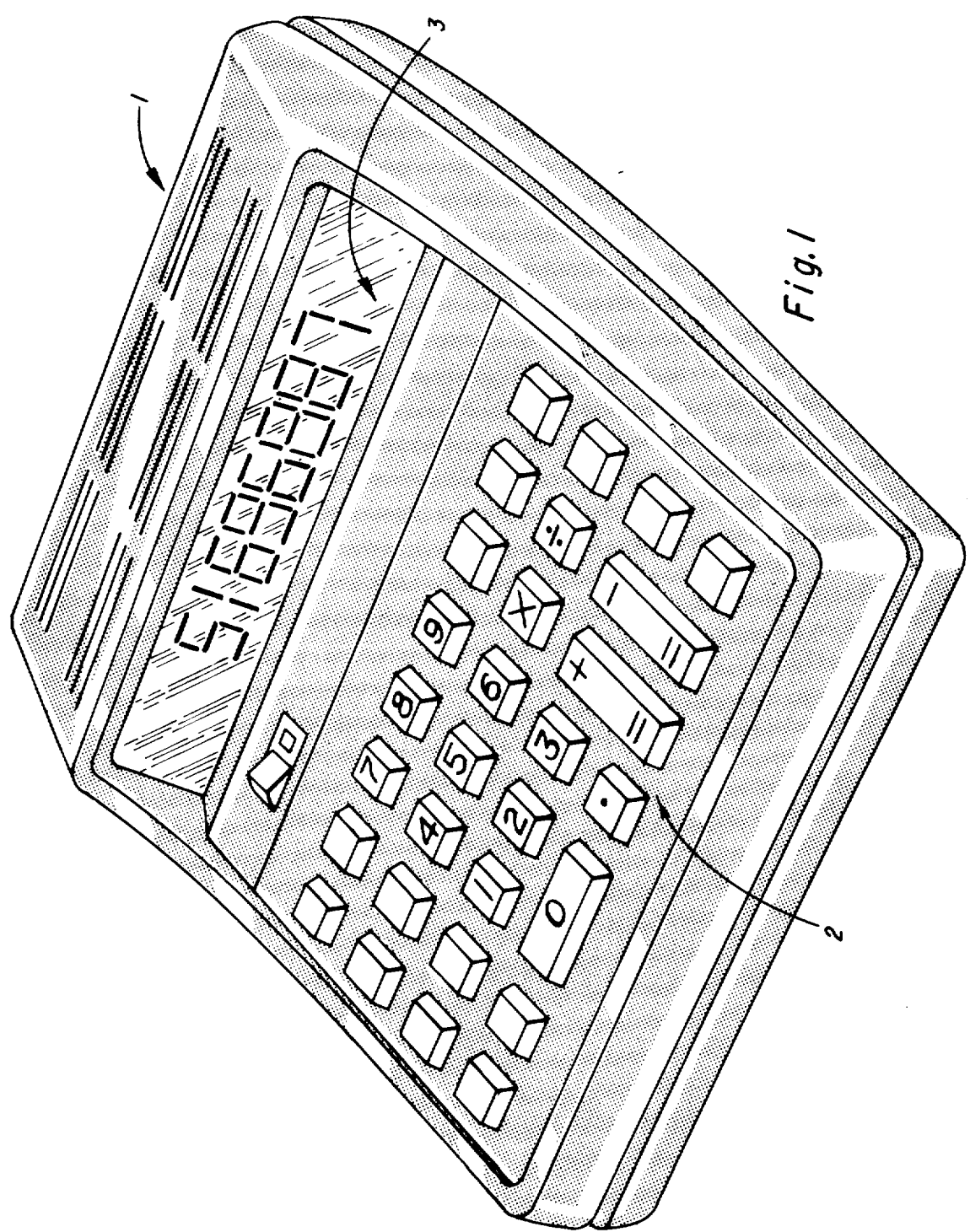

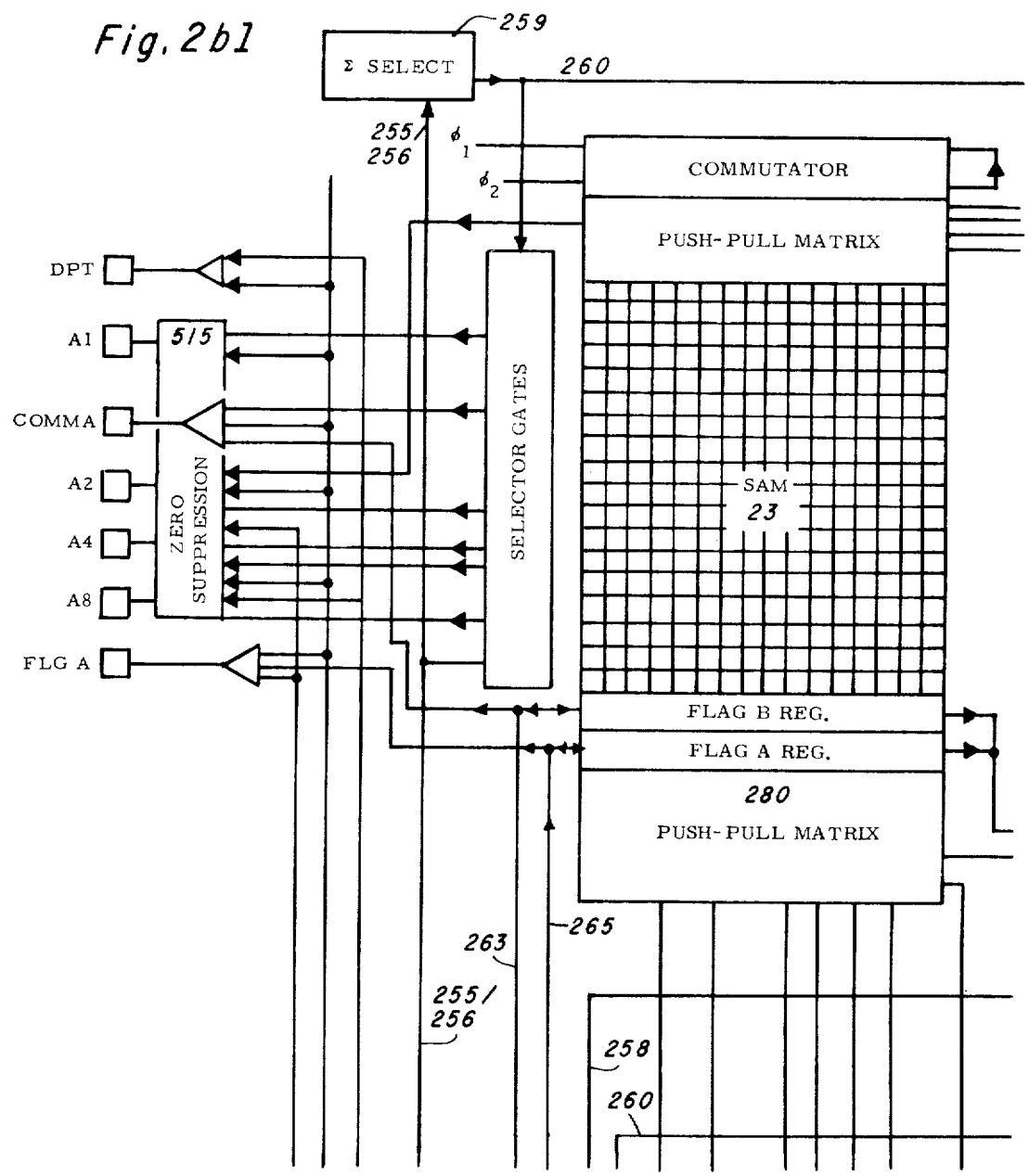
Fig. 2b1

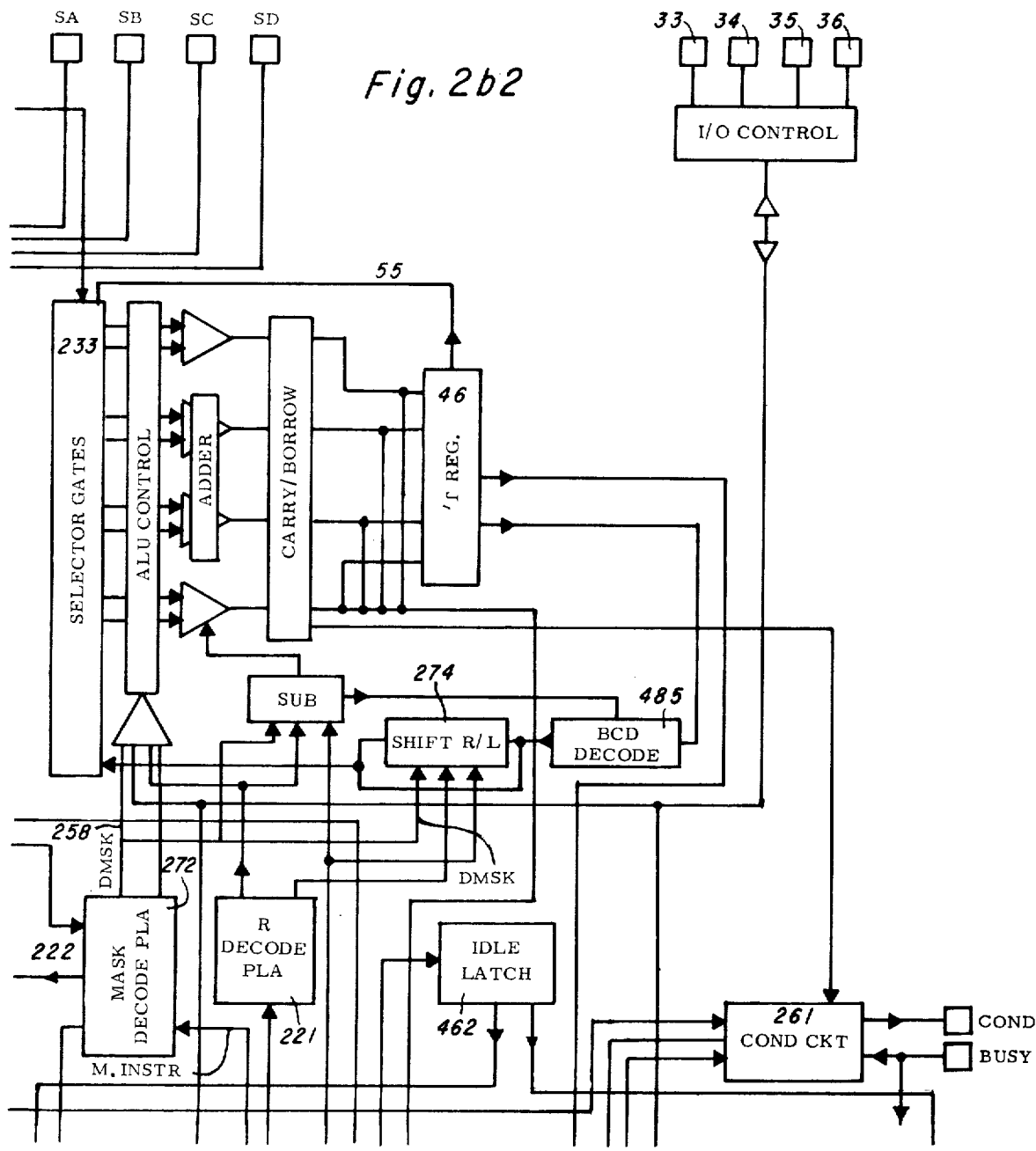

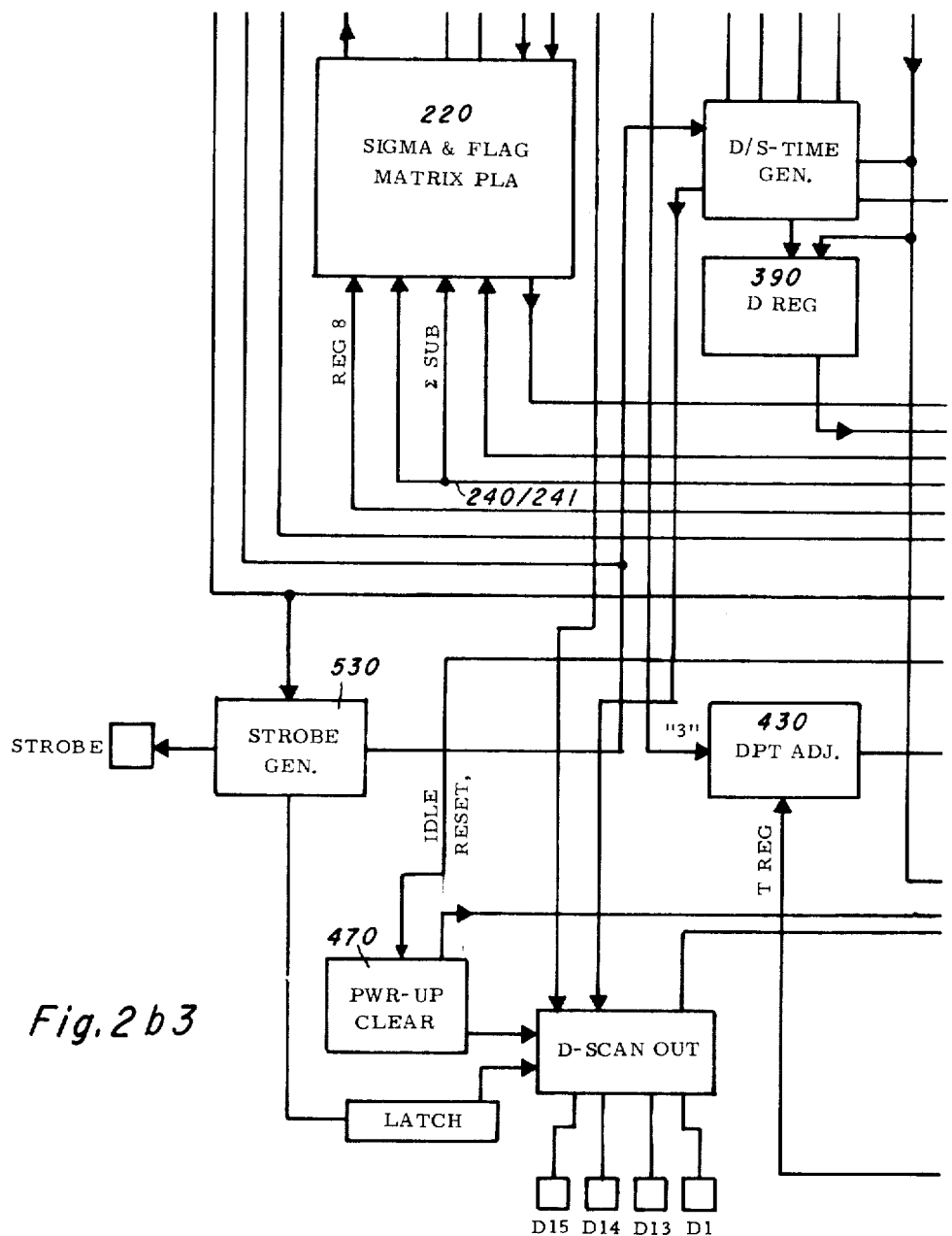
Fig. 2b3

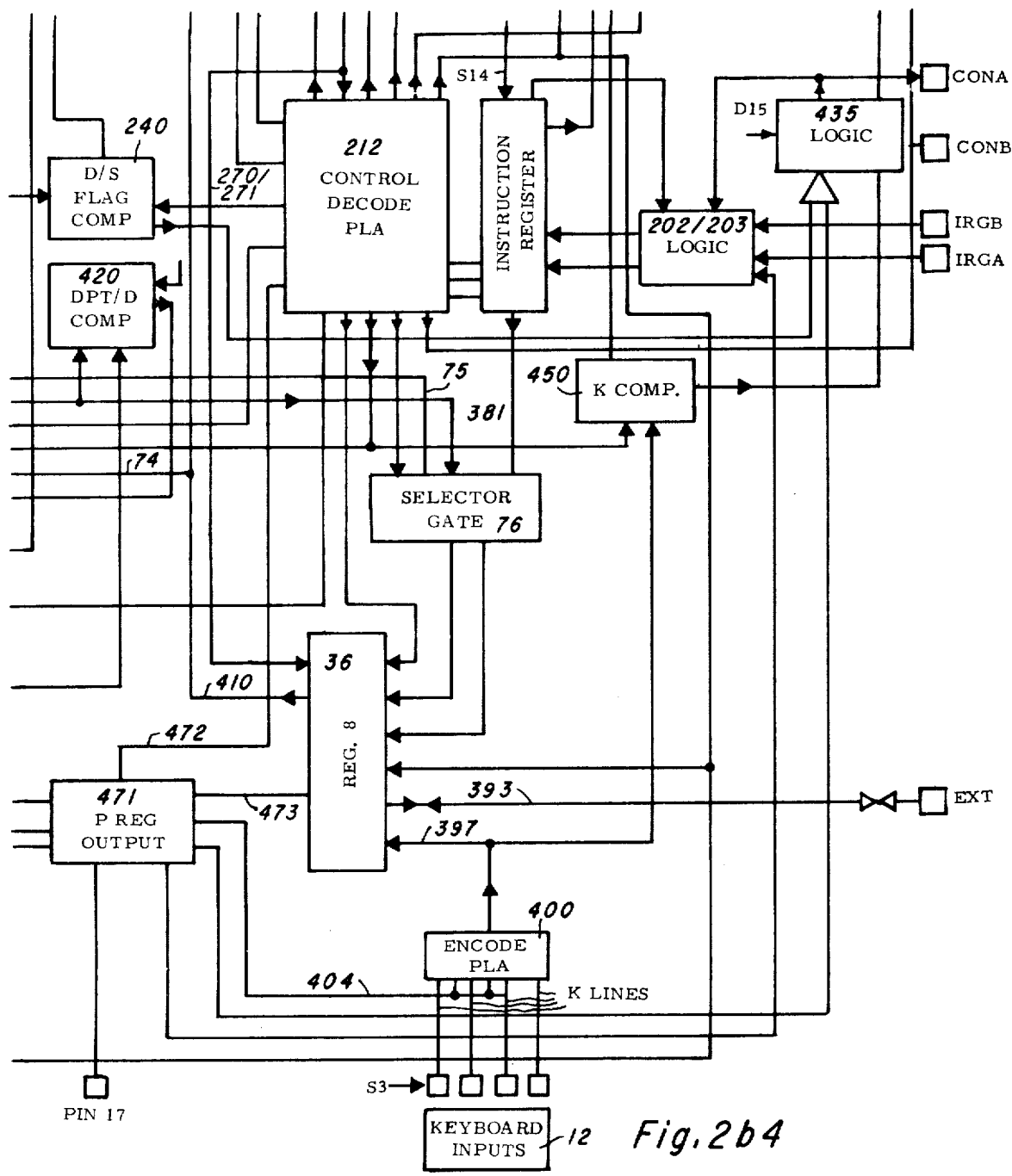
Fig. 2b4

OPERATIONS

| 12 | 11 | 10 | 9 | 8 | 7 | 6 | 5 | 4 | 3 | 2 | 1 | 0 | ← $l_x$ |
|----|----|----|---|---|---|---|---|---|---|---|---|---|---|
| 1 | $M_d$ MSB | $M_c$ | $M_b$ | $M_a$ LSB | SUB | $R_d$ MSB | $R_c$ | $R_b$ | $R_a$ LSB | $\Sigma_c$ MSB | $\Sigma_b$ | $\Sigma_a$ LSB |  |

| | M | | | | | R | | | | $\Sigma$ | | |

BRANCHES

| 12 | 11 | 10 | 9 | 8 | 7 | 6 | 5 | 4 | 3 | 2 | 1 | 0 | ← $l_x$ |
|----|------|-----|---|---|---|---|---|---|---|---|---|-----|---|
| 0 | COND | MSB |   |   |   |   |   |   |   |   |   | LSB |   |

ADDRESS

*Fig. 4a*

| | | | | $\Sigma_c$ | $\Sigma_b$ | $\Sigma_a$ |
|---|---|---|---|---|---|---|
| | | | $R_d$ | $R_c$ | $R_b$ | $R_a$ |
| | | | $M_d$ | $M_c$ | $M_b$ | $M_a$ |
| $\Sigma 0$, | R0, | M0 | 0 | 0 | 0 | 0 |
| $\Sigma 1$, | R1, | M1 | 0 | 0 | 0 | 1 |
| $\Sigma 2$, | R2, | M2 | 0 | 0 | 1 | 0 |
| $\Sigma 3$, | R3, | M3 | 0 | 0 | 1 | 1 |
| $\Sigma 4$, | R4, | M4 | 0 | 1 | 0 | 0 |
| $\Sigma 5$, | R5, | M5 | 0 | 1 | 0 | 1 |
| $\Sigma 6$, | R6, | M6 | 0 | 1 | 1 | 0 |
| $\Sigma 7$, | R7, | M7 | 0 | 1 | 1 | 1 |
|  | R8, | M8 | 1 | 0 | 0 | 0 |
|  | R9, | M9 | 1 | 0 | 0 | 1 |
|  | R10, | M10 | 1 | 0 | 1 | 0 |
|  | R11, | M11 | 1 | 0 | 1 | 1 |
|  | R12, | M12 | 1 | 1 | 0 | 0 |
|  | R13, | M13 | 1 | 1 | 0 | 1 |
|  | R14, | M14 | 1 | 1 | 1 | 0 |
|  | R15, | M15 | 1 | 1 | 1 | 1 |

*Fig. 4b*

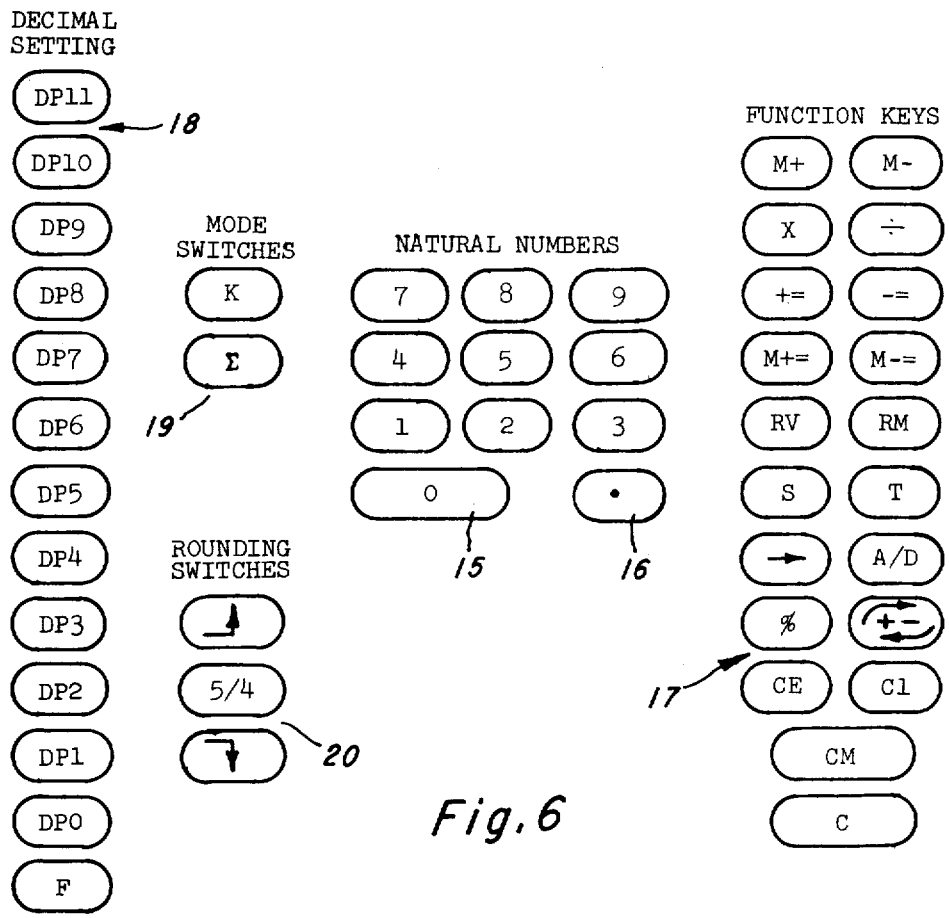
Fig. 6
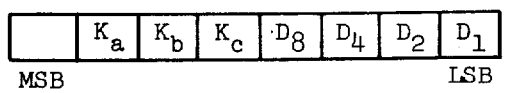
Fig. 8a
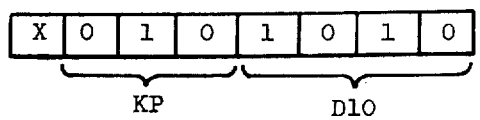
Fig. 8c
| K - line | Ka | Kb | Kc |
|---|---|---|---|
| KN | 0 | 0 | 0 |
| KO | 0 | 0 | 1 |
| KP | 0 | 1 | 0 |
| KQ | 0 | 1 | 1 |
| KR | 1 | 0 | 0 |
| KS | 1 | 0 | 1 |
| KT | 1 | 1 | 0 |
Fig. 8b

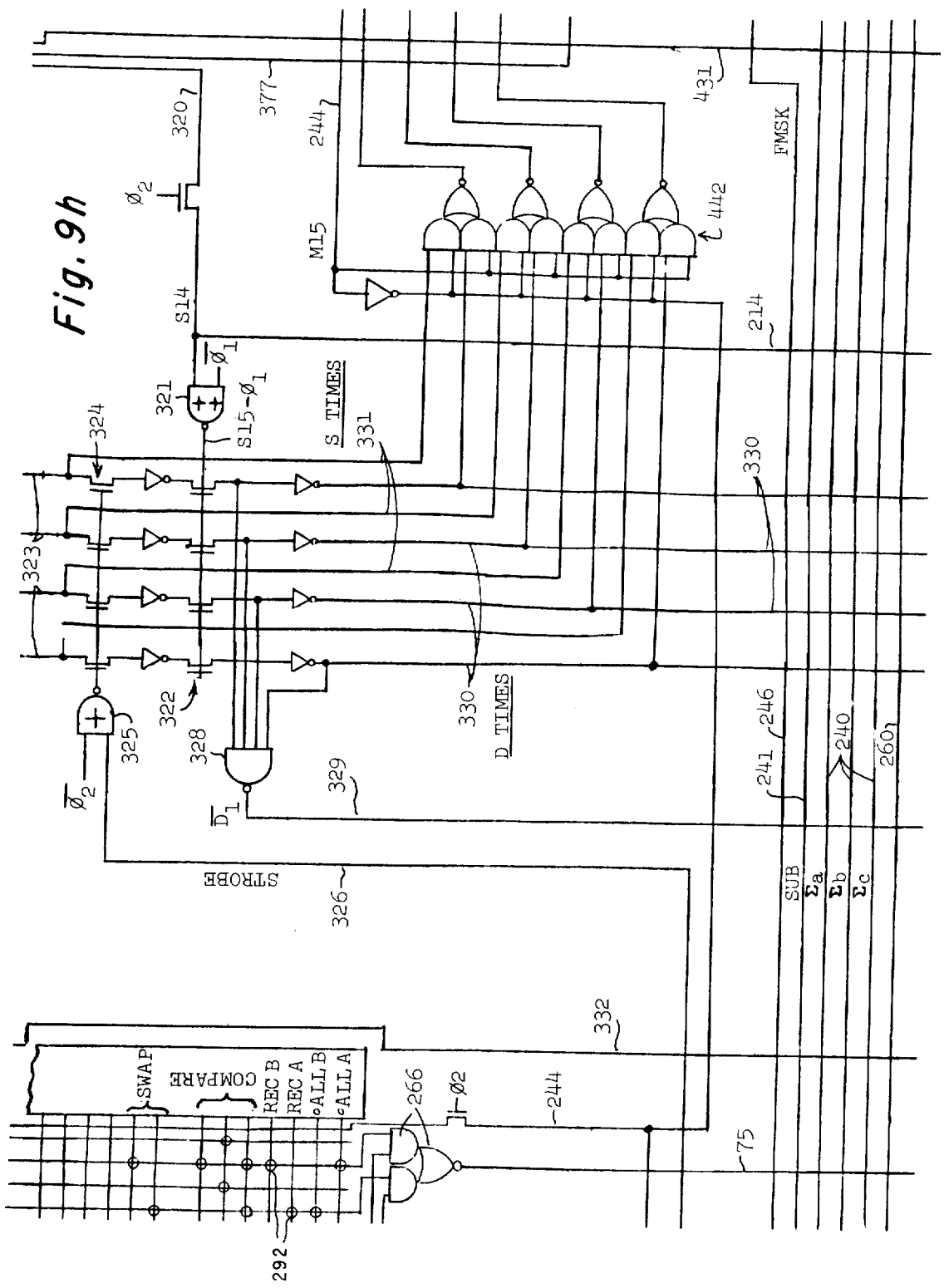

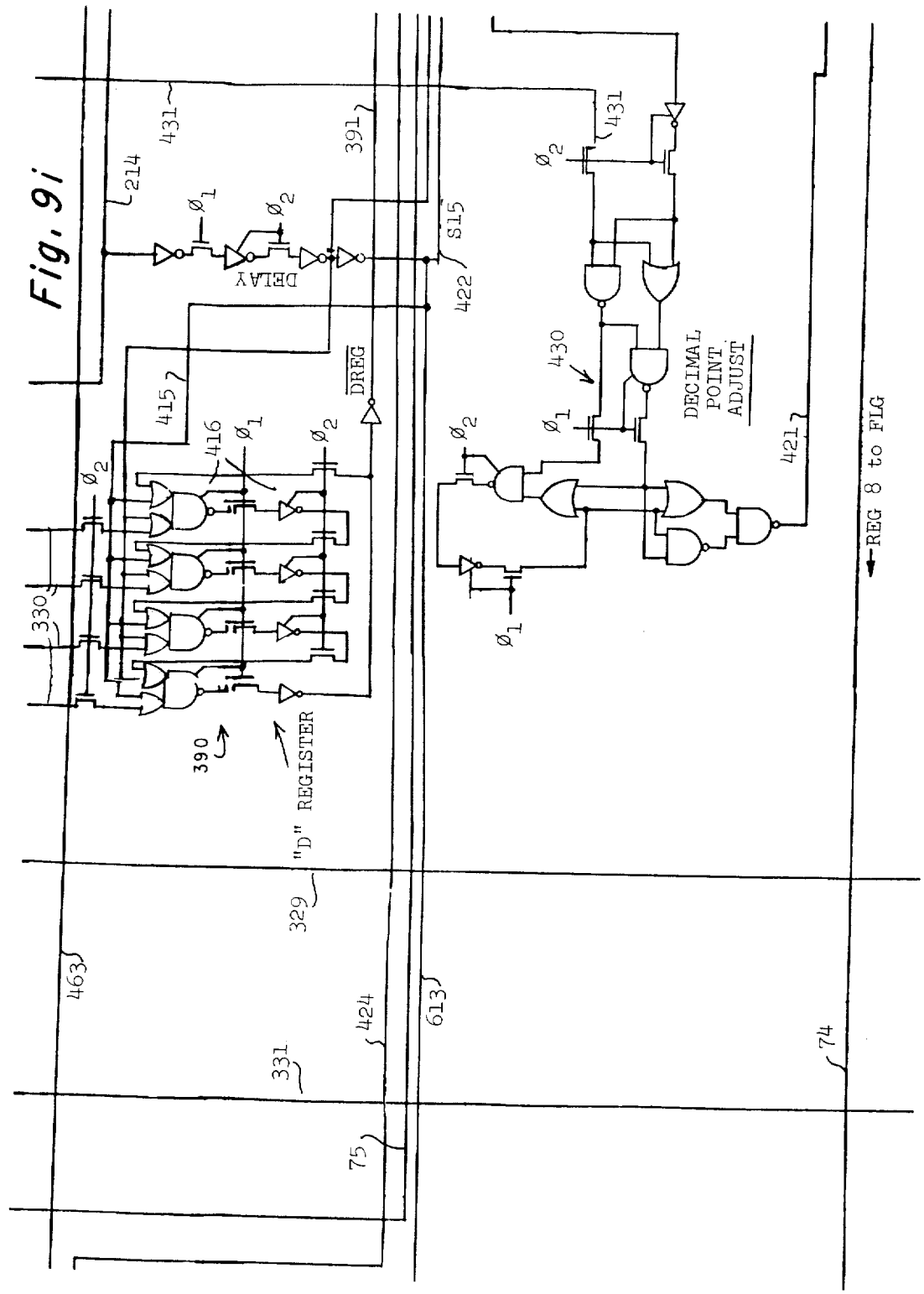

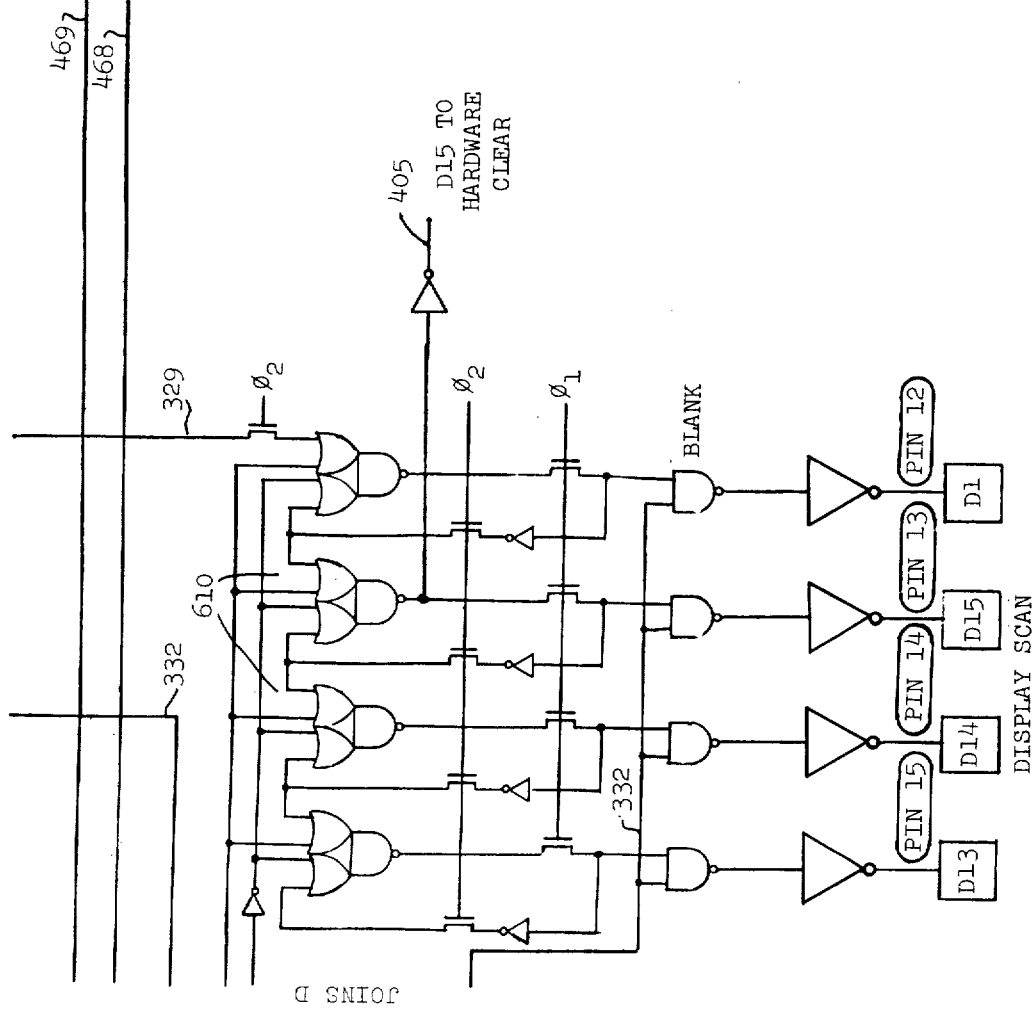

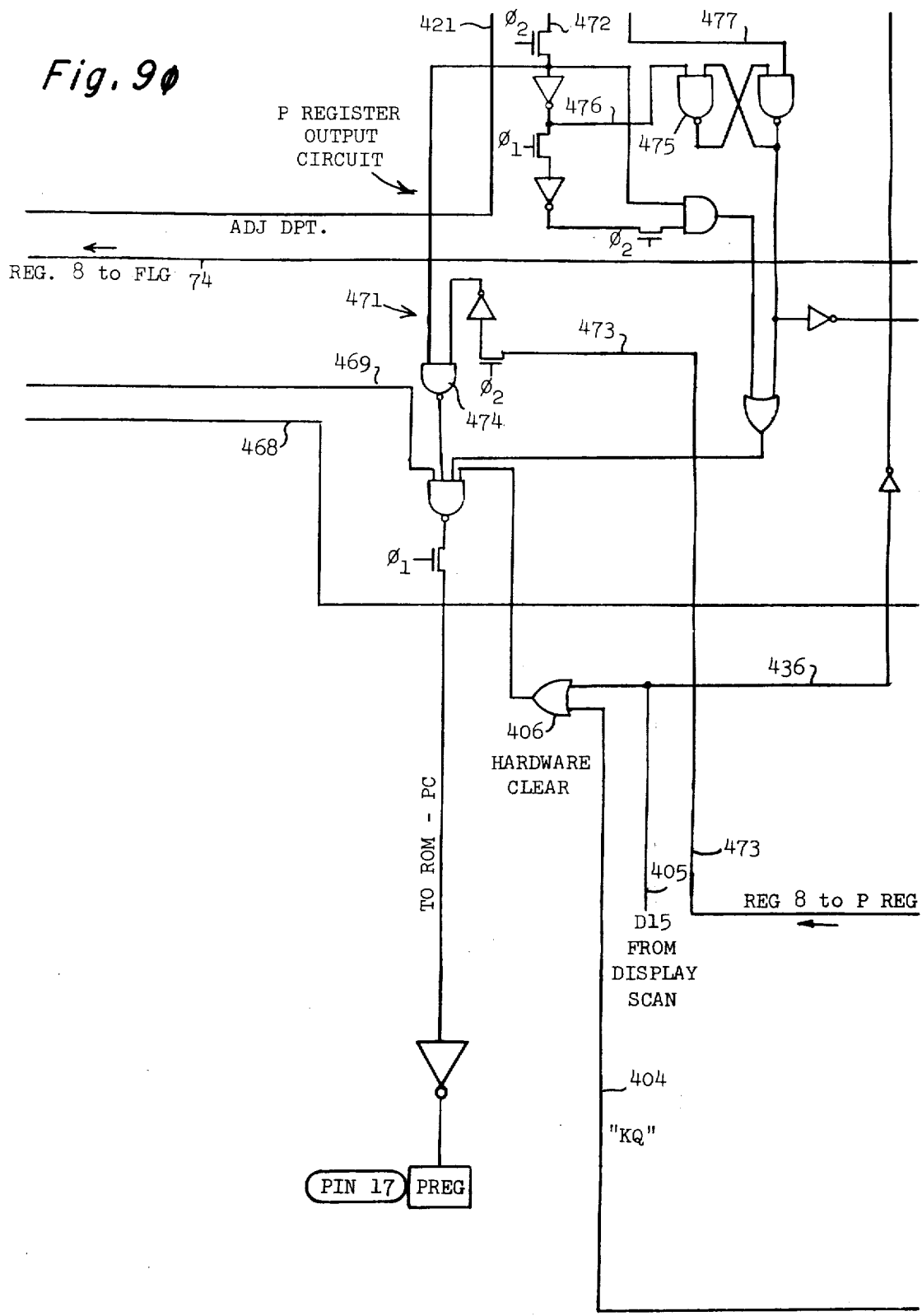
Fig. 9ø

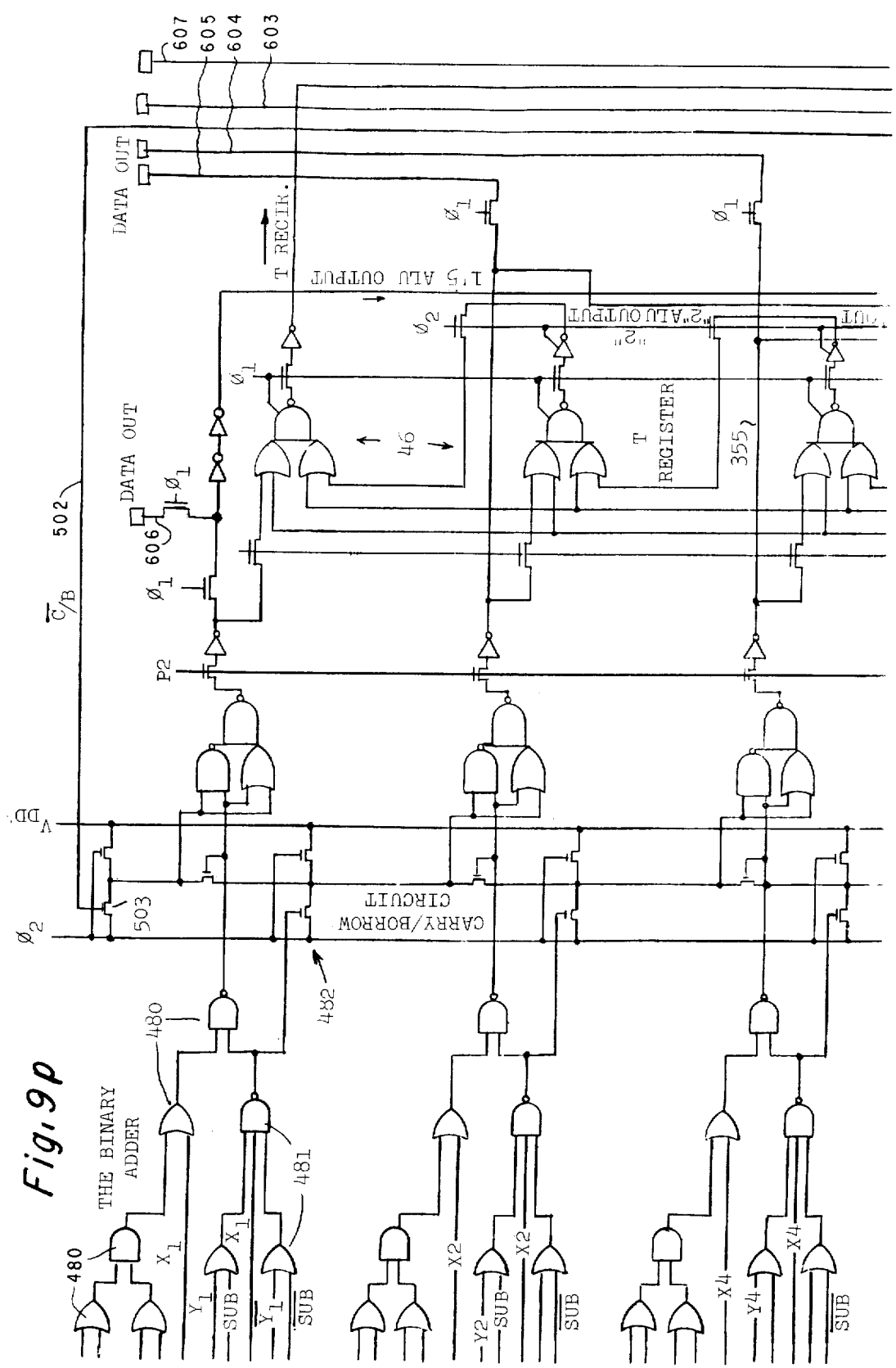

STATE TIME OUTPUT

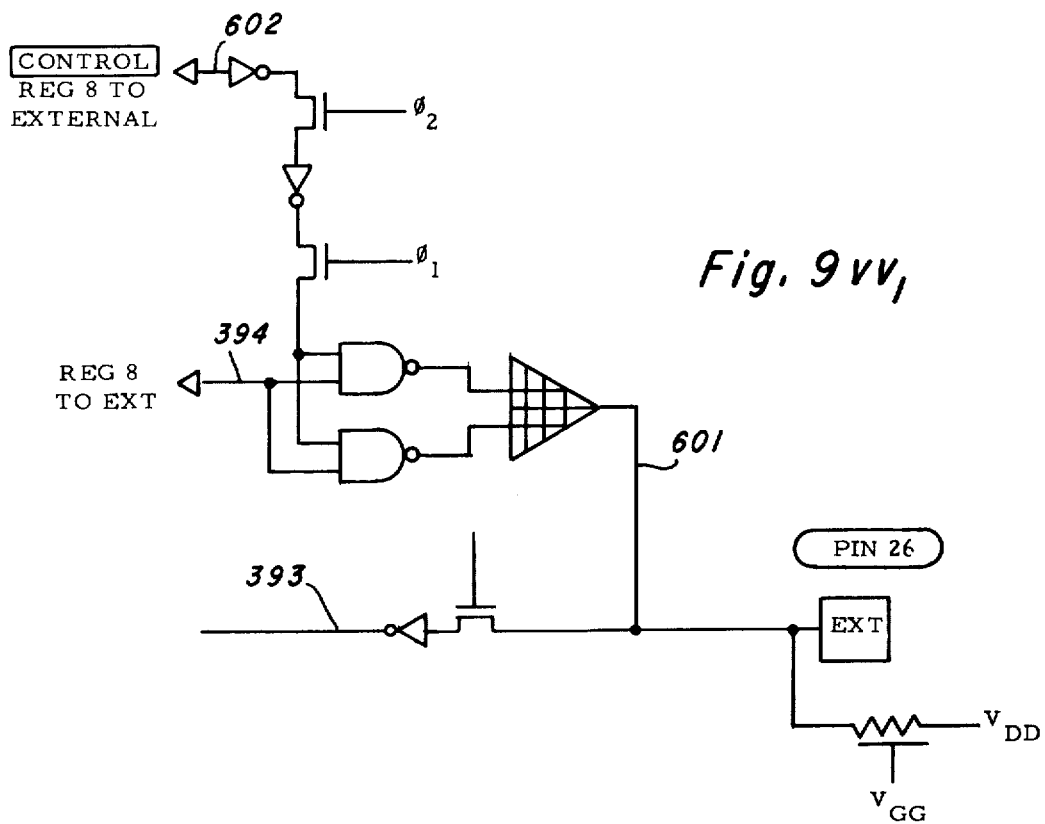
*Fig. 9vv₁*
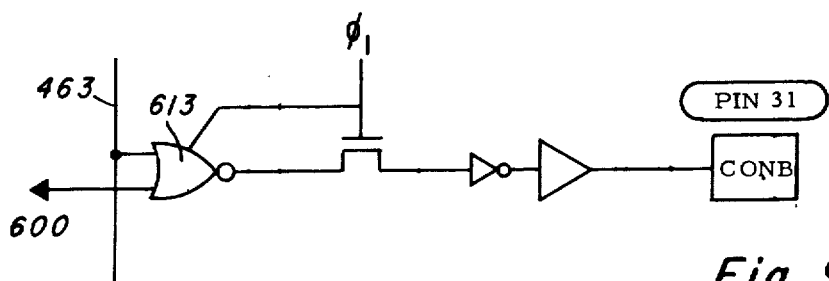
*Fig. 9vv₂*

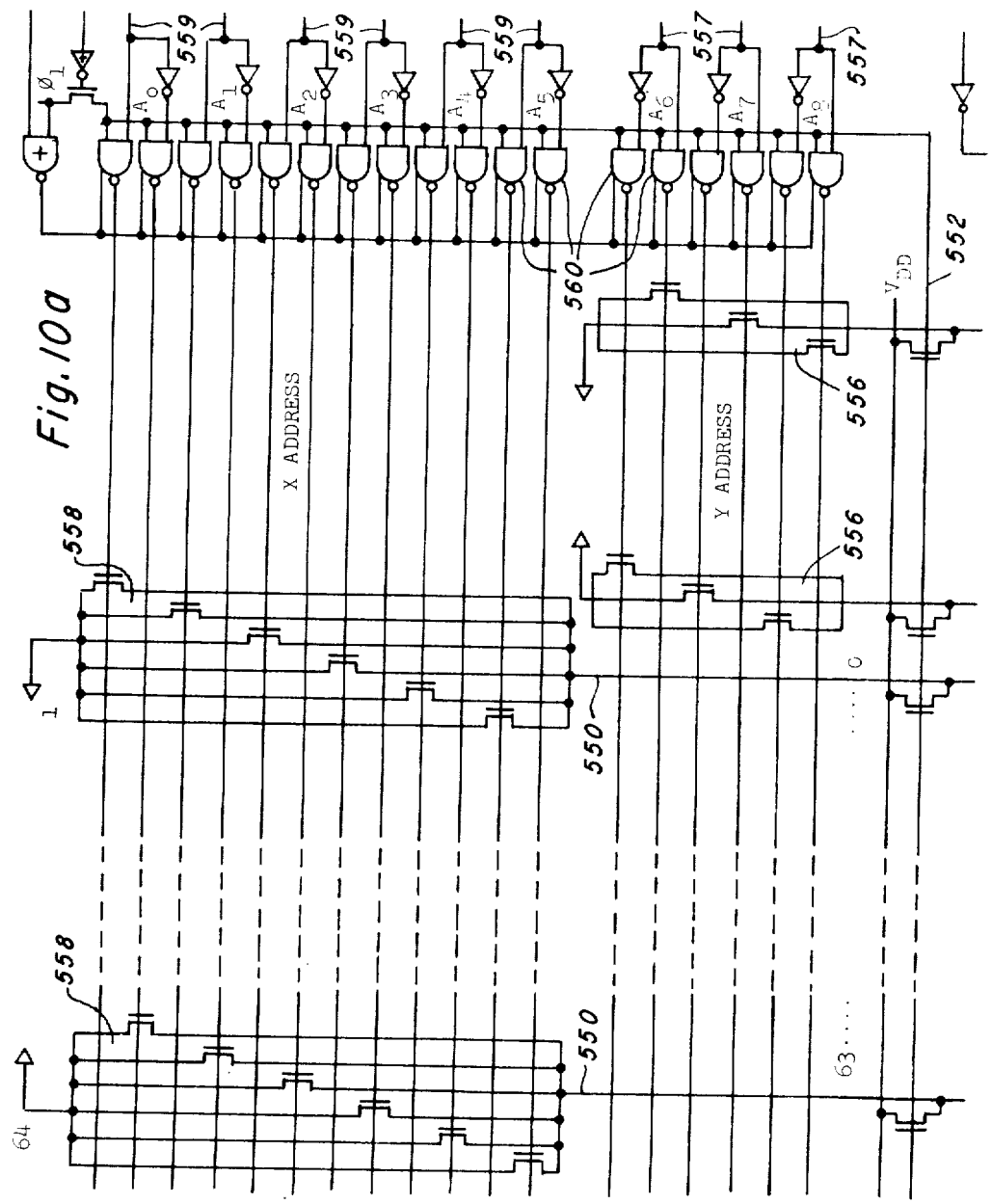

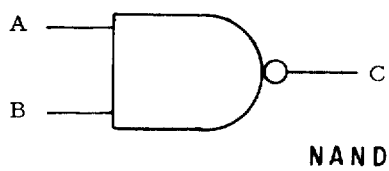
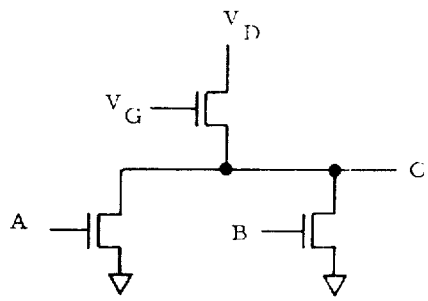
Fig. 11a
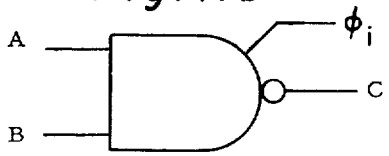
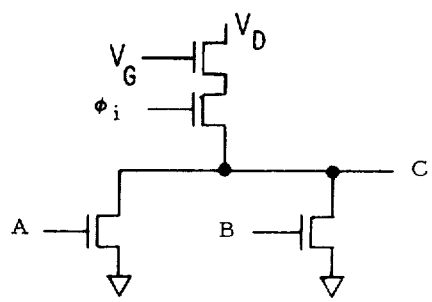
Fig. 11b
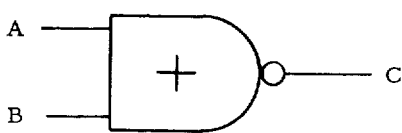
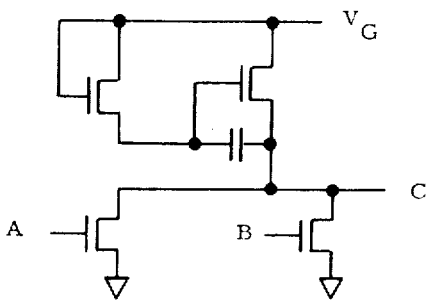
Fig. 11c
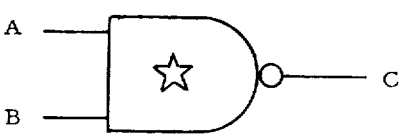
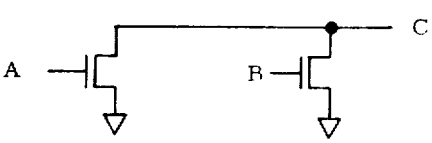
Fig. 11d
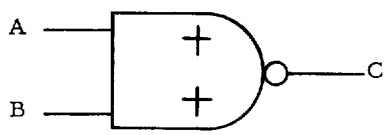
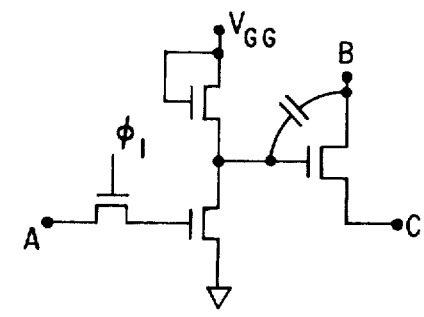
Fig. 11e

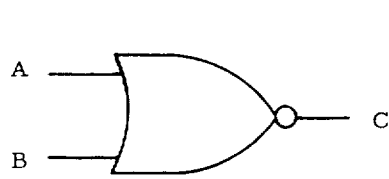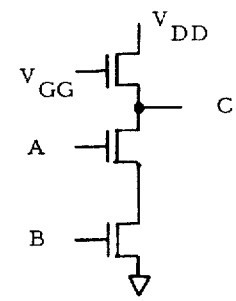
Fig. 11f
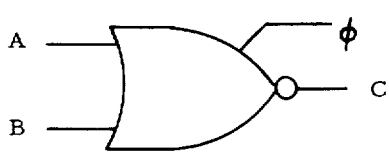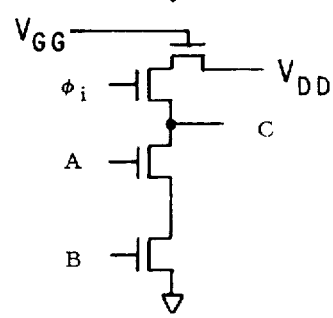
Fig. 11g
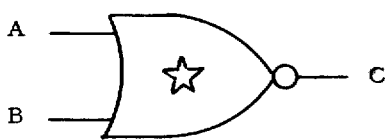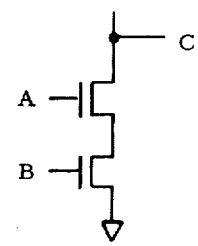
Fig. 11h
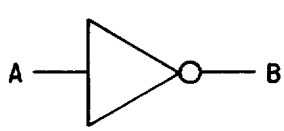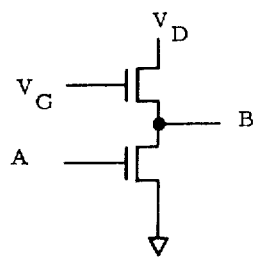
Fig. 11i
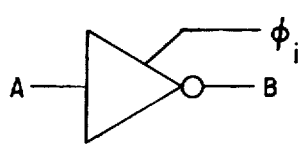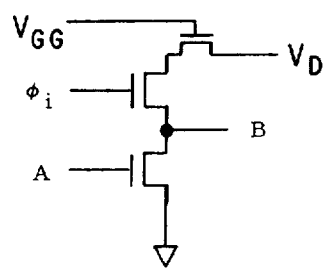
Fig. 11j

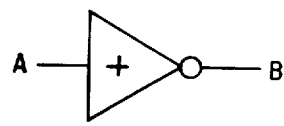
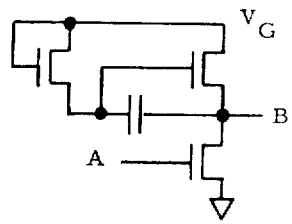
Fig.11k
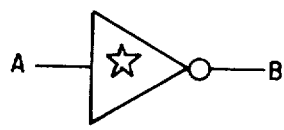
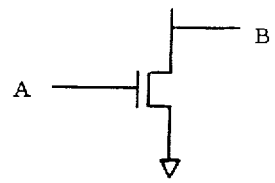
Fig.11l
Fig.11m
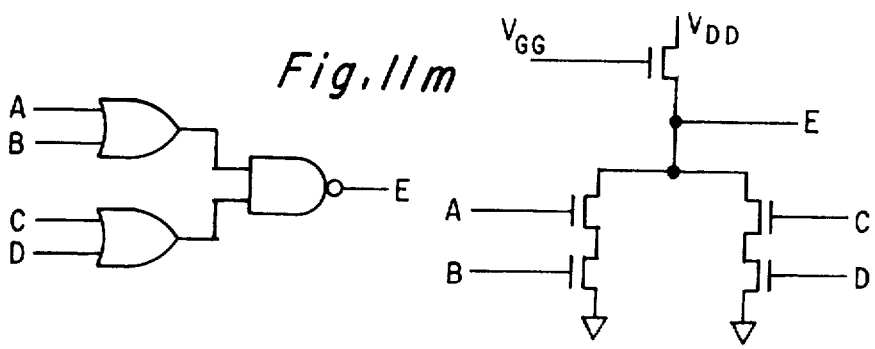
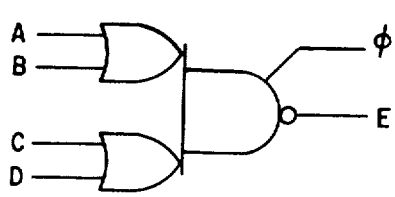
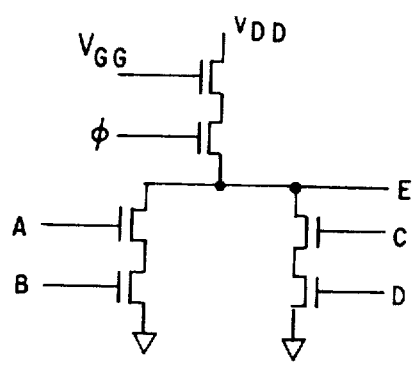
Fig.11n

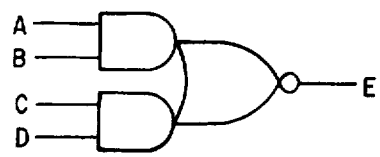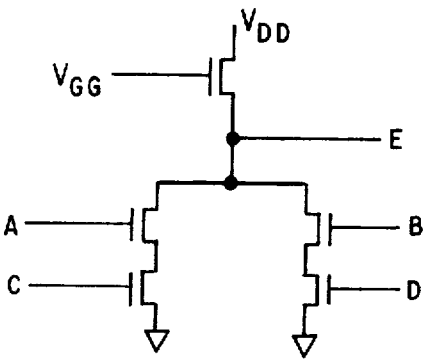
Fig. 11ø
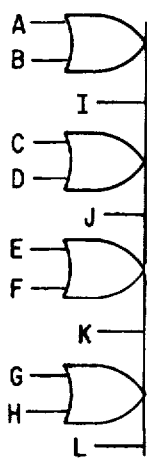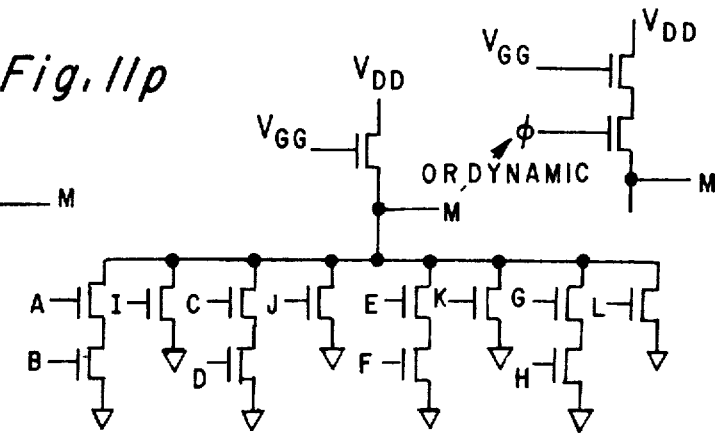
Fig. 11p
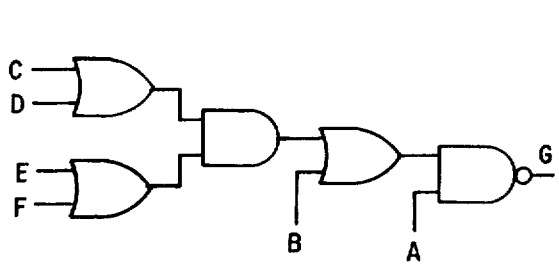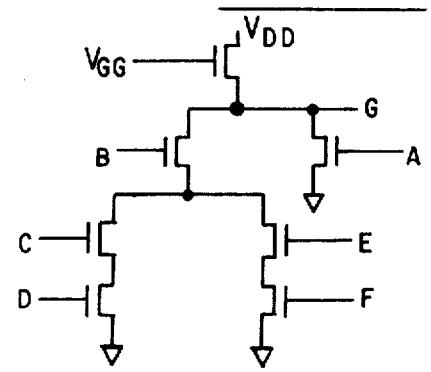
Fig. 11q
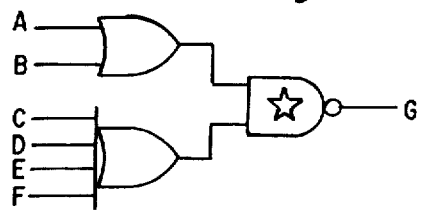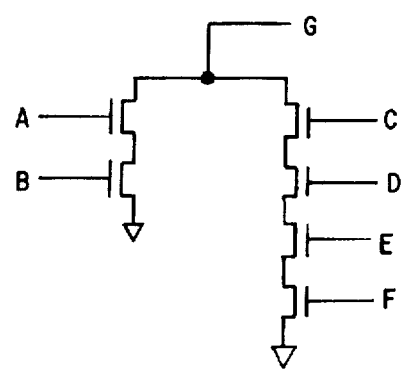
Fig. 11r

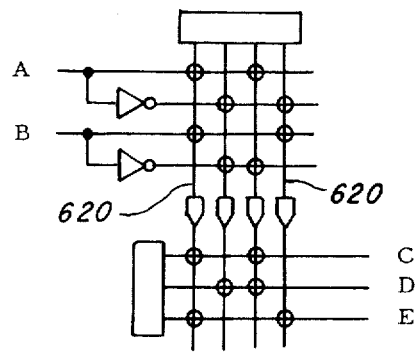
Fig. 12
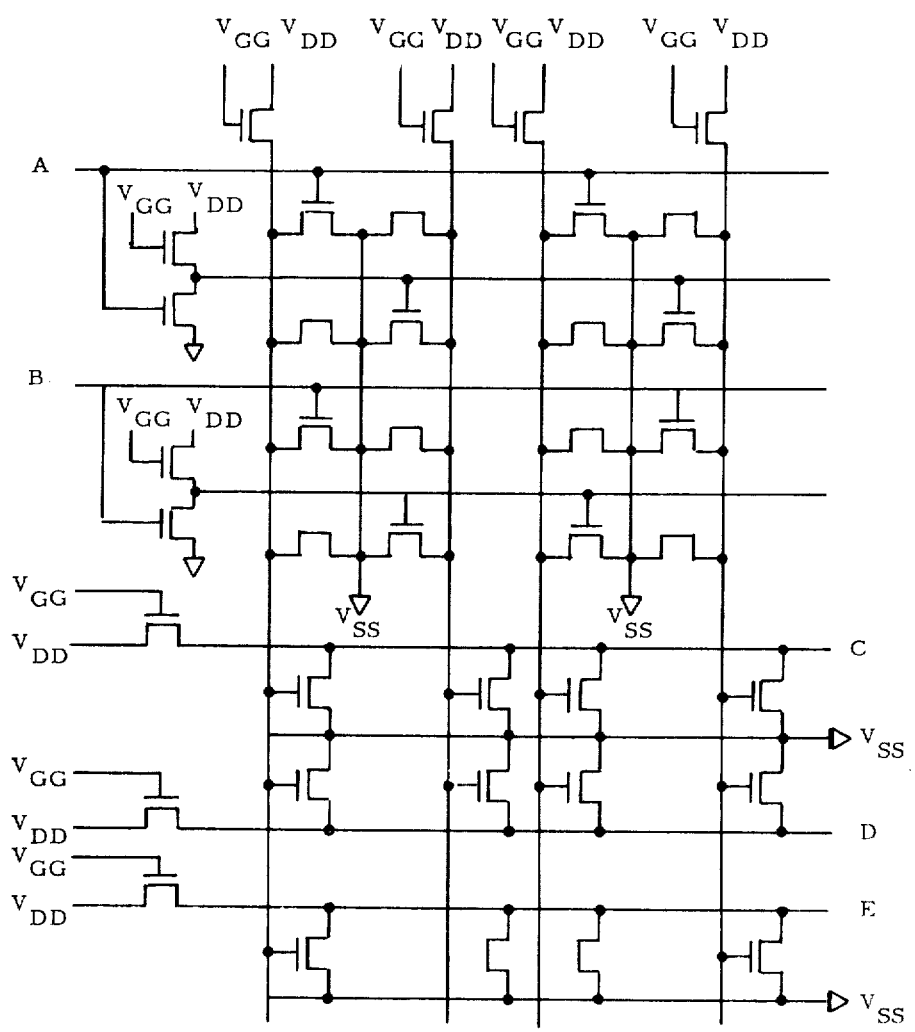

ROM CHIP

EXPANDABLE FUNCTION ELECTRONIC CALCULATOR

This application is a continuation of application, Ser. No. 360,984, filed May 16, 1973 and now abandoned and which is a continuation-in-part of copending patent application "Electronic Calculator", Ser. No. 255,856, filed May 22, 1972, by M. J. Cochran et al, now abandoned.

BACKGROUND OF THE INVENTION

Electronic desk top calculators have been changed is design due to the availability of MOS/LSI chips which allow the entire system to be embodied in only one or a small number of semiconductor devices. The term MOS/LSI refers to Metal Oxide Semiconductor Large Scale Integrated Circuits; "MOS" is used interchangeably with MIS or Metal Insulator Semiconductor, both terms referring generally to insulated gae field effect transistors. This technology permits large savings in manufacturing, labor and material costs and allows calculators to have operating functions not possible at reasonable cost in machines built from discrete devices or from large numbers of integrated circuits. A calculator system adapted to be implemented using only one MOS/LSI chip is set forth in copending application "Variable Function Calculator", Ser. No. 163,565, now abandoned and replaced by continuation U.S. patent application Ser. No. 420,999, entitled "Variable Function Programmed Calculator", assigned to the assignee of this invention. A feature of the calculator disclosed in application Ser. No. 163,565 is the use of a random access memory array which is sequentially addressed to operate as a plurality of shift registers; this unit provides the main data registers in a space on the chip much less than needed for shift registers of conventional design. Another feature of said application was the keyboard scanning technique.

It is a principal feature of this present invention to provide an improved electronic calculator system adapted to be implemented in MOS/LSI technology, in a minimum of semiconductor chips or wafers. Another feature is to provide an expandable system which may include optional program memory arrays, external data registers, and an output printer chip utilizing novel addressing techniques. Other features include use of the sequentially addressed memory set forth in copending application Ser. No. 163,565 with a timing arrangement in such a manner that auxilliary timing generators are not needed, and the provision of a keyboard interface register which provides keyboard and timing information encoded for enteing into the data registers or for selecting an address for the program memory. A further feature is an arithmetic logic unit which operats fast enough so that bits in the data registers may be shifted in parallel out of cells in the sequentially addressed memory array through the ALU and back into the same cells.

BRIEF DESCRIPTION OF THE DRAWINGS

The novel features believed characteristic of the invention are set forth in the appended claims. The invention itself, however, as well as further objects and advantages thereof, will be best understood by reference to the following detailed description of an illustrative embodiment, when read in conjunction with the accompanying drawings, wherein:

FIG. 1 is a pictorial view of an electronic desk top calculator which may employ the invention;

FIGS. 2b1–2b4 and 2cc are complex block diagrams of a preferred embodiment of this invention.

FIGS. 4a and 4b are representations and tables showing the makeup of the instruction word used in the system of the invention;

FIG. 6 is a representation of the keyboard layout used for the calculator of the invention;

FIGS. 8a–8c are a table of the keyboard code;

FIGS. 11a–11r are detail views of certain circuits used in the system of FIGS. 9 and 10;

FIG. 12 is a detail view of a programmable logic array as used in the system of FIGS. 9 and 10;

DETAILED DESCRIPTION OF SPECIFIC EMBODIMENT

Referring to FIG. 1, an electronic desk top calculator 1 of the type which may employ features of this invention is shown in pictorial form. The calculator 1 comprises a keyboard 2 and a display 3. The display, in one embodiment, consists of thirteen or fourteen digits or characters, each provided by a NIXIE tube, a liquid crystal display unit, an array of light emitting diodes or other display means. Ordinarily, the display would be of the so-called seven segment or eight segment variety, with provision for indicating a decimal point for each digit. The calculator system of this invention is adapted so as to provide a printed readout, if desired, using either thermal printing techniques or drum printing techniques. The keyboard 2 includes a set of number keys of one through nine plus a zero key, a decimal point key, a plurality of function keys, and a set of decimal point set keys or switches. A fixed decimal point position for the display could also be set by a thumb wheel, or a lever switch. The function keys include functions such as plus equal $\pm$, minus equal $\equiv$, multiply X, divide $\div$, clear all CA, along with a number of unique functions as will be described. Data or numbers are entered by the number keys and instructions are entered by the function keys which serve to call subroutines from an internal stored program to execute the desired operations. Both intermediate and final results of calculations are indicated on the display 3.

Figure 2A:
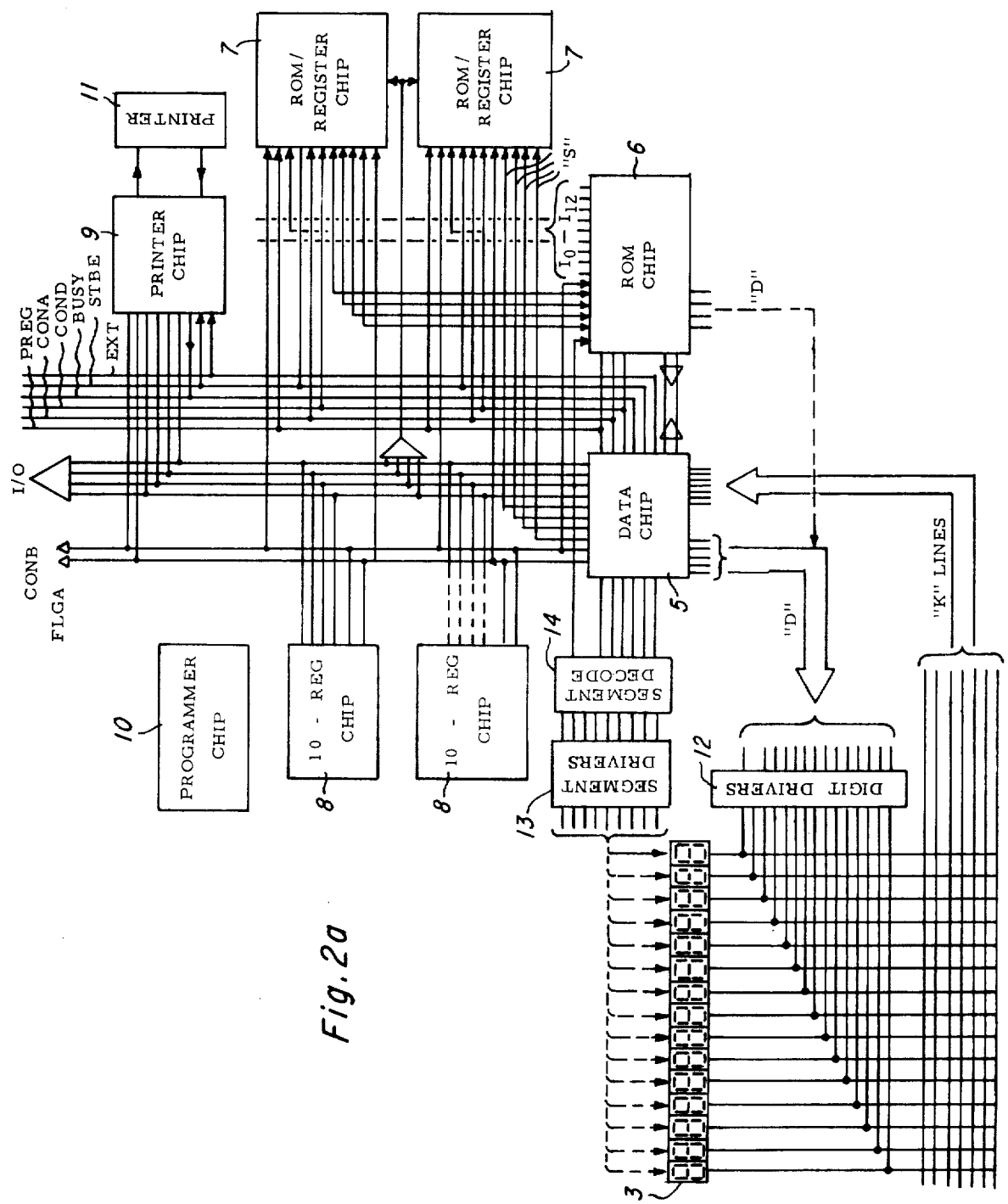
FIG. 2a is a simplified block diagram of the expandable calculator system of the invention.

Referring now to FIG. 2a, there is shown a functional block diagram of the expanded calculator system of is invention showing the data chip and ROM chip, herein described in detail, interconnected with the peripheral chips providing expanded calculator capacity. The data chip 5 generates a plurality of control signals to the ROM chip 6, to an external set of ROM register chips 7, providing for both increased data word storage and increased instructions word storage capacity, to the external 10-register chip set 8, providing external data word storage capacity, to the external programmer chip 10, providing a means for programming specific subroutines into the calculator externally, and to external printer chips 9 for controlling output printers 11. The output printers 11 may be of conventional design with adaptions to the printer chip 9, but preferably are of the thermal printer type or the drum printer type.

The control signals generated by the data chip 5 include the control signals:

Condition A (CONA) or inhibit increment for indicating that an interrupt is desired in the normal sequencing of the ROM to allow additional executions by the system before the next instruction word is to be executed;

Condition B (CONB) is indicative of the idle condition of the data chip, i.e., whether the data chip is actually in the calculating mode (non-idle) or in the display mode (idle);

Condition (COND) indicates that a condition flag has been set indicating a comparison of the particular flags or desired digits of an instruction word;

Flag A (FLGA) is the serial output of the flag register in the SAM at an output rate determined by COND;

State Times (S times) indicate the state timing (timing controlling data manipulation) of the data chip, sixteen of which state times generate a D time;

Display Times (D times) indicate which set state times of the program the calculator is currently executing, wherein sixteen S times constitute an instruction cycle, and the D times are generated in cycles of fifteen so that D times precess from the particular D time of the preceding cycle;

Keyboard Inputs (K lines) are signals from the keyboard for entering externally commands to the data chip;

P Register (PREG) indicates that the data chip is addressing ROM storage and indicates which ROM storage area is being addressed;

Instruction Words ($I_0$–$I_{12}$) indicate the particular instruction word stored in a particular ROM instruction storage unit;

External (EXT) indicates that the external terminal on the data chip is either sending or receiving data;

Strobe (STBE) is a programmable signal determining the period of D times, herein preferably chosen as fifteen;

Busy (BUSY) represents the condition of the printer as determined by the printer chip 9 that the printer is/is not busy and cannot/can receive another command for printing.

Referring again to FIG. 2a, the data chip 5 provides output information from Register A and Flag Register A to the segment decoder 14. Such information is communicated as: position of the comma, position of the decimal point, actual data to be displayed from the "A" register, and data to be displayed from the Flag A Register. The segment decoder 14 is a conventional decode circuit for decoding the binary coded decimal output information for actuating the segment drives 13. The segment drivers 13 comprise conventional driver circuits for actuating the above-mentioned displays 2, here shown to have a seven segment display per digit.

The data chip also provides D times to the digit drivers 12 for selectively scanning the digits of th display 3. Scanning of the display matrix is explained in detail in the above-mentioned application Ser. NO. 163,565. The preferred embodiment herein disclosed provides a first set of D times from the data chip and a second set of D times from the ROM chip, which combination of sets comprise a fifteen D time cycle.

The data chip is responsive to the K information which is generated from the D time strobing of the keyboard input. This scanning of the keyboard is set forth subsequently in detail.

The ROM chip 6 is responsive to COND, CONA, PREG, STBE, IRGA, IRGB, and the S times signals from the data chip 5 and generates in response thereto the instruction word $I_0$–$I_{12}$, the D times, and IRGA and IRGB to the data chip.

The ROM register chip 7 depicted is part of the expandable set of peripheral chips allowing expanded calculator capacity. The ROM register chip is responsive to $I_0$–$I_{12}$ instruction words from the ROM, I/O information from the data chip, and S times, Flag A, STBE, CONA, CONB, PREG, and COND command signals from the data chip.

The 10-register chip 8 is another set of peripheral chips providing expanded data storage capacity to the calculator system of this invention. The 10-register chip is responsive to Flag A, CONB, and I/O information from the data chip for providing recall data through the I/O lines in return to the data chip.

The printer chip 9 is responsive to the I/O information from the data chip, the external, CONB, Flag A, and STBE commands from the data chip for printing in accordance with data on the I/IO lines.

The data chip 5 and the ROM chip 6 provide a basic operating calculator system, as set forth in the parent application from which the application is a continuation-in-part. However, the data chip 5 and the ROM chip 6 herein disclosed provide a basic system which anticipates adding peripheral storage and output functions, preferably implemented on MOS/LSI semiconductor chips utilizing novel methods of addressing for minimizing pin count and timing delays.

Shown in FIGS. 2b1–2b4 is a detailed functional block diagram of the data chip depicted in the calculator system of FIG. 2a. A detailed description of the individual functional blocks will be discussed subsequently in this specification, with only a general functional description of the basic "two-chip" system here set forth. It is understood that in the block diagrams of FIGS. 2b and 2c, a connection represented by a single line may represent a plurality of actual hardware interconnections, and for ease and simplicity of illustration, a single line may represent a pluality of different functions.

The calculator includes a program memory 20 for storing the control program, this memory being a read only memory (ROM) comprised of several hundred or more of multibit word storage locations implemented on the ROM chip. Instruction words ae read out of the ROM 20 one word at a time into an instruction register 21 on the data chip and are decoded and executed by conrol logic including the control decode PLA 212. The control logic is responsive to the fixed instruction words from the ROM 20 to the instructions entered from the keyboard 12, particularly the function keys and also to the internal conditions of the calculator system. Data is stored in registers 23 which include basically a sequentially addressed random access memory organized as four data registers of sixteen digits each. The registers 23 also include two flag registers and a keyboard interface or special purpose register 36 is provided for data storage. All operations on the data entered into the registers 23 is carried out in an arithmetic logic unit on the data chip which is of the bit parallel, serial digit type and includes the binary adder and carry/borrow circuit. The control logic also operates a program counter 25 on the ROM chip which is capable of addressing each of the addressable locations in the ROM 20, whereby the instruction stored in each location is read out into the instruction register. Usually the program counter is incremented by one for each instruction cycle, as controlled by timing means, so the instructions of a particular subroutine stored in the ROM are read out in sequence. However, branch instructions appearing at the instruction register 21 are recognized by the control logic and modify the sequencing of the program counter 25. The visual display 3 in FIG. 1 displays the contents of the A Register. Both the keyboard 12 and the display are scanned rather than continuously connected into the control logic, according to a feature of the invention.

Inputs from the keyboard 12 are entered into the data chip on seven keyboard lines or K lines which are encoded into a three bit binary code by the encode PLA 400. Data is entered into the encode PLA once every D time, here chosen to be entered at $S_3$ once every D time. A detailed explanation and description of the timing of the calculator system will be described hereafter with regard to FIGS. 5a and 5b. Input latch circuitry holds the incoming data on the K lines for an entire D time so as to provide enhanced error elimination rendering an unmistakable data signal to the calculator during strobing of the keyboard.

One specific input from the keyboard provides a hardware clear via line 404 to the program register output circuit 471 for unconditionally clearing the ROM and resetting the program counter to zero at time D15. The other K inputs are encoded by the PLA 400 and are strobed into the special purpose register, Reg. 8, in parallel on lines 397. Reg. 8 is an eight bit shift register, comprising three non-recirculating lower bits into which the encoded keyboard data is entered via lines 397, and four recirculating bits responsive to the selector gate 76 which provides encoded D times to Reg. 8 in response to line 391 from the D register (D Reg.) at 390. Reg. 8 further comprises an additional eighth bit which is responsive to software manipulation, such as the flag input to the selector gate 76 on line 75 from the flag decode matrix PLA 220. Data from Reg. 8 may be entered into the flag registers via line 74 to flag matrix 220 for setting and preserving flags.

Thus, after having entered the three bit encoded K information and the four bit D time encoded information into Reg. 8, a seven bit code is contained therein characterizing which key of the keyboard was actuaed at which D time. The contents of Reg. 8 is coupled via line 473 to the P Reg. output 471 for selectively addressing the ROM 20 in the ROM chip. The ROM is programmed to recognize that whenever the first bit of the P Reg. output is a zero at state times $S_4$, this is an instruction and that the next eight bits which are to follow form an address to which the ROM is to branch.

Thus, the particular combination of D time information and K line information provided by actuation of the keyboad forms an actual address to which the ROM will branch. For example, if you push a multiply key, a particular seven bit code would be entered into Reg. 8 which would be coupled to the ROM through the P Reg. output for instructing the ROM to branch to the particular location of the ROM containing the first instruction of the multiply routine.

A software feature of the calculating system is utilization of the arrangement of the keys and the program in the ROM so that efficient utilization of data from the keyboard which is stored in Reg. 8 for other purposes is provided at the same time it is used for addressing the ROM. For example, if a keyboard input enters numerical data into Reg. 8, the encode PLA 400 could provide the actual binary information in Reg. 8 which will be the same as the desired code being entered from the keyboard.

Data in Reg. 8 may also be loaded directly into any of the registers in the two-chip system, for example, Registers A–D in the SAM 23. An example of this application is a routine sotred in the ROM requiring numerical data which is loaded as a four bit code directly into one of the general purpose registers A–D by line 410. This saves instruction space in the ROM in that if numerical input data is required in the routine, it may be retrieved directly from the register rather than using a subroutine to generate this data.

Data from the keyboard 12 may also represent a particular symbol which is to be utilized by an external chip, such as the thermal printer or drum printer chip responsive to the external pin from line 393. For example, if the operator pushes a square root key, the printer chip can be programmed so that the code exiting from the Reg. 8 through the external pin is directly a command to print the square root function. As noted in FIG. 2b, line 393 from the external pin is bidirectional and may also be utilized to load into Reg. 8 from external chips. Once information from the external chips is loaded into Reg. 8, it may be utilized in a manner as above described with respect to information input from the keyboard. That is, it could be entered into one of the general purpose registers or utilized to form an address which accesses the ROM through the P Reg. output.

Once the ROM chip has been addressed by a leading zero at time $S_4$ from Reg. 8 through P Reg., the ROM control circuitry 567 knows that an eight bit address is being set, starting with the zero at $S_4$ followed by seven bits of actual address. Because the program counter 25 stores eleven bits of address information, the P Reg. output circuit contains a latch circuit for supplying zeros to the end of the instruction cycle or D time. The latch is set responsive to a command 472 from the instruction register 211 through the control decode matrix 212. The seven bit address is entered into the program counter 25 on the ROM chip through the control means 567 from the P Reg. output through pin 17. The program counter 25 then directs the contents in the specified ROM address to be outputed through ROM output 579 for generating the thirteen bit instruction word, $I_0$–$I_{12}$. The instruction word is read in parallel into the thirteen bit instruction register 581. The instruction word is segmented into two parts and shifted back to the data chip through pins IRGA and IRGB, respectively, sending back six and seven bits of the thirteen bit instruction word.

The reason for segmenting the instruction word into two segments for sending back to the data chip is that less time is required than if thirteen state times are utilized for serially reading the word into the instruction register 211. Accordingly, by utilizing a pair of inputs, they are loaded in less time, received by the logic 202/203 in a manner so as to provide all thirteen bits to be serially entered into the data chip instruction register 211.

At $S_{15}\phi_2$, immediately prior to beginning $S_0$ of the instruction cycle, the instruction word is clocked into the control decode 212 and bussed to other appropriate circuitry for execution of the instruction word. While the instruction word is being executed, a new instruction word is being clocked into the instruction register 211 during the time $S_0$ to $S_{13}$.

The instruction word is comprised of a three bit sigma "S" field or selector gate field, a four bit "R" field or register field, a one bit "sub" or subtract field, a four bit "M" or mask field, and a one bit "Instr" instruction field. At $S_{15}$ when the instruction word is clocked into the decode matrix 212, the three bit sigma field and the one bit sub field is bussed to the flag and decode matrix 220 by line 240/241. The sigma field is decoded for transferring or recirculating data among the registers. A further decoding of the sigma field by sigma select control 259 in response to line 256 controls the selector gates so as to allow entry of the output from the ALU (T Reg. 196) back into the SAM via lines 55. Sigma control lines 260 control entry of the output on lines 55 into the SAM and sigma control lines 255 control the exchange of data between the A and B registers and between the C and D registers. Input line 256 is also directly coupled to the selector gates for recirculating the A, B, C or D registers.

The sigma and flag decode matrix in providing sigma lines 256 is responsive to the mask decoder 222 and line 258 therefrom for providing a digit mask for specifying whether the mantissa or whether the exponent of the data word is being operated on. "FMASK" from digit/state/flag comparator 240 on line 246 provides the appropriate mask for execution in the flag registers.

Output 260 from the flag matrix 220 is coupled to the COND condition circuit 261 as an indication that the condition exists that the two flags are the same. Output 263 from the sigma and flag matrix is coupled to output pin 6 as a comma indicator. Line 263 also controls flag recirculate or flag exchange. Output 265 is coupled to pin 11 for outputing the Flag A or FLGA output from the Flag A Register.

The R or register decode matrix 221 receives the R field from the instruction word which controls the selector gates 233 for determining what main register in the SAM 23 is coupled to the ALU.

The mask decode matrix 222 is responsive to the M field of the instruction word from the instruction register 21 on line 270/271. The mask decode PLA functions so as to provide a "mask" for allowing manipulation of only a selected part of the data word, i.e., the mantissa or the exponent. This function is needed only when an instruction is commanded, as opposed to a branch, so the mask decode matrix is only responsive to the M field when the instruction bit is a one. The mask decoder is further responsive to the push-pull matrix 280 which provides encoded state times for $S_0$–$S_{15}$, and the decimal point and exponent timing information. The mask decode matrix provides an output signal DMSK or digit mask for providing the mask for the selector gates shown by line 258 coupled to the sigma and flag control matrix 220. DMSK also is coupled to shift left and shift right control logic 274 for providing a mask for the part of the word to be shifted. Line 272 provides a mask to the ALU through the ALU Control and further provides a mask to the external output on pins 33–36.

A general description of a typical sequence involving the above-described functions is as follows. The user actuates the calculator by depressing a keyboard input key which either stores data or a seven bit instruction in Reg. 8. If the Reg. 8 has an instruction word therein, it is coupled to the ROM chip through the P Reg. output at a specific S time. Control circuitry in the ROM chip sets the program counter indicative of a specific location in the ROM, the contents of which is read out as an instruction word to terminals IRGA and IRGB for transmission back to the data chip for entry into the instruction register.

If the instruction originally entered into Reg. 8 is a data word, it is entered via lines 410 into the ALU for entry into the A Reg. in the SAM. Data accordingly is in the SAM awaiting operations thereon. The instruction word subsequently entered into the instruction register is decoded into its M, R, and sigma fields. If, for example, the instruction is for an add routine, the sigma field may cause the data in Reg. A to be entered into Reg. B, awaiting a second data input from the keyboard to be entered into Reg. 8 which is then entered into Reg. A through the ALU as above described. Under the control of the R field from the instruction word, the respective registers A and B are coupled into the ALU binary adder. The M field of the instruction word provides masks telling the ALU the location of the decimal point, and what part of the word is the mantissa. The T register in response to the Push-pull matrix 280 receives at time $S_0$ the output of the ALU which is stored in the T register as a decimal point location. The mantissa part of the output word from the ALU is then coupled back into REG. A through a BCD corrector 485. At a proper time the A Reg. is then outputed through pins 7–10 to the display.

In implementing the above-described generalizations, other functions are required to carry out the software instructions in response to specific timing relationships. For example, when the resultant data word is read out to the display through pins 7-10, a decimal point and comma normally also appear in the output. To provide the decimal point in the display, a routine generally utilizing the D time generator, the D register 391 and the D/S/Flag comparator 440, the decimal point/D comparator 420, the decimal point adjust 430 and the T register 46 is utilized. That is, as above described, the T register contains a number representing the location of the decimal point position. That number is coupled to the decimal point adjust 430 along with another number generated in the push-pull matrix 280. For the particular configuration chosen for this calculator, the number generated in the push-pull matrix 280 and supplied to the decimal point adjust is a 3 written in BCD. 3 is chosen because the first three places in the output display are utilized as exponent and a decimal point data in the main registers to account for the delay in timing required on account of the first three exponents and decimal locations. Thereafter, the adjusted decimal point number is coupled to the decimal point/D time comparator 420 where it is compared with the D times generated from the D register 390. The BCD D times generated by the D/S time generator are entered into the D register 390 where they are serially outputed to the decimal point D time comparator.

The serialized D time in the digit register recirculates four times within an instruction cycle and these serialized D times are compared in the decimal point D time comparator 420. When the D time representing the timing of the system matches the adjusted decimal point input, then at S time $S_0$ the decimal point output at pin 5 is actuated for the duration of the instruction cycle by way of a latch circuit. A particular decimal point indicator on the display is responsively energized during the particular D time at the desired location in the display.

To generate commas, a specific subroutine in accordance with an instruction word provides the appropriate entry into the B register for generating commas every three digits from the decimal point by actuating pin 6 during the appropriate D time while the display is being strobed.

A feature of this calculating system is the leading zero suppression of the display in this calculating system. A programmable strobe generator 530 provides a strobe signal every fifteenth state time so that the time of occurrence of the strobe signal is one of precession, i.e., $S_{15}$ of one D time, $S_{14}$ of the next D time, $S_{13}$ of the next D time, etc. This strobe signal coupled with a zero suppression circuit 515 provides zero suppression of the most significant digit first. The strobe generator 530 also strobes the digit/S time generator for providing serialized BCD S and D times.

The initial program which the calculator executes upon actuation by a user is the power up clear routine. The power up clear circuit 470 which clears and initializes the calculator upon user initial actuation provides a first input to the P Reg. output circuit 471, and the KQ input from the keyboard at time $D_{15}$ provides another input to the P Reg. output circuit for initializing the calculator. That is, upon power up, the power up clear circuit 470 causes zeros to be outputed from the P Reg. output circuit to the ROM chip. At time $S_4$ the ROM sees 211 zeros and realizes that the subsequent instruction is an address which is also zero. The ROM is thereby reset back to location zero and reads out of location zero an instruction word. The instruction word is a "reset/idle latch" which is transferred back to the data chip through the IRG and IRA inputs to the instruction register. The control matrix in response to the reset/idle latch instruction causes the idle latch circuit 462 to change state and causes the power up clear circuit 470 to cease sending the command to the P Reg. output circuit for supplying zeros to the ROM chip. Once the P Reg. output returns to the normal state, the ROM instruction begins to be incremented normally by one of the program counter and the program begins execution.

During power up clear, there may be an entry in memory which the user desires to save instead of the resetting and clearing generally accomplished during power up clear. That is, certain status flags may be desired from previous operations, and a feature of this calculator allows shifting up to eight flags from the flag registers into Reg. 8. These flags are entered into Reg. 8 prior to power up clear and, then after power up clear, the flags are returned to the desired registers.

Since up to eight flags may be entered into Reg. 8, an eight bit address may be built up bit by bit in the flag register by software manipulation. After shifting the flag bits into Reg. 8, they may be outputed through the P Reg. to the ROM, thereby accessing any particular ROM location through Reg. 8. Since Reg. 8 is constantly recirculating and has an add one circuit, information therein may also be incremented by one, thereby providing another method for providing the desired data into Reg. 8.

The Control Circuits of FIG. 2b

New instructions coming from the ROM at times are desirously not entered into the instruction register. For example, if the data in the instruction register is being recirculated, such as if the calculator is in a hold position, or if it is waiting for a particular D time for another instruction to be executed, first it is unnecessary for the ROM to continue sending out instructions and secondly, new instructions from the ROM are desirously not entered. The condition circuits, CONA and CONB, function to communicate to external chips when instructions are to be entered and executed. CONA is normally utilized to provide a hold instruction. That is, whenever CONA is actuated, that instructs the ROM to stop incrementing instructions and for it to hold at the location it is. An example is during a keyboard scan requiring a complete D or instruction cycle.

On the standard programming of the two-chip system of this invention, the output of CONA is controlled by the presence of either a scan or a wait instruction from the instruction register. Either of these instructions is a command for the program counter to stop incrementing at the particular ROM location until reactuated by the data chip. During the one state of CONA the instruction register on the data chip recirculates the particular instruction therein, which is either the wait or the scan instruction. The calculator stays in this recirculating loop until the presence of a $D_{15}$ signal which changes the state of CONA allowing entry into the instruction register of the next instruction coming from the ROM. An example of such a wait or scan function is when a complete scan of the keyboard is desired, a wait until $D_{15}$ is necessary. This is so that the scan is started on $D_0$ to assure scanning of all keyboard lines. Otherwise if a scan started at $D_{13}$ instead of $D_0$, remembering that the D times count backwards, a complete scan would comprise $D_{13}$–$D_0$–$D_{15}$, without scanning $D_{14}$. At time $D_{15}$ the calculator is kicked out of the wait/scan instruction as a hardware function at time $D_{15}$ and a new instruction word is executed.

The function CONB communicates to external chips whether or not the data chip is in the "idle condition". In the idle condition, the calculator's outputs to the display terminals A1–A8 are actuated and the machine is awaiting further information. When the calculator is not in the idle mode, it is actually computing and the external display is blank. Thus, the CONB output will either be in a high or low state representing an idle or "not idle" condition. CONB is a function of the idle latch circuit 462, above discussed with respect to CONA, which is selectively coupled to CONB at $D_3\phi_2$ in combination with an instruction from the control decode matrix for changing the output state of CONB even when the calculator is not changing its idle condition actually. That is, the CONB instruction from te decode matrix is utilized to transport information or to communicate with other chips information other than idle/non-idle information.

The idle latch circuit 462 is responsive to the control ecode PLA, and in particular to set idle or zero idle istructions. These instructions either set the idle latch r zero the idle latch which causes selective communiation to the other chips of the idle state of the data hip.

CONB, in addition to indicating idle conditions of the alculator, also performs other functions. That is, if flag ondition information is being sent to other chips, 'ONB is utilized to indicate at what rate the flag inforiation is being sent. That is, whenever data is being isplayed, i.e., the calculator is in the idle condition, ie flags are being sent at the same timing rate as the egister information, i.e., one particular flag is transmit-ed during each instruction cycle or D time. This enbles the flag to actuate functions such as decimal oints, minus signs, or commas depending upon the pecific program.

When the calculator is not in an idle mode, and the ONB is in the other condition, the flags are being ransmitted at state time rates; that is, one flag per state ime or sixteen flags per instruction cycle or D time. The flag during this time may be utilized to selectively ctuate other chips depending on whether or not a articular figure flag is set. Therefore, CONB controls vhether other chips will look at a particular flag by nowing whether or not the calculator is in idle.

The output of CONB will always occur at $S_0\phi_1$ if a ONB instruction or a zero idle instruction has been ncountered. Therefore, another function of the ONB output is for synchronizing the other chips. That s, by coupling the external chips to monitor CONB, hen after a power up clear routine is accomplished, a et CONB instruction provides synchronizing information that the data chip is in a $S_0\phi_1$ state, and extra pins o communicate the same information is unneeded. Furthermore, by selective programming, CONB can be nade to occur only at a particular D time, so that the occurrence of a particular CONB will synchronize not only the S times on the peripheral chips, but also the D times. This again provides considerable hardware advantages such as saving external pin interconnects, at only the expense of slight software manipulation.

The condition circuit 261 provides an output COND for providing to the ROM a conditional branch instruction. That is, if upon a particular test command the condition circuit or COND is set, then the ROM jumps to the location therein specified. If the condition circuit is not set, the next instruction word in sequence in the ROM is executed. For example, if the software routine requires a branch instruction if a particular flag is set, then at a particular time in the instruction cycle the flag is tested, and if the condition circuit is set in relationship to whether the flag was "set", then the ROM would branch to the location of the desired routine. If the condition circuit were not set with respect to the flag condition, then the next sequential instruction from the original ROM location would be executed.

The feature of a condition circuit and COND signal provides the machine the capacity of decision making dependent upon conditions which are under software control increasing versatility. Other software controlled conditions which may set or reset the condition latch circuit is the depression of a particular key on the keyboard input, setting the latch. In response to this particular setting of the condition latch when a keyboard key is depressed, the keyboard scan is terminated. The condition latch 261 is also set if during any add or subtract operation a carryout of the last digit of the register or a borrow out of the last digit is required. In other words, the condition circuit functions to indicate an overflow condition. The condition latch may also be set upon a particular "test flag" operation, wherein if the flag is set then the condition latch will also get set and conversely.

Positioned between the condition output and the CONA output in FIG. 2b is a "busy" terminal. The busy terminal is an input to the data chip of FIG. 2b and may be tested in a manner similar to that of testing a flag. For example, upon a "test busy" instruction, if there is an input on the busy terminal, software causes a setting of the condition circuit. If a printer chip is included in the expandable calculator system herein described, it may be desirous for the calculator to stay in the idle mode until the printer chip has finished printing out the results. Then an input on the busy terminal from the printer chip would indicate to the data chip that the printer is active and cannot take any more data in to be printed. The data chip monitors the busy terminal and if a signal is thereon, the condition circuit will be set, allowing the calculator to perform a conditional branch to a particular wait condition until the printer is finished printing and ready to receive more information. The busy terminal may also be used to provide feedback to the data chip as to the status of other peripheral chips such as the ROM/register chip and the 10-register chip in addition to the printer chip in a manner similar to that above described.

The input/output circuit labeled terminals 33–36 are used to both output data from registers in the SAM 23 to external chips and to input data from the external chips to the data chip. Whether or not data is being input or output and to which registers the data is channeled is under software control.

The four outputs labeled SA—SD provide four bit binary encoded state time information relating the particular state time, $S_0-S_{15}$, of the calculator. Terminals SA–SD may be coupled to any ROM chips 17 of the system having sufficient interconnect pins to receive the information. As earlier discussed, those chips not having the extra four pins to receive the SA–SD signals may monitor the CONB signal and utilize it as a sync signal in generating S and D times coincident with SA–SD.

Pin 16 is labeled a strobe output and provides a signal to external chips to indicate during which D time the calculator is operating. The ROM chip digital output buffers which provide D signals $D_2-D_{12}$ for scanning the keyboard and display are synchronized utilizing the strobe signal. Strobe occurs during a given state time and this occurrence changes during each instruction cycle or D time. As will be discussed later, D times actually precess by one state time, or count backwards, and accordingly the strobe circuit precesses by one state time. As earlier mentioned CONB may be utilized to sync the external chips if sufficient interconnect pins are not available. The separate strobe generator, however, is readily programmable and is readily provided on the data chip and saves considerable software manipulation than if otherwise CONB had to be utilized. The strobe generator 530 producing the strobe signal may be programmed to provide a strobe signal so that a D time may be one instruction cycle in duration, as it is in the preferred embodiment herein described, or it may be programmed so that a D time is 2, 3, 4 or 5 instruction cycles in duration. This feature provides an extended D time to accommodate any display system having a high number of displays requiring a particularly large set of information to be transmitted thereto. In such a case, more than 15 S times or one instruction cycle is required for complete execution of the information driving the display system.

The Flag A, FLGA, output indicated at pin 11 is utilized to display particular conditions of the calculator, such as error, arithmetic overflow, or entry overflow conditions. The output may also be utilized as a comma output which is stored in the Flag A register. Flag A is under control of the CONB signal and may be utilized for communication to other chips while the calculator is actually in the not idle or computing mode. As earlier discussed, in the calculating or not idle mode, the flags appear at the Flag A output once every given S time. This particular flag information is communicated to other chips, for example, the ROM register chip, which in combination with the particular D time directs the ROM register chip to store the conveyed data in a particular ROM memory therein. By multiplexing data utilizing a particular flag/D time combination in this manner, only one flag is needed to convey and store the necessary information, and no other data chip output is required. In a similar manner, the ROM register external chip utilizes flag information for controlling which register therein is being accessed. Utilizing the flags in this way is a feature of this invention as an almost unlimited amount of expansion is possible with peripheral chips in combination with the data and ROM chip. The outputs labeled A1-A1-2-A4-A8 are the outputs by which the four bit output code from the SAM registers is communicated to the display indicating which numeral is to be displayed. For maximum flexibility the two-chip system of this invention does not have segment decoding circuits. That is, various types of displays require various types of decoding information to identify and display the data to be displayed. For example, a seven segment LED display requires a seven segment decoder. By providing the entire four bit code from the SAM register to the output terminals A2–A8, separate decoding circuits appropriate for the particular display may be provided, such as the seven segment decoder for use with the seven segment LED display.

The pin 5 output labeled DPT is the decimal point output which is actuated at the particular D time when the decimal point is to be actuated in the display. No external decoding is necessary in the embodiment herein described, as the DPT output directly actuates the particular decimal point in the display.

The pin 6 output labeled Comma is a programmable multifunction output which may be used for providing comma information. That is, a particular subroutine which counts by threes from the decimal point is stored in the memory and appropriate data is provided in the B register for actuating the comma output at the appropriate D time. By selectively setting other bits of information in the B register, that information may be exited at the comma output in a manner similar to that described for comma output generation. For example, if internal zero suppression circuit 520 is not desired, external zero suppression data is suitably provided at the comma output. That is, if the undecoded four bit code from the A register did not go into the decoding circuit functioning as a zero suppress circuit 520 which recognizes an all 1's code to be a zero suppress or a blank information code, as featured in this embodiment, then the straight four bit binary code may be used with an externally provided gate circuit for blanking the data appropriately. The comma output terminal may also be utilized for outputing Flag B information. It is possible therefore in extremely complex systems using many peripheral chips wherein flags are used as means of controlling the chips, to output both sets of Flag A and Flag B. The Flag A output pin 11 has been discussed above. By outputing both Flag A and Flag B information, the amount of available control capacity is doubled. It is understood that in computer technology a flag is merely one binary bit indicating a preprogrammed condition which may be used to trigger circuitry.

The P register or P Reg output at pin 17 as earlier discussed communicates with the program counter and ROM in the ROM chip. Upon an output P Reg instruction at time $S_4$, a zero is communicated to the ROM signifying that the instruction to follow is an address to which the ROM is to proceed. Because the program counter receives thirteen bit words, the P Reg output line is programmable so that only seven bits of information and six bits of zeros is allowed to exit. Programming the P Reg output so as to provide only a seven bit code to the ROM, which provides full communication from the seven bits stored in Reg 8, causes the eighth bit of Reg 8 to be essentially meaningless and allows the setting thereof to be disregarded.

However, if a seven bit word location is insufficient and capability is desired for a greater number of locations in the ROM, the P Reg output may be programmed to provide the full eight bit code from the Reg 8 requiring the eighth bit to be set from, for example, a flag register in the SAM. Since a seven bit location word allows a $2^7-1$ capacity, an eighth bit word allows $2^8-1$ locations or an essential doubling of the capacity to address the ROM.

Figure 2C:
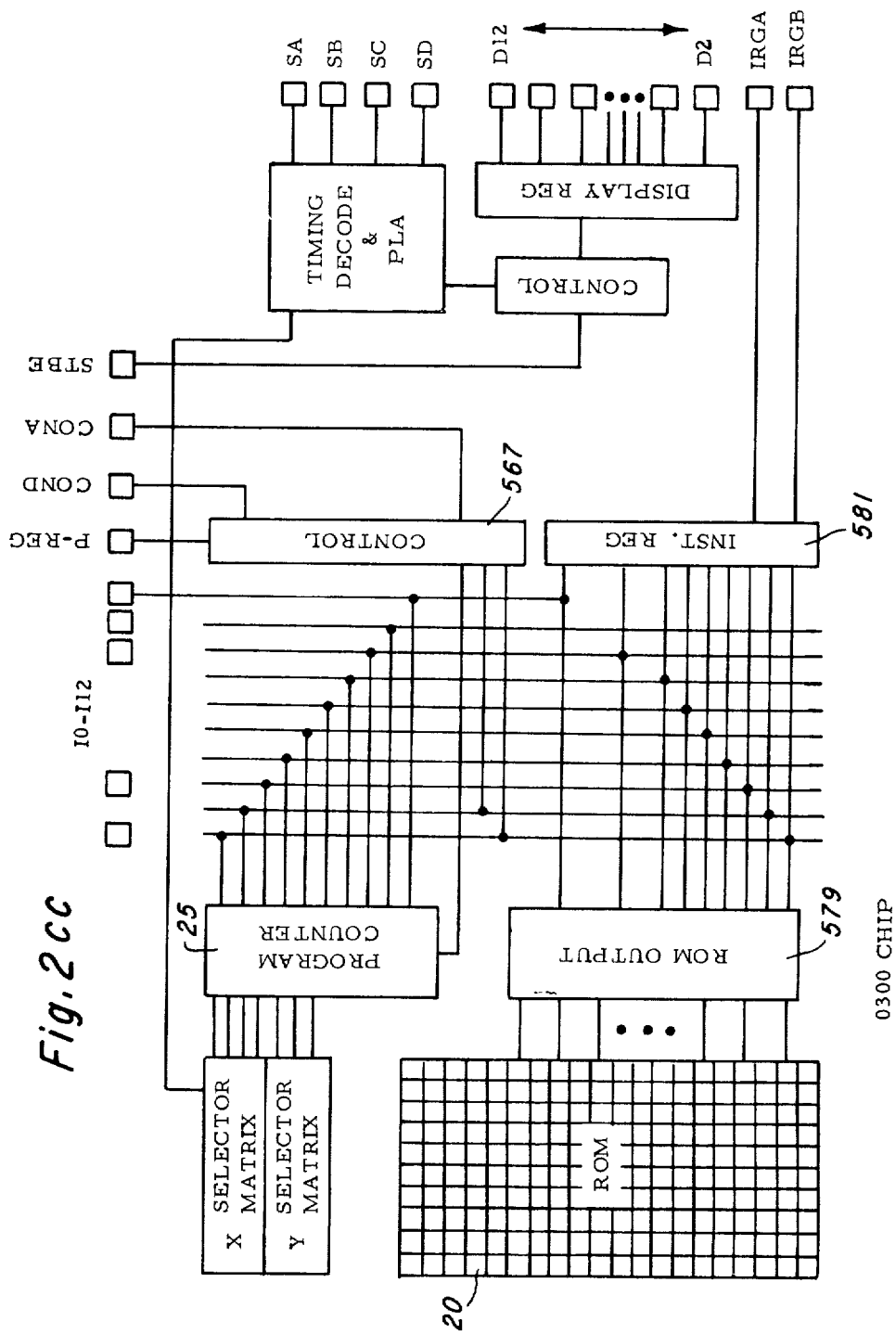

General functioning of the ROM of FIG. 2c has been discussed above, wherein the ROM chip is constantly monitoring the P Reg output. At $S_4$ is the input is a one, the ROM knows it is to be non-responsive to the following P Reg instruction and is to increment normally. However, if a zero at $S_4$ occurs, the ROM knows immediately that it is to branch according to the next set of bits coming in which is registered in the program counter. The program counter input to the ROM completely overrides any other instructions, causing the ROM to branch to that location specified therein.

Outputs from the ROM labeled $I_0-I_{12}$ are actually the inputs to the program counter as decoded from the P Reg input 593. The $I_{12}$ bit is the bit indicating whether or not a conditional branch is commanded, with $I_{11}-I_1$ forming the address which is jammed into the program counter to which the ROM conditionally will branch. $I_{11}$ is a condition code, either 1 or 0, and if this code matches the code coming in on the COND line 566, a conditional branch is commanded and the ROM responds accordingly. If the condition code and $I_{11}$ do not match, then the ROM proceeds to the next storage location as incremented by one by the program counter.

Outputs labeled $D_2-D_{12}$ provide the remaining D times not provided by data chip in FIG. 2b. The $D_2-D_{12}$ outputs are generated in response to a particular decoding of the $S_A-S_D$ inputs which provide state time information, and the $D_2-D_{12}$ outputs are synchronized by the strobe signal 603.

Figure 3:
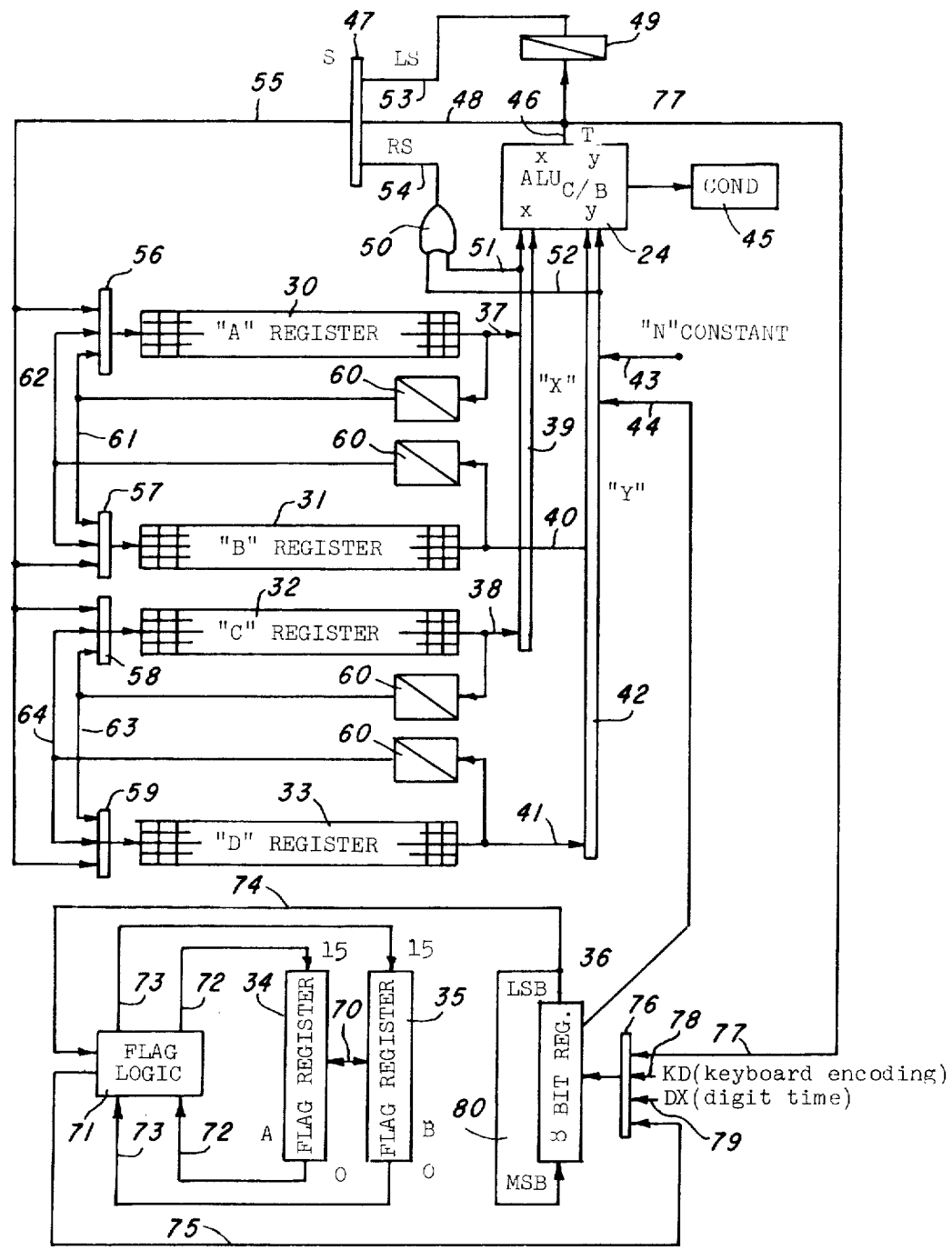
FIG. 3 is a more detailed block diagram of the registers and part of the logic of the electronic calculator of the invention.

Referring to FIG. 3, the data storage registers 23 are shown in more detail along with part of the arithmetic logic unit 24 and interconnecting data paths. No attempt is made to show the control logic, timing or other features in FIG. 3. The calculator has four registers, 30, 31, 32 and 33 for basic data storage, named the A, B, C and D registers. Each of these registers contains sixteen digits or characters, four bits per character, in binary coded decimal or hexidecimal format. Instead of the usual shift registers employed in most electronic desk top calculators for data storage, these registers 30–33 are implemented by a sequentially addressed read-write memory of the type set forth in copending U.S. patent application Ser. No. 163,683 now abandoned and replaced by continuation U.S. patent application Ser. No. 458,934 entitled "Random Access Memory Shift Register System", assigned to the assignee of this invention, as described below. Two groups of sixteen flags are also available with flag registers 34 and 35, also referred to as FLGA and FLGB. An eight bit special purpose register 36, or Reg 8, is available for keyboard interface or flag transfer in groups.

The ALU 24 of FIG. 3 is a four bit parallel binary or BCD adder. Outputs 37 and 38 from A and C registers 30 and 32 are connected to "X" bus 39, and outputs 40 and 41 from B and D registers "Y" bus 42. Although shown as one line, the outputs 37, 38, 40 and 41, as well as the X and Y buses, are actually four parallel lines representing one, two, four and eight in BCD fashion; this is true of most of the data connections of FIG. 3. A predefined constant "N" can be logical "ORed" with the Y bus 42 at an input 43, or four least significant bits from Reg 8 register 36 may be likewise ORed with the Y bus at input 44. The inputs to the ALU 24 at the X and Y buses thus may include the outputs of any of the main A, B, C or D registers, and Reg 8 contents, and a constant N. The ALU 24 generates a carry/borrow signal which can be used to set a COND flip-flop 45 to zero, and also for the arithmetic operation.

The output 46 of the ALU 24 is a T register which may be connected directly back through an S bus 47 by a line 48 with no shift or connected through a one bit delay 49 to the S bus 47 to produce left shift. Right shift is provided by taking the logical OR in a gate 50 from inputs 51 and 52 from the X and Y buses. The left and right shifted inputs 53 and 54 are applied to the S bus 47, the output 55 of which is connected as inputs of selector gates 56, 57, 58 and 59 for the A, B, C and D registers. Other inputs to the selector gates 56–59 include a recirculate path for each register; the recirculate paths include a one bit time or one state time delay 60 for each register. As will be later described, the A, B, C and D registers do not "shift" in the usual sense of shift registers while recirculating, but instead a bit is taken out of one location in the SAM and returned to the same location. Also, the output is not just at one end as would appear in the block diagram of FIG. 3, but instead is from both ends. Recirculate and exchange are done at one end and ALU operations and shifting is done from the output at the other end. The selector gates 56–59 are thus actually several gates. The contents of the A and B registers may be exchanged, and likewise the contents of the C and D registers may be exchanged; for this purpose, the delayed output of the A register 30 is connected by a line 61 to the selector gate 57, and the output of the B register 31 is connected by a line 62 to the input of the A register 30.

Similar cross connections 63 and 64 are provided for the C and D registers.

The A and B flag registers are each sixteen bit binary registers located in the SAM; the flags are one bit binary values which are used by the ROM program to store status information which can be examined or changed at a later time, typical flags being minus sign, error, overflow, etc. Addresses of zero through fifteen are used to access the flags. The A and B flags which have the same address are said to be adjacent, and can be exchanged, as indicated by a connection 70 in FIG. 3. Flag logic 71 permits flags to be recirculated by paths 72 and 73, and also permits entering information from the eight bit register 36 into the flag registers 34, 35 by a line 74. Further, information in the flag registers may be entered into the eight bit register 36 by a connection 75 from flag logic 71 to a selector gate 76 for the register 36. Other inputs to the selector gate 76 include a connection 77 from the T register output 46 of the ALU 24, an encoded keyboard K-D entry 78, and a digit time entry 79. The eight bit register may also be recirculated by a path 80.

The Instruction Word

Each instruction word stored in the ROM 20 and read into the instruction register 21 consists of thirteen bits, $I_0$–$I_{12}$. If the word is for an operation, the leftmost bit $I_{12}$ will always be a 1; if the word is for a branch, $I_{12}$ will always be a zero. The formats for operation or branch are different and are seen in FIG. 4a. The format for instructions includes: a three bit S or sigma field, $I_0$–$I_2$; a four bit R field, $I_3$–$I_6$; a subtract field, $I_7$; a four bit M field or mask field, $I_8$–$I_{11}$; and the instruction/branch indication $I_{12}$. The format for branches includes: an eleven bit address field $I_0$–$I_{10}$ (two bits being chip select and nine being a ROM address); a one bit condition field $I_{11}$; and a one bit instruction/branch indication $I_{12}$. The table of FIG. 4b gives the binary words used for S, R and M fields, for each possible value of S, R and M; thus, $M_5$ would be 0101, $M_{15}$ would be 1111, etc.

If $I_{12}$ is zero, the instruction word is for a branch, and the branch is conditional depending upon the value of bit $I_{11}$. If $I_{11}$ is zero, a branch will be executed if a condition code, COND, is zero; if $I_{11}$ is one in the instruction word, a branch is executed if COND is one. The address field $I_0$–$I_{10}$ contains the ROM location or address, which is stored in the program counter 25 if the branch is taken. A branch will set the condition code COND to 1 if the next instruction to be executed is not a branch.

If $I_{12}$ is one, the instruction word is for an operation. Arithmetic and shift instructions are defined for an M field of $M_0$–$M_{12}$, or binary 0000 to 1100 appearing on $M_A$–$M_D$ as seen in FIG. 4b. This $M_0$–$M_{12}$ field defines thirteen digit masks as shown in Table I at the end of the specification, where the masks are described by state times $S_0$–$S_{15}$ which will be explained later. A constant N, also seen at 43 in FIG. 3, is generated at a certain state time along with the digit mask. The inputs and operation of the ALU 24 are specified by the R field and SUB. The input paths to the A, B, C and D registers, selection gates 56–59, are specified by the sigma field. Again for the digit masks $M_0$–$M_{12}$, Table I, the X and Y inputs to the ALU 24 and the operation performed are set forth in Table II for the various possible R fields. The capital letters, A, B, C and D, in the table indicate the main registers. Table III shows the operations performed for various sigma fields. As may be seen, the hardware or control logic 22 responds to predetermined combinations of zeros and ones in the instruction word to interconnect the system as desired and to perform the needed operations.

Timing

Figure 5A:
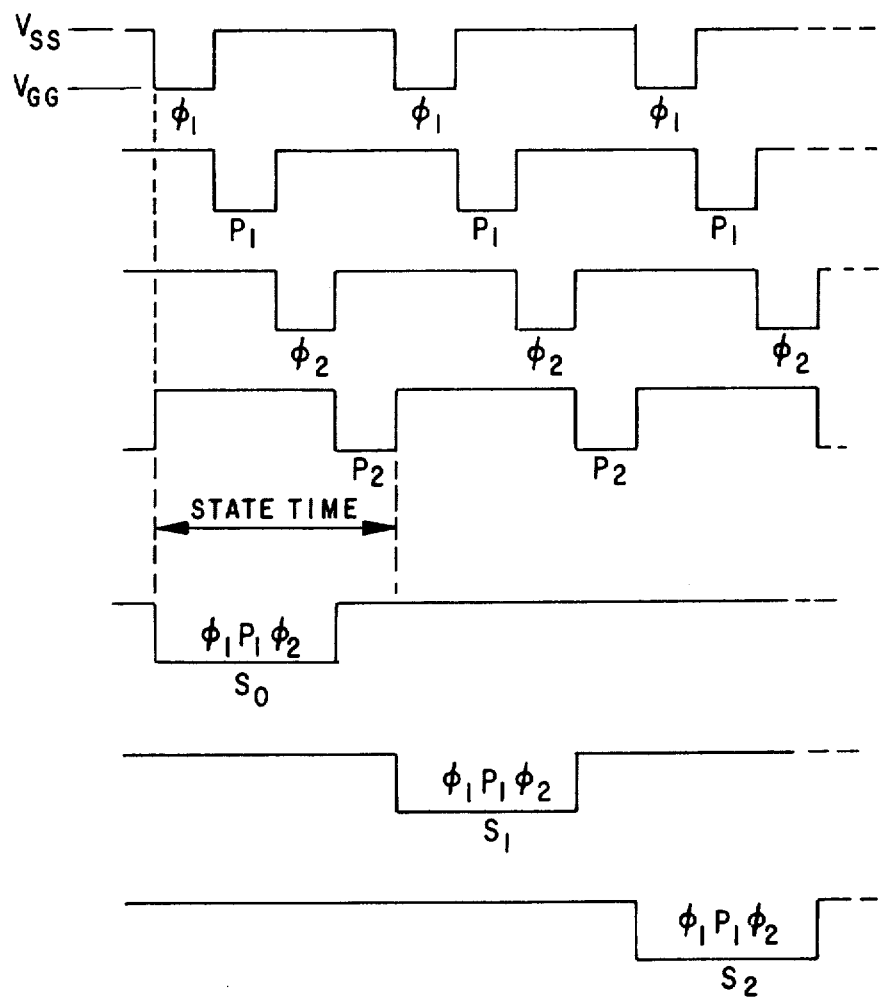
FIGS. 5a and 5b are timing diagrams showing the timing of various parts of the system of the invention.

The entire system operates on two externally provided clocks $\phi_1$ and $\phi_2$ as seen in FIG. 5a, and two internally generated clocks $P_1$ and $P_2$. The frequency used is 250 KHz for $\phi_1$, $\phi_2$. The clock generators may be conventional and are not shown herein.

Figure 5B:
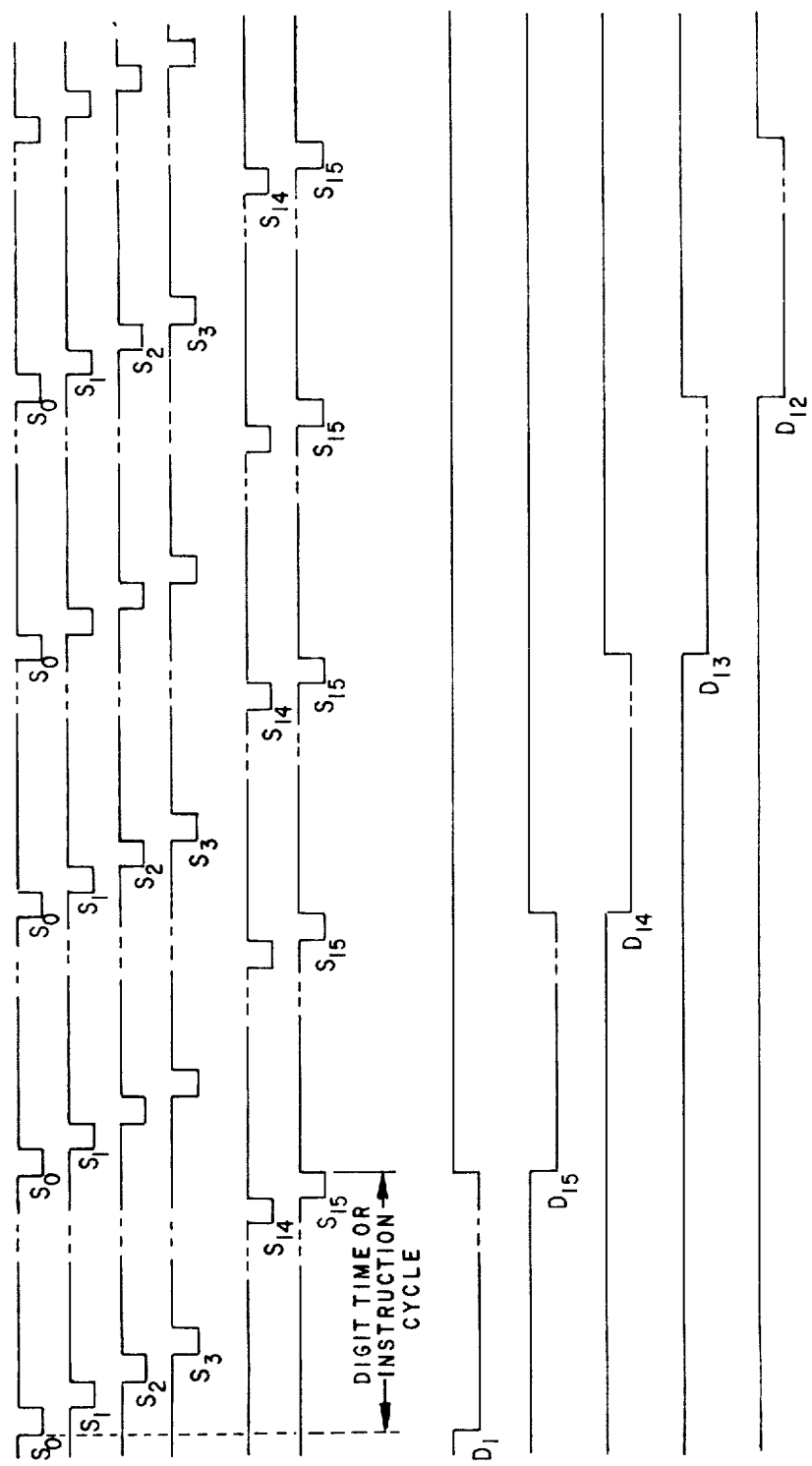

One set of clocks $\phi_1$, $P_1$, $\phi_2$, $P_2$ is referred to as a state time, and represents the time for one bit from each of the main registers A, B, C and D to be operated on in parallel by the ALU, etc. The BCD arithmetic used in the invention requires one full set of clock pulses for each digit, so sixteen sets or state times are needed to perform arithmetic operations on all sixteen digits in a register. Sixteen state times represent one D time or instruction cycle, as seen in FIG. 5b.

Individual address lines in the registers 23 are energized only for three of the clocks $\phi_1$, $P_1$, $\phi_2$, rather than all four; these groups of three are also referred to as state times $S_0$–$S_{15}$ as seen in FIG. 5a. A feature of the invention is the use of the same state times as generated to operate the address lines of the SAM register 23 to operate or time the remainder of the system.

D times generated directly from state times $S_0$–$S_{15}$ are used to scan the keyboard and the display. As seen in FIG. 5b, the D times count down, $D_{15}$, $D_{14}$, $D_{13}$ ... $D_1$, while the state times count up, $S_0$, $S_1$, $S_2$ ... $S_{15}$; this feature aids in the zero suppression technique since leading zeros to be suppressed are on the left or MSD first while the ALU must operate from right to left or LSD first. There are 15 D times and 16 state times.

The Keyboard

One embodiment of the invention uses a keyboard as seen in FIG. 6. This keyboard includes natural number keys for 1–9, a zero key 15 and a decimal point key 16. Twenty function keys 17 are included, as will be described; these are all push-buttons which stay closed only so long as depressed by the operator. In addition, a number of switches are included, such as mode switches 19 and rounding switches 90. The decimal point position is set by switches 18 which may be individual buttons as seen, or a thumb-wheel; a floating point switch is also included.

A natural number key 14 enters the number punched into a register and displays it. The decimal point key 16 enters a decimal point. Only the first decimal point is protected.

The function keys 17 cause an internal change in the calculator such as performing an arithmetic operation, remembering an arithmetic operation, clearing registers, or changing the contents of registers. The specific operations caused by the function keys is set out in Table IV at the end of the specification.

The switches 18–19 are functional controls, like the function keys 17, but once they are closed they remain closed until manually opened. The decimal switches 18 enter a desired number of decimal places for the display at the end of an addition or subtraction calculation; multiplication and division is done in floating mode. A separate floating switch will override any decimal switch that is down. If no decimal switch 18 is set, the machine will always default to the floating mode.

The mode switches 19 include a sigma or summation switch which causes memory accumulation to occur when $\pm$ or $=$ key is pushed. A constant switch K designates a constant multiplicand, i.e., the number entered or the result acquired (product or quotient) before the last multiply command is stored. In the case of division, the numbr entered immediately after the last divide command is the constant divisor.

The rounding switches 90 permit selection of the rounding operation in three modes. Round up, RU or an arrow pointing up, means if the quantity to be discarded is non-zero, a one is added to the LSD retained. Round off, or 5/4, means if the quantity to be discarded is half or more than half, a one is added to the LSD retained, otherwise the LSD retained is ummodified. Round down, RD or an arrow pointing down, means that the number is merely truncated below the LSD to be retained, and any quantity is discarded.

An overflow lamp 91 near the display is turned on when the integer part of the result contains more than twelve digits. If the number of decimal places cannot be displayed in full, but the integer part of the result is less than twelve digits, this is not truly overflow, but is referred to as pseudo-overflow. For example, if the decimal point is selected at 5, and the calculated result is 13 digits, or 123456789.1234, then the display drops the last 4 and shows 123456789.123 which should be 123456789.12340 according to the DPT setting; this is pseudo-overflow.

An intermediate result, as the term is used later, means the result of an intermediate calculation performed, not from a $\pm$ or $=$ key, i.e., not from any "equality" function key. For example, if the following is punched - $a \times b \times c \div d \div e +=$; then an intermediate result of $ab$ will be obtained after the second X, an intermediate result of $abc$ after the first $\div$, and an intermediate result of $abc/d$ after the second $\div$. A final result is obtained after $+ =$, or $abc/de$ in the example.

The decimal point mode (fixed point) and floating mode determine the size of the display, i.e., the number of decimal places displayed. They do not affect the integer part of the number. Insignificant zeros (trailing zeros) may be added or deleted to satisfy the number of decimal places displayed. For example, if the result is 12.411733410 and the round down switch is depressed, DPT 5 on switches 18 will cause 12.41173 to be shown, DPT 7 will show 12.4117334, DPT 10 will show 12.4117334100 or padded with one insignificant zero, DPT 11 will show the same as for DPT 10 and will be in pseudo-overflow since the decimal point will be at 10 instead of 11, and F or floating will show 12.41173341 losing one trailing zero.

Rounding the number determines only the value of the LSD displayed depending upon the value of the MSD deleted. DPT mode and rounding are independent of one another but bear a certain relationship. "Rounding" means doing what the rounding switch says; "no rounding" means truncation of the insignificant decimal places. In F or floating mode, no rounding occurs for intermediate or final results; in fixed point mode, no rounding occurs for intermediate results, but the final result is rounded according to the switch 90. An intermediate result is always in floating mode, and floating mode is always no rounding.

Table V gives operation examples for the calculator to be described, with the ROM program to be set forth. Other operating sequences are possible with different programs in the ROM. In the examples, E means lightg an entry overflow indicator lamp 92 near the display on the calculator face. A letter or number within a rectangle means this is a final result.

Figure 7:
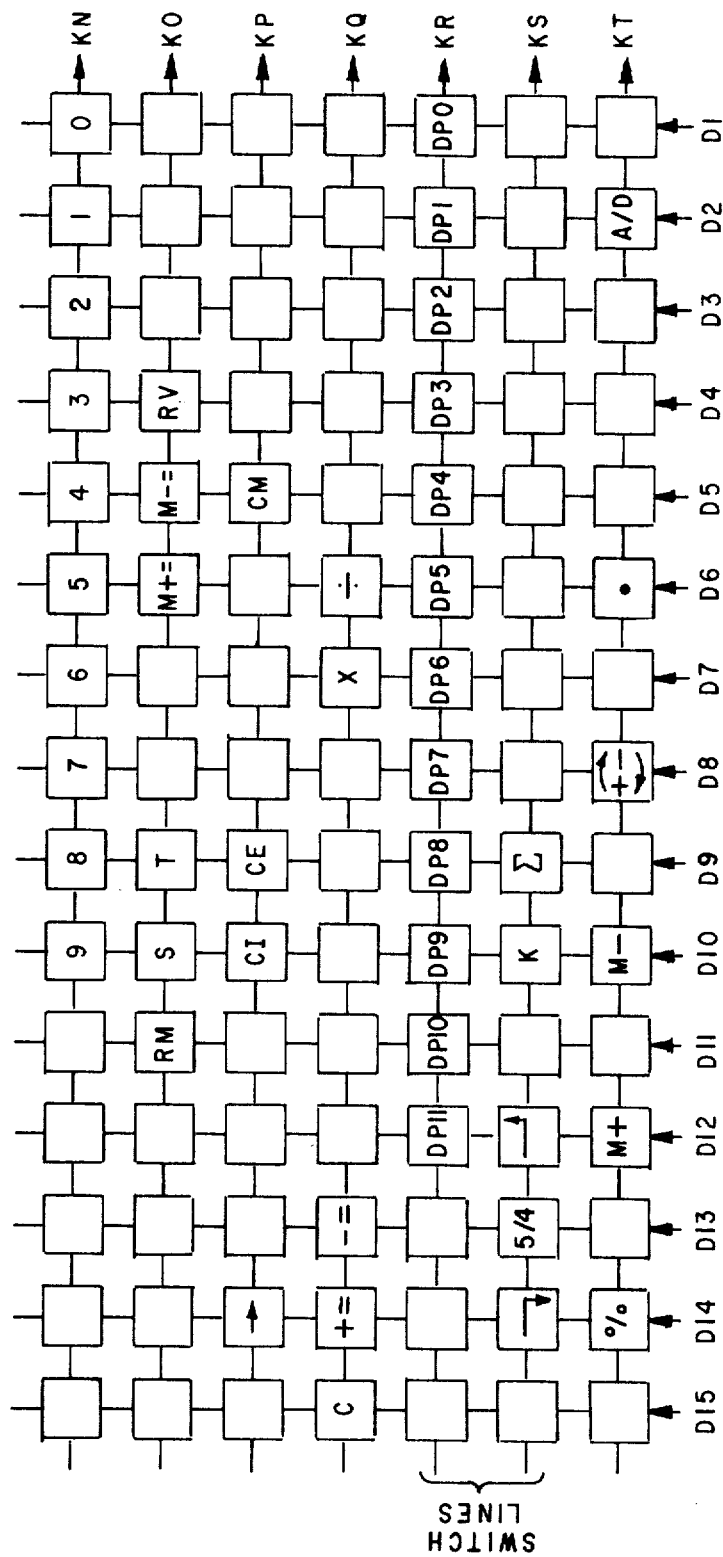
FIG. 7 is a representation of the keyboard input matrix.

In FIG. 7, there is seen a fifteen by seven matrix showing the keys from the keyboard arranged as scanned by the fifteen digit timing $D_1$-$D_{15}$ signals, and sensed on the seven outputs at KN-KT, from which keyboard information is entered into the system. If a 1 voltage appears on KQ at $D_7$ time, then the X key is depressed, etc. The combination of a digit time and a sense line identifies a key, and these fifteen and seven items are binary encoded within the machine to appear as four and three bits respectively; FIG. 8a shows the format for loading keyboard and digit time information into the register 36, with the code of FIG. 5 being used for K information. If a key at $D_{10}$, KP is down after a keyboard scan, the register 36 will contain the word of FIG. 8c.

Detailed Description of Circuits

The system will now be described in detail with reference to FIGS. 9 and 10. The system was designed to be implemented with two MOS/LSI chips, one being the data chip of FIG. 9 and the other being the ROM chip of FIG. 10. All of the system is in the data chip except the ROM 20 and the program counter 25 which are in the ROM chip. The instruction register 21 is duplicated, in both chips.

The Instruction Register.

Figure 9:
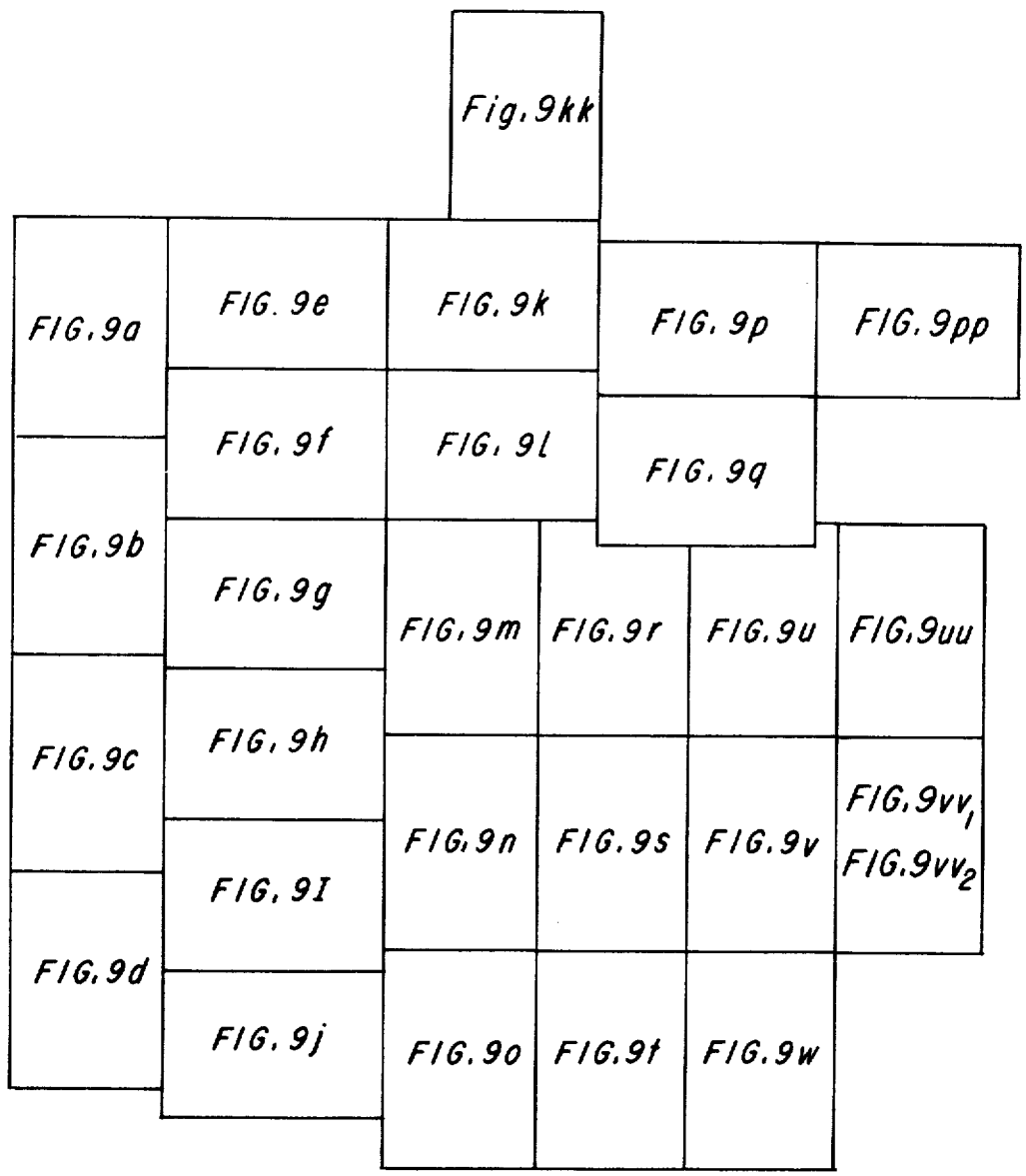
FIGS. 9a–9w is a composite schematic diagram of the circuit of the "data chip" part of the system of the invention.
FIGS. 9kk, 9pp, 9uu, 9vv1 and 9vv2 are additional circuits comprising the "data chip"
Figure 9A:
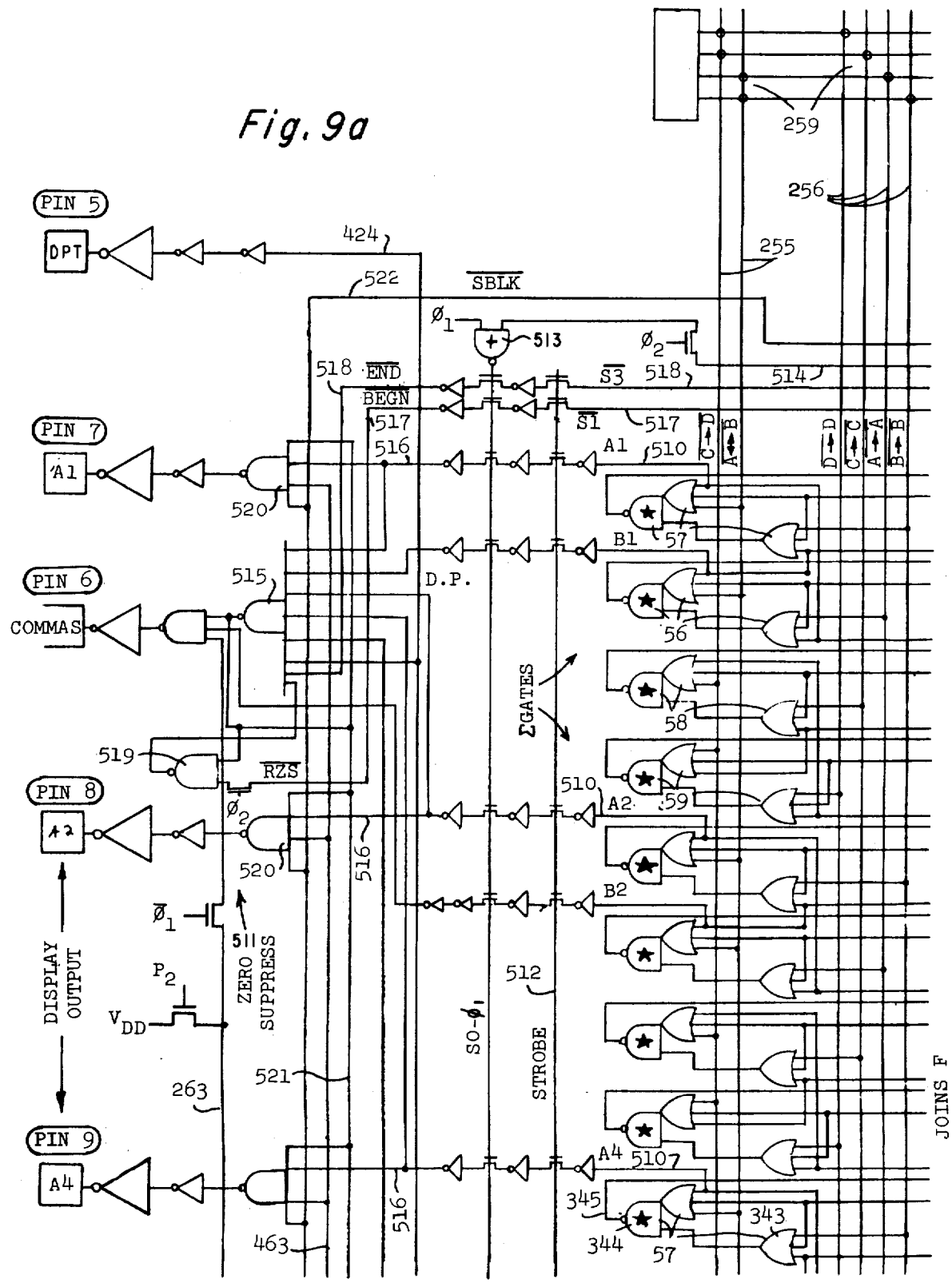
Figure 9B:
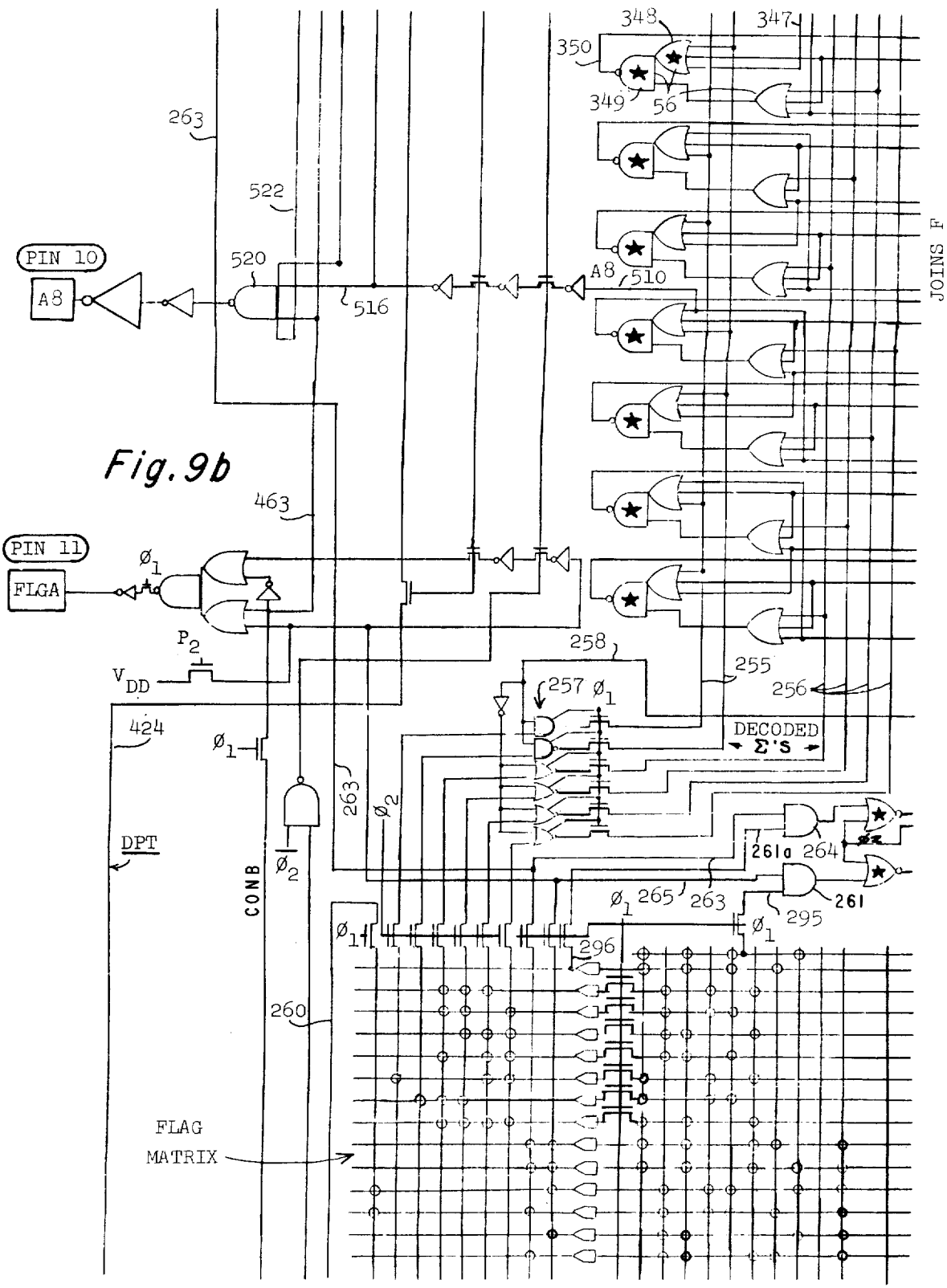
Figure 9C:
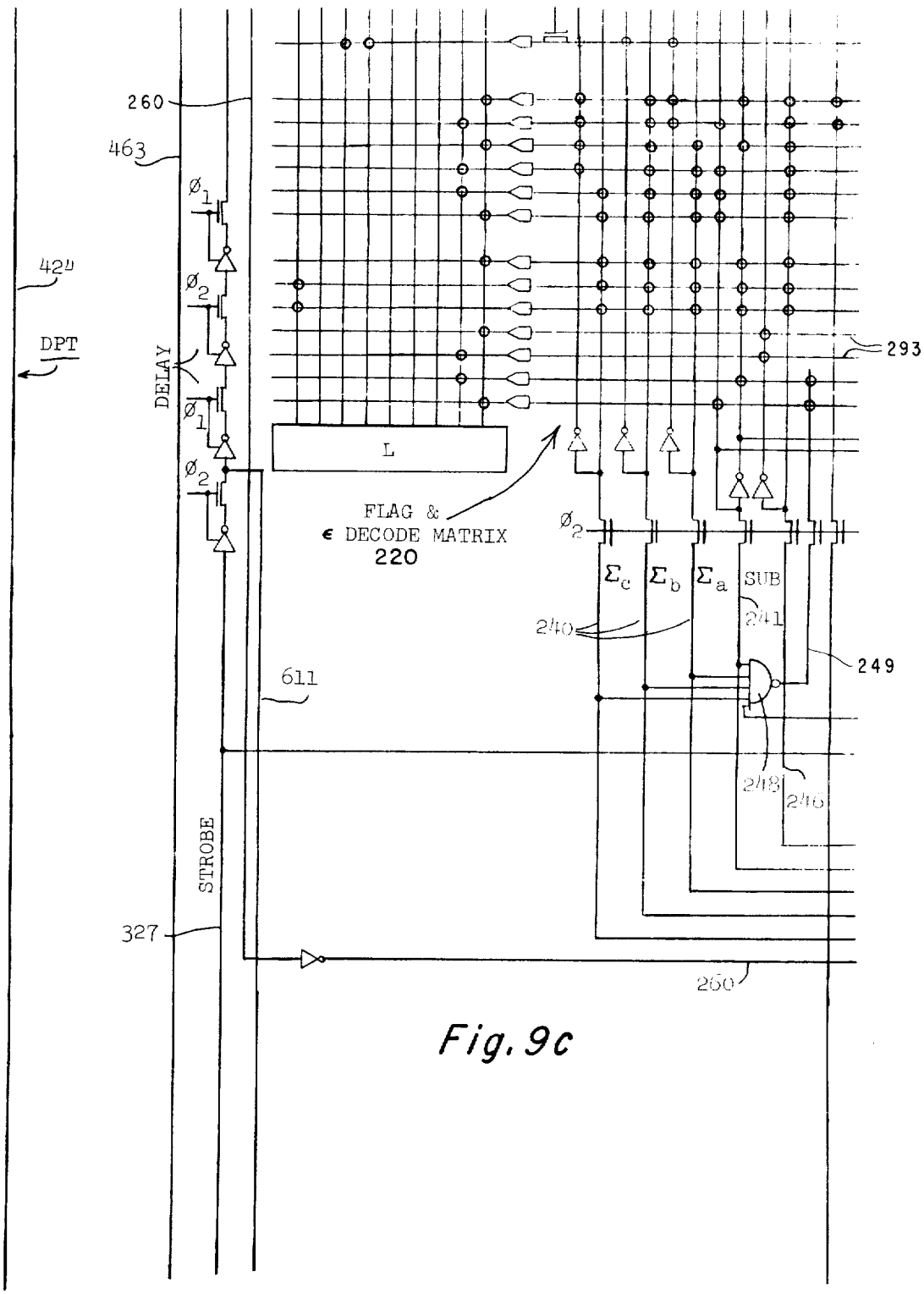
Figure 9D:
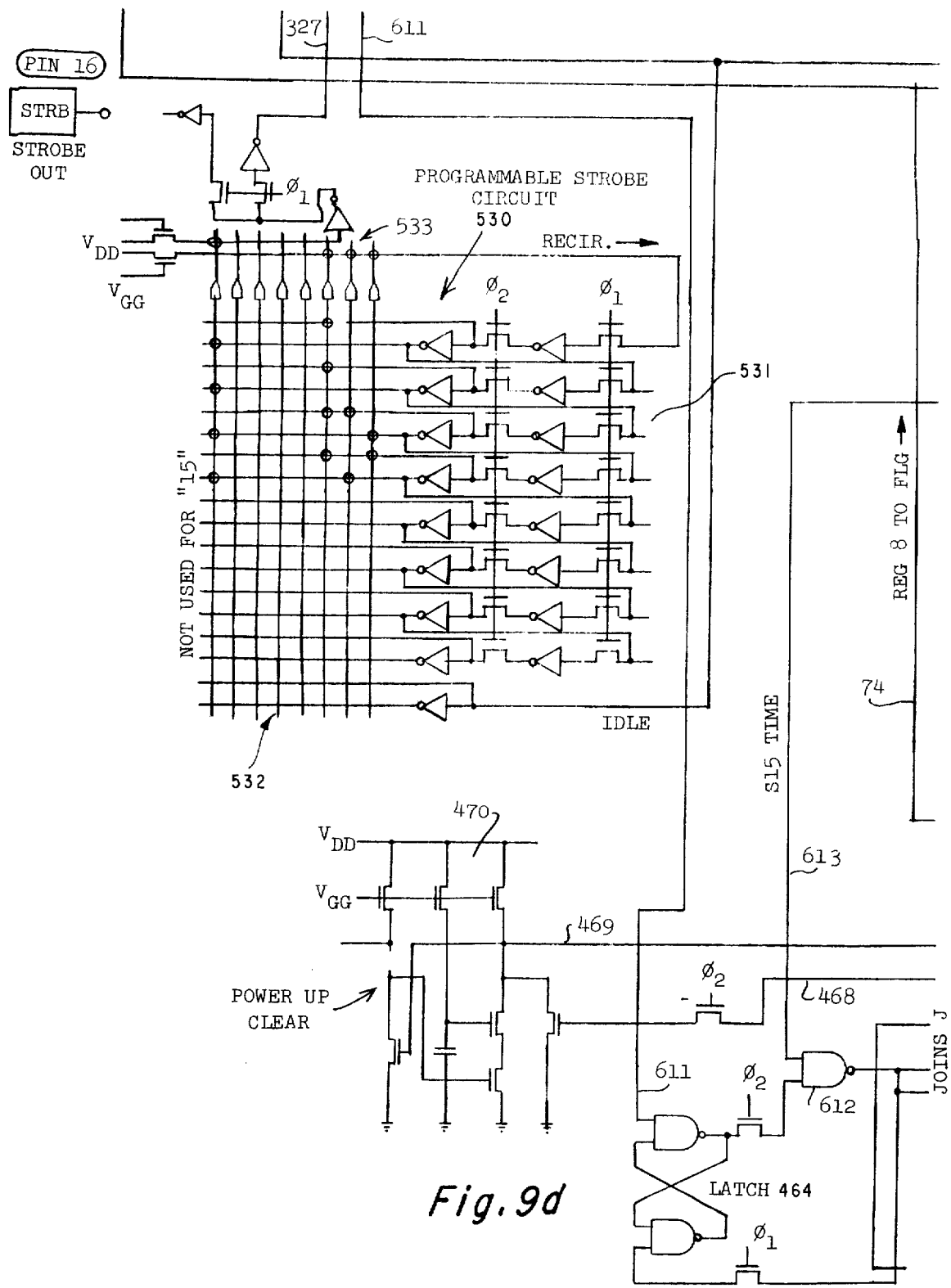
Figure 9E:
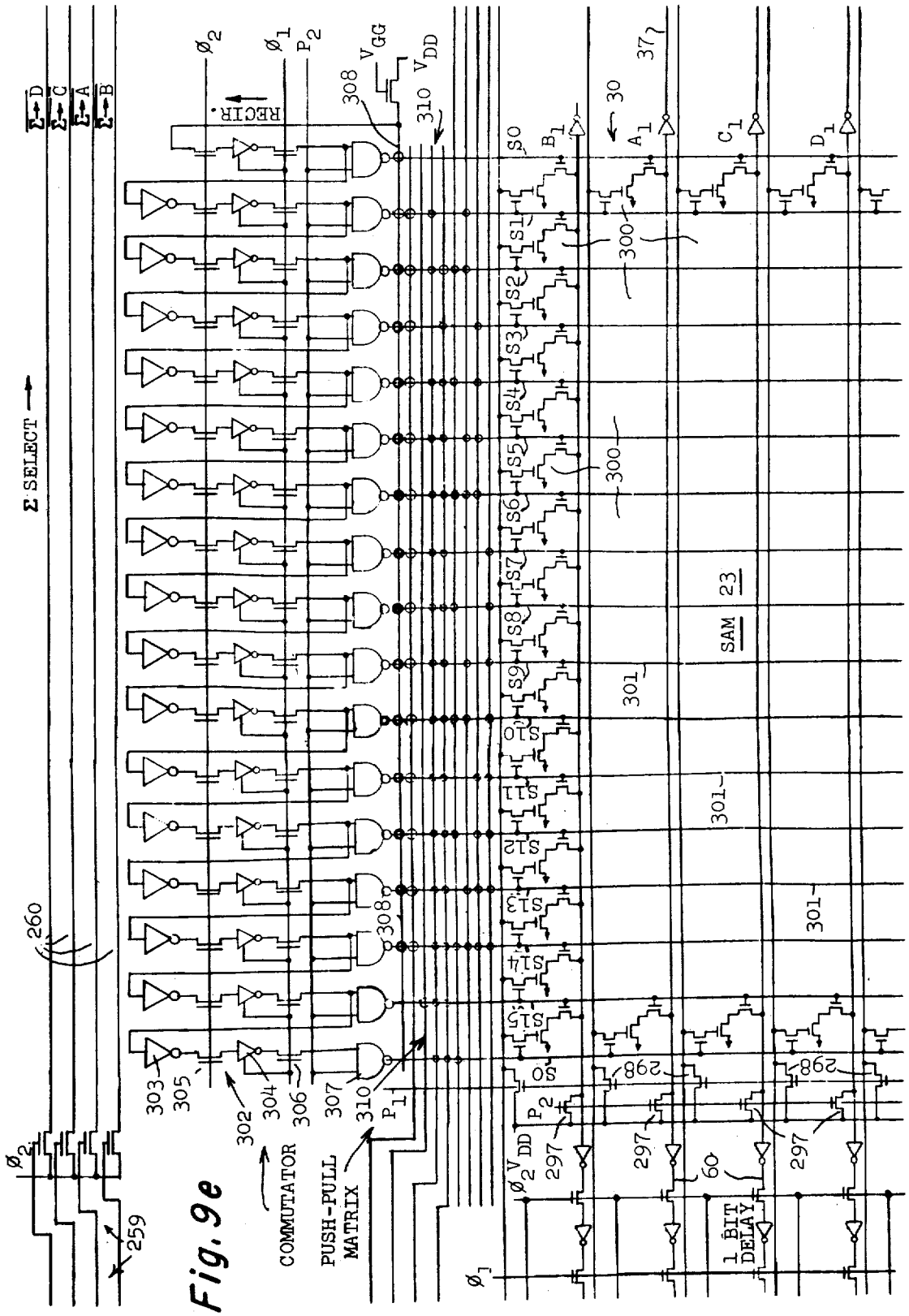
Figure 9F:
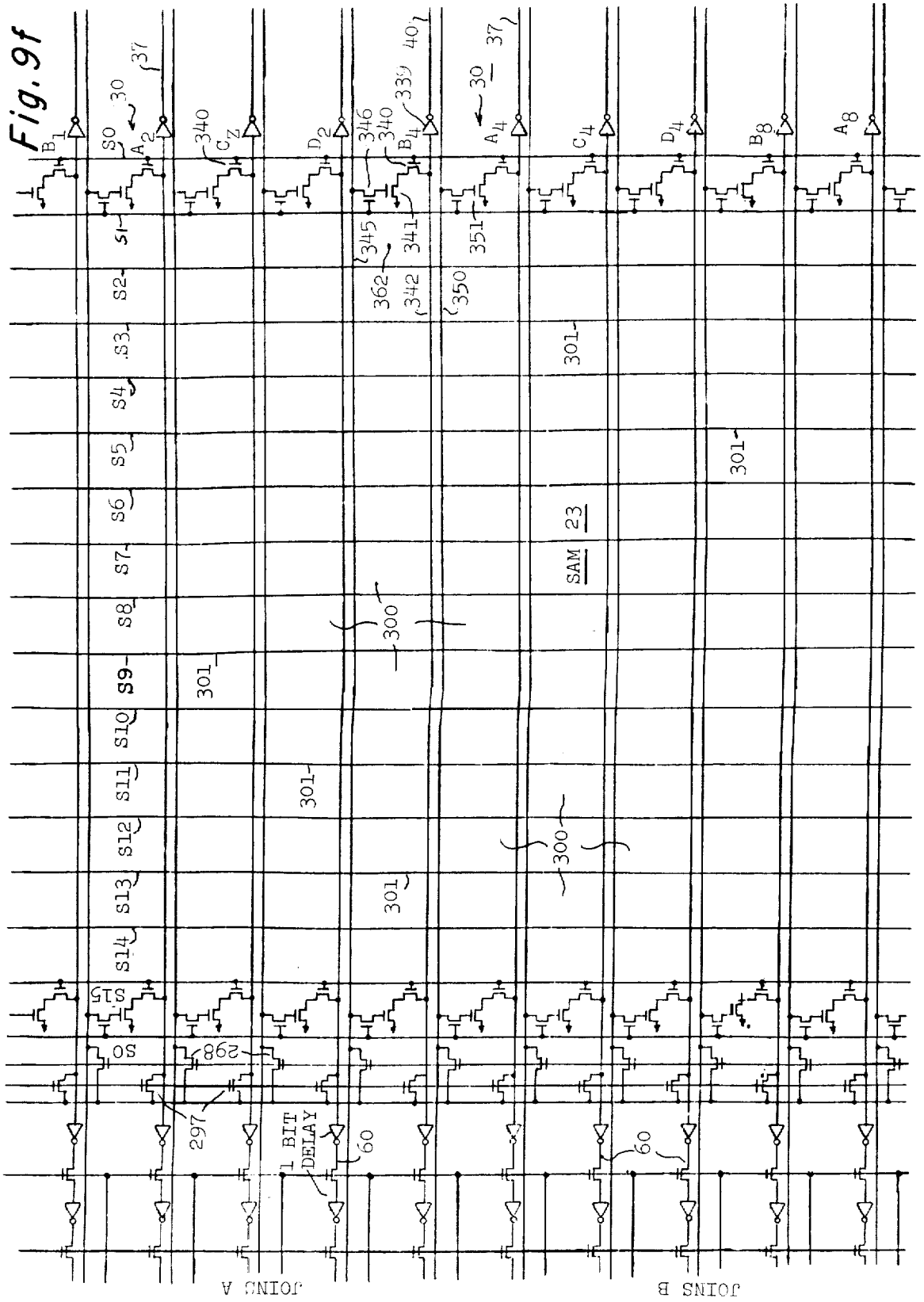
Figure 9G:
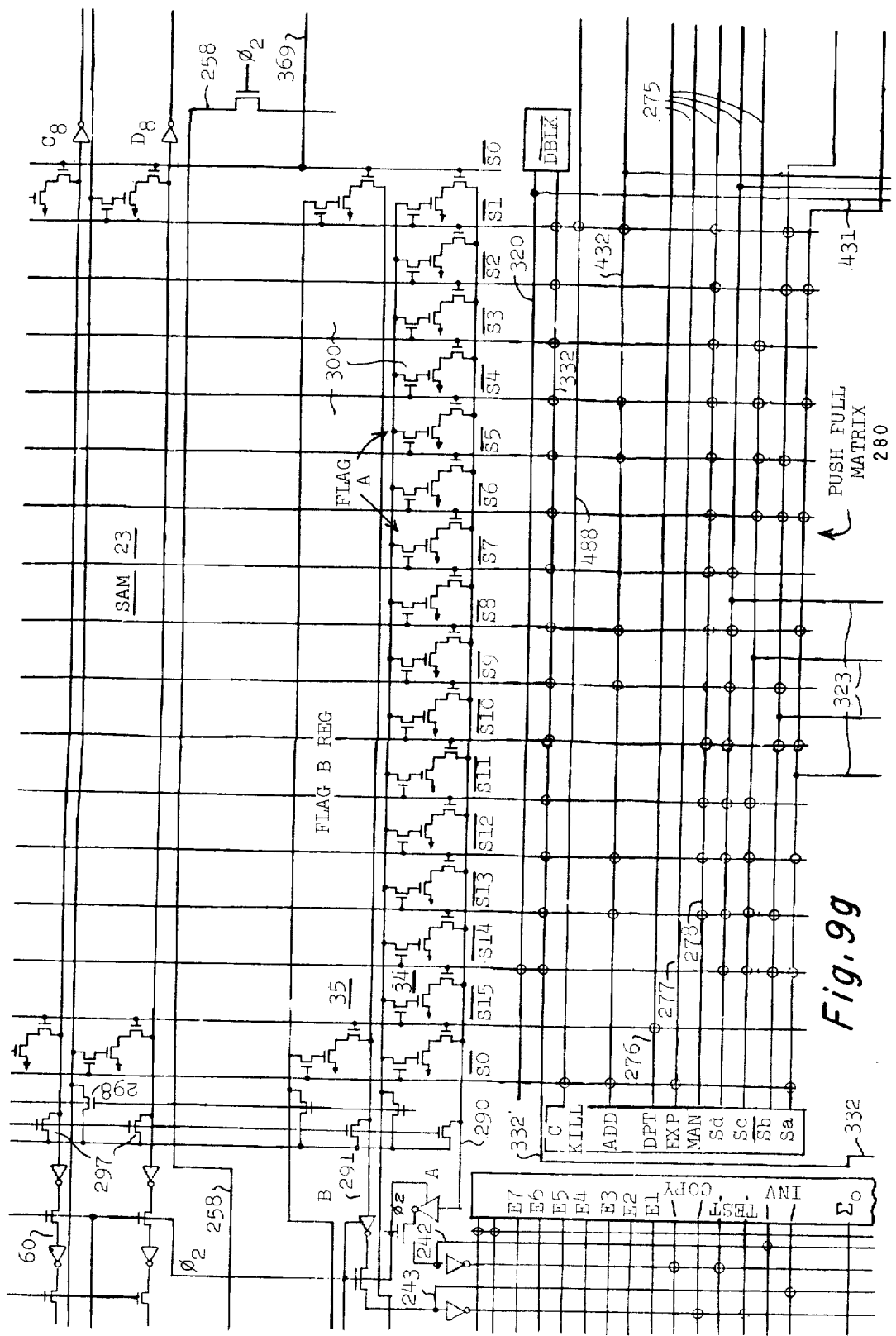
Figure 9K:
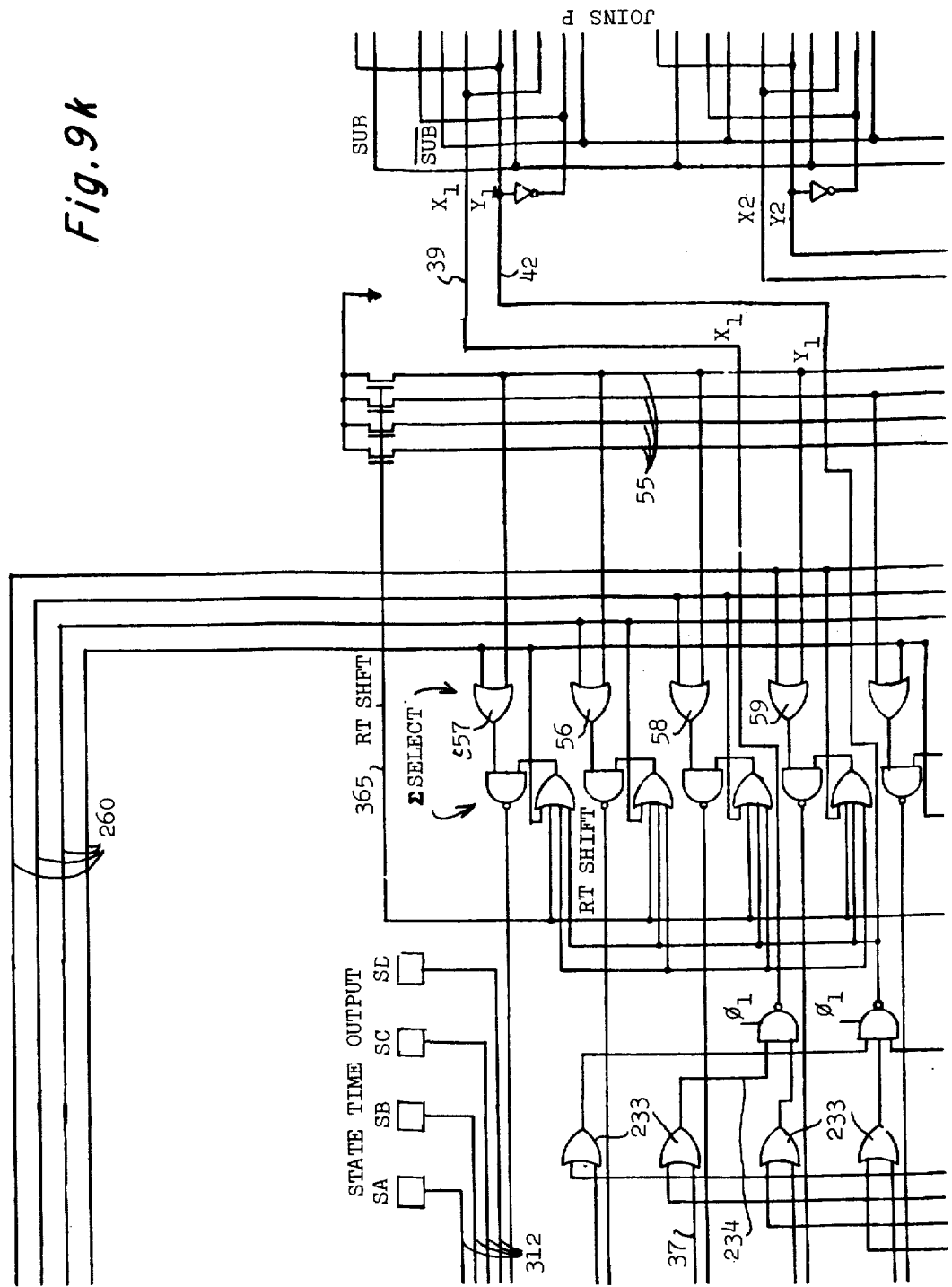
Figure 9L:
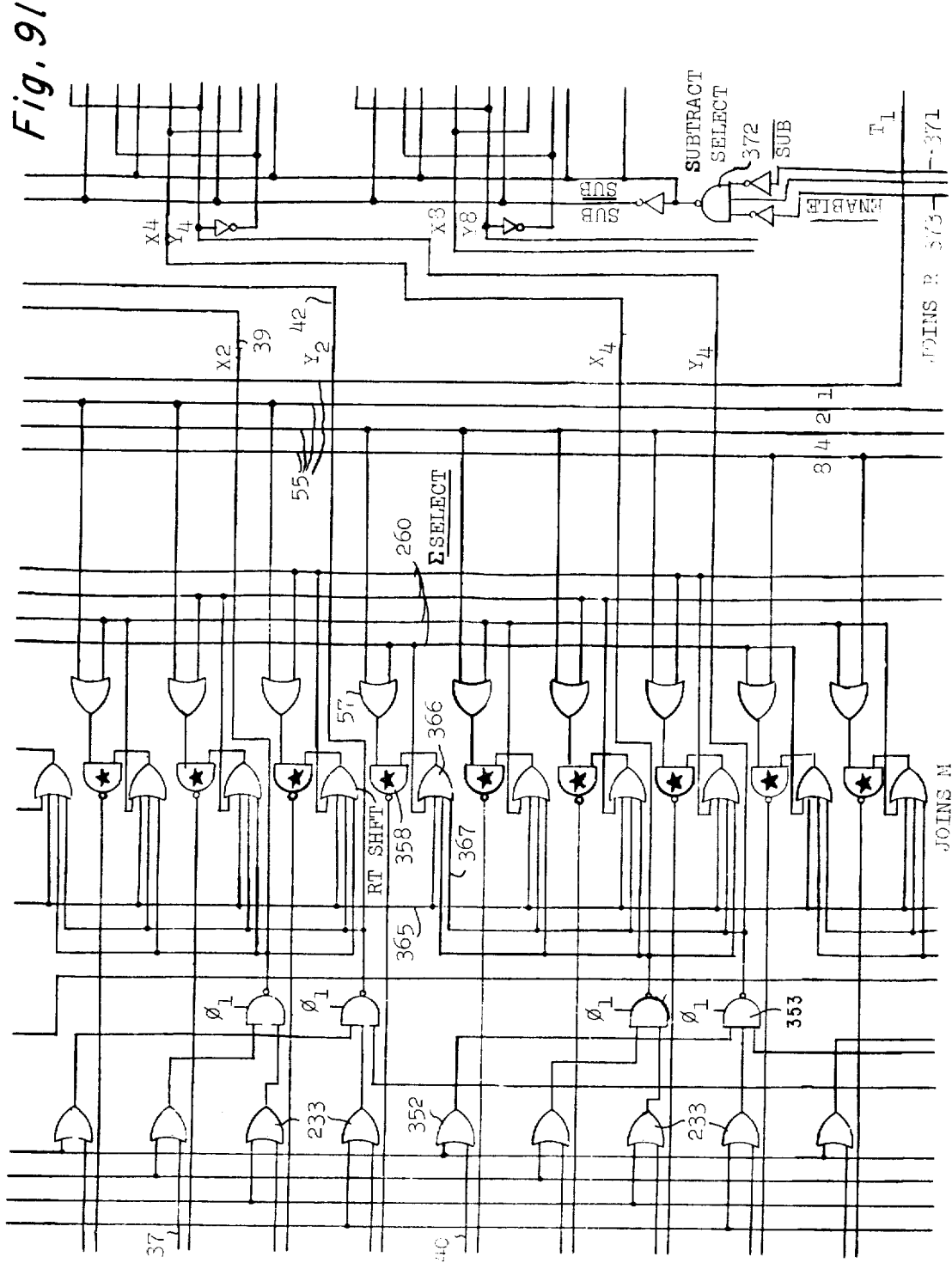
Figure 9M:
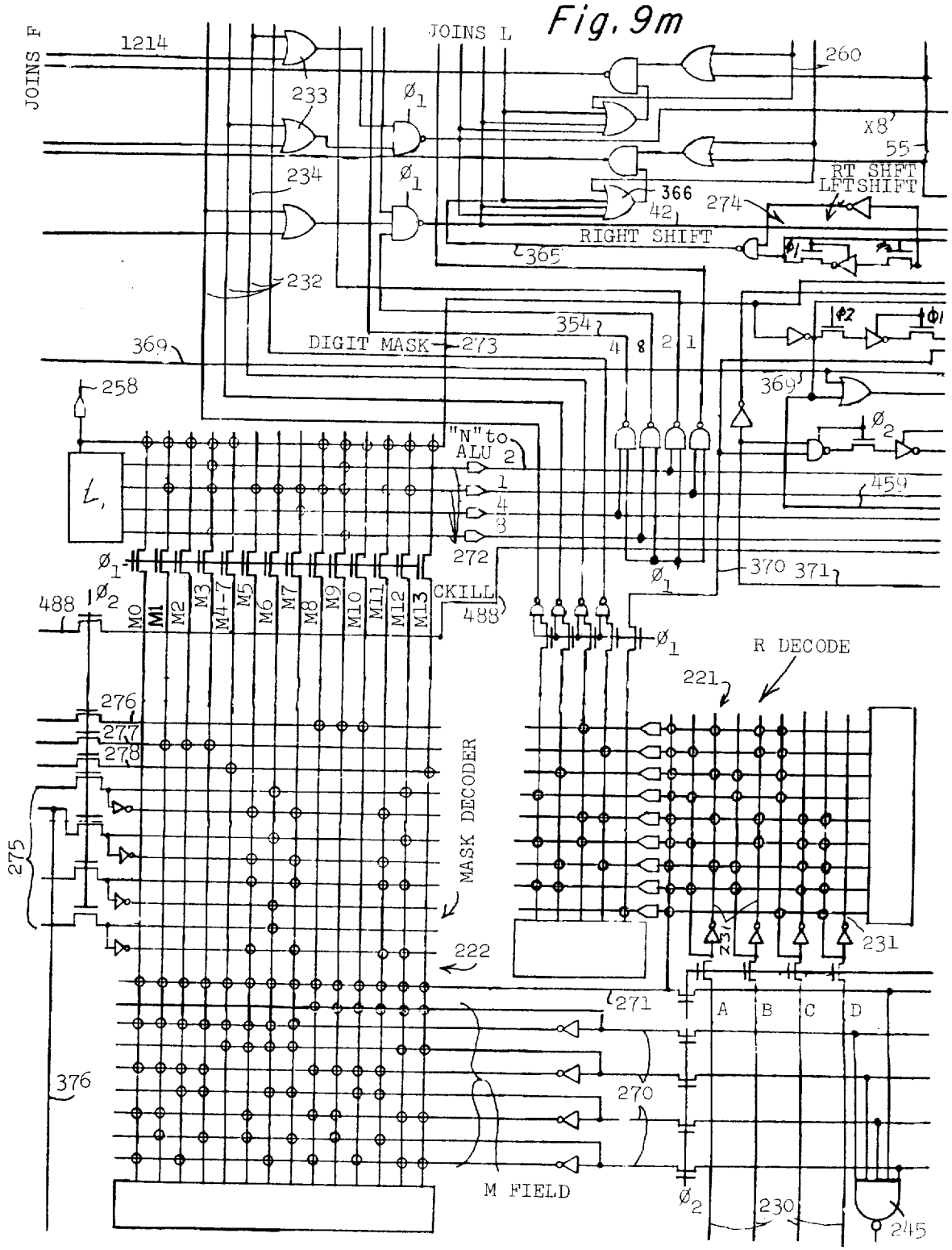
Figure 9N:
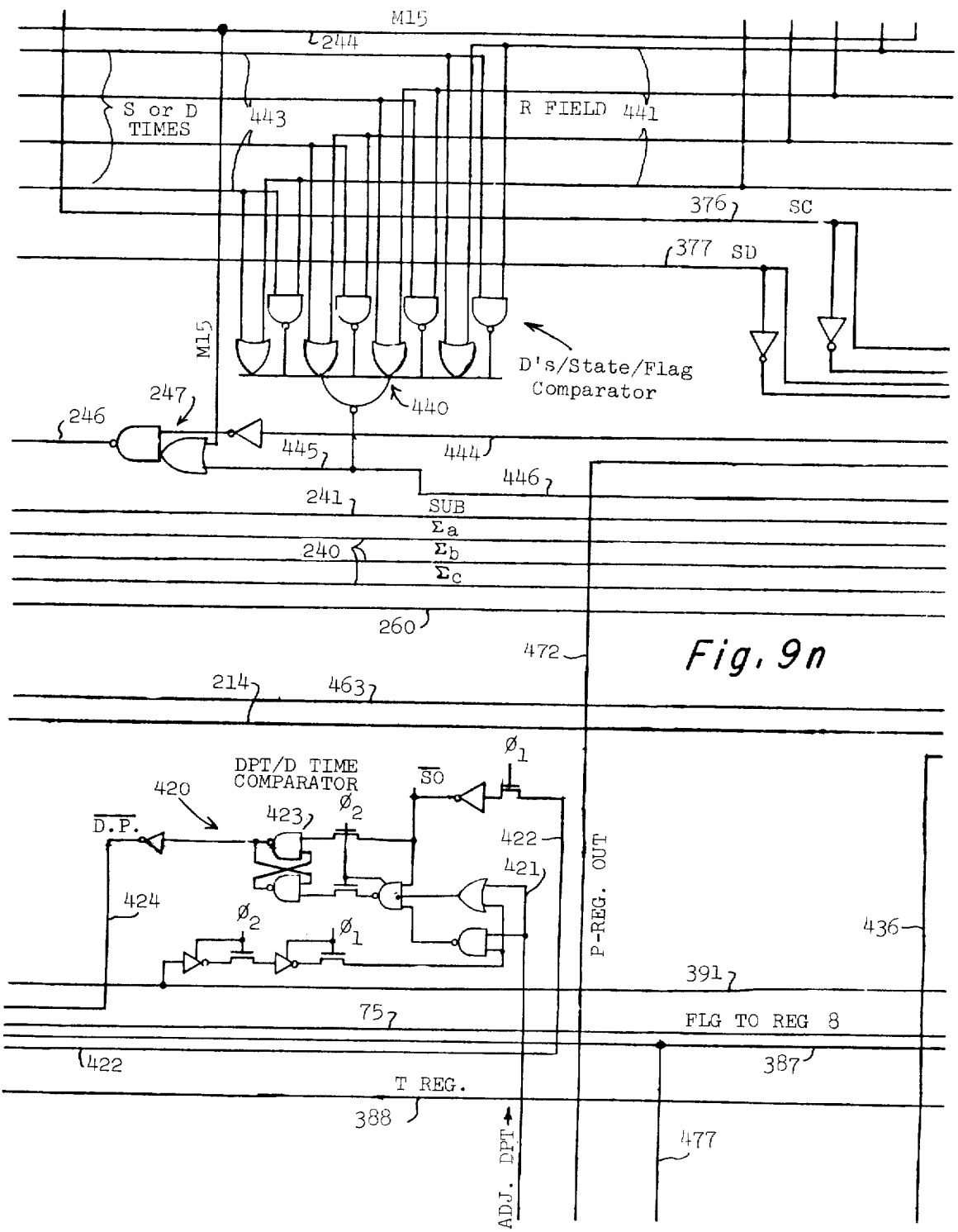
Figure 9Q:
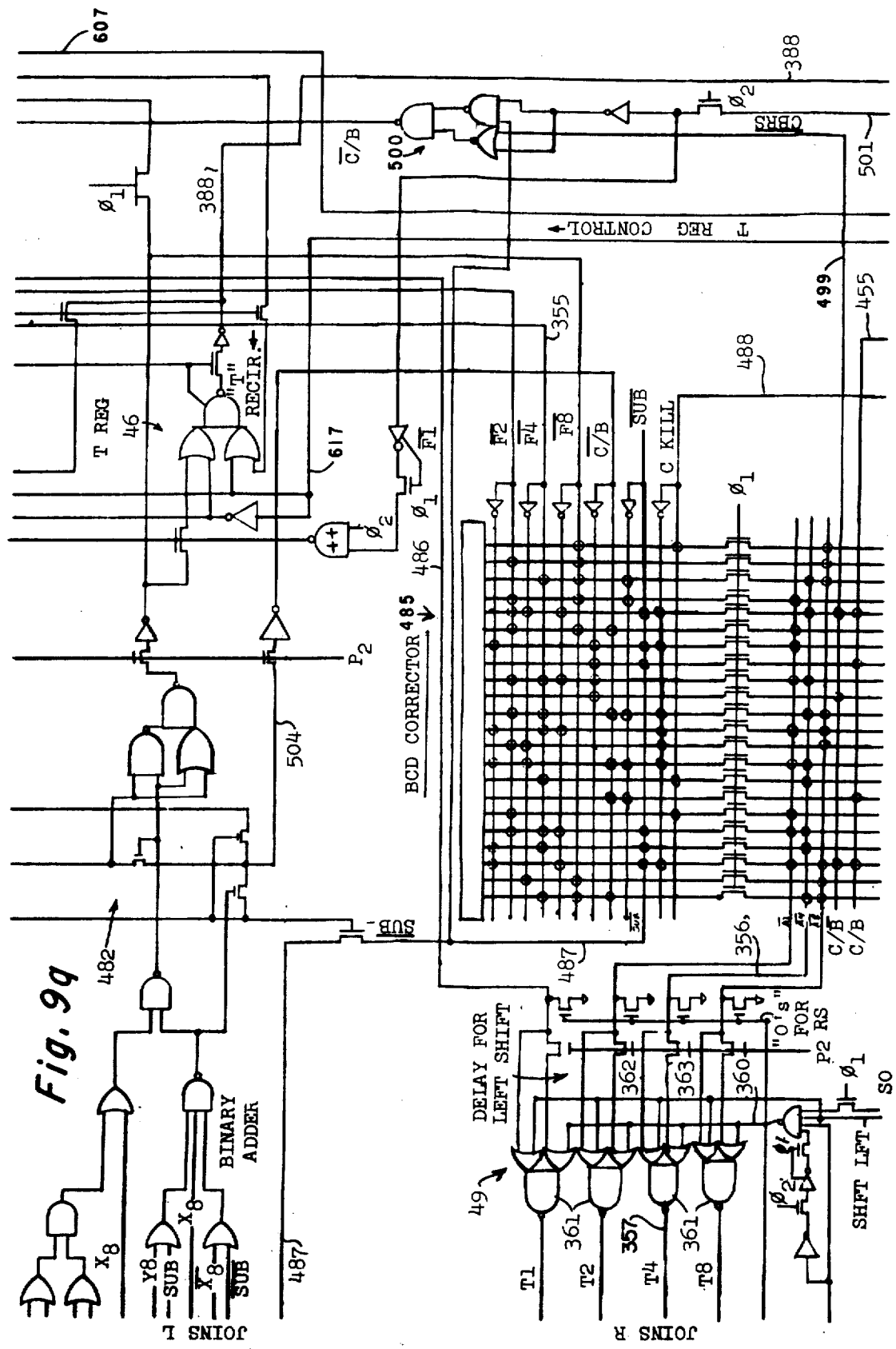
Figure 9R:
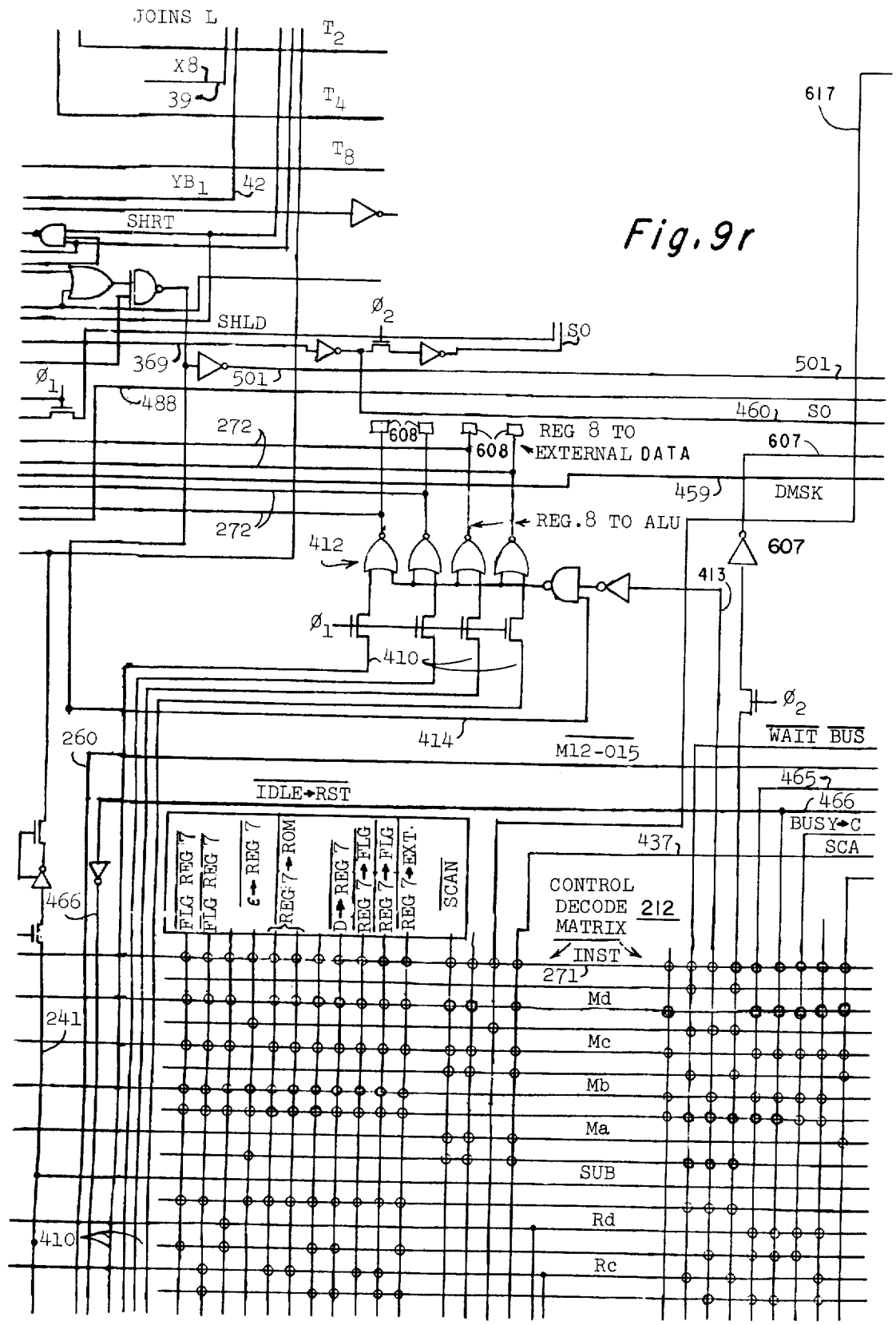
Figure 9S:
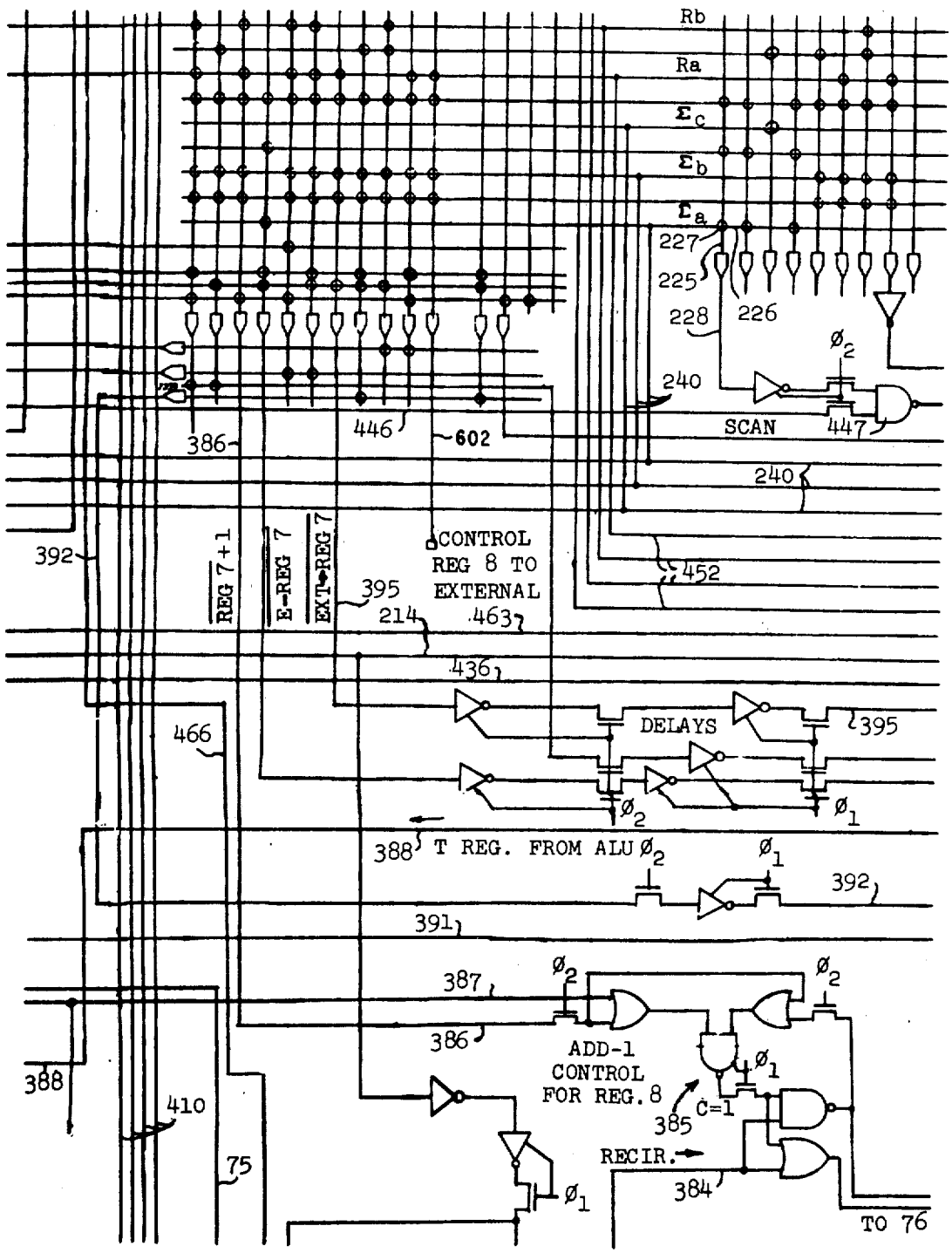
Figure 91:
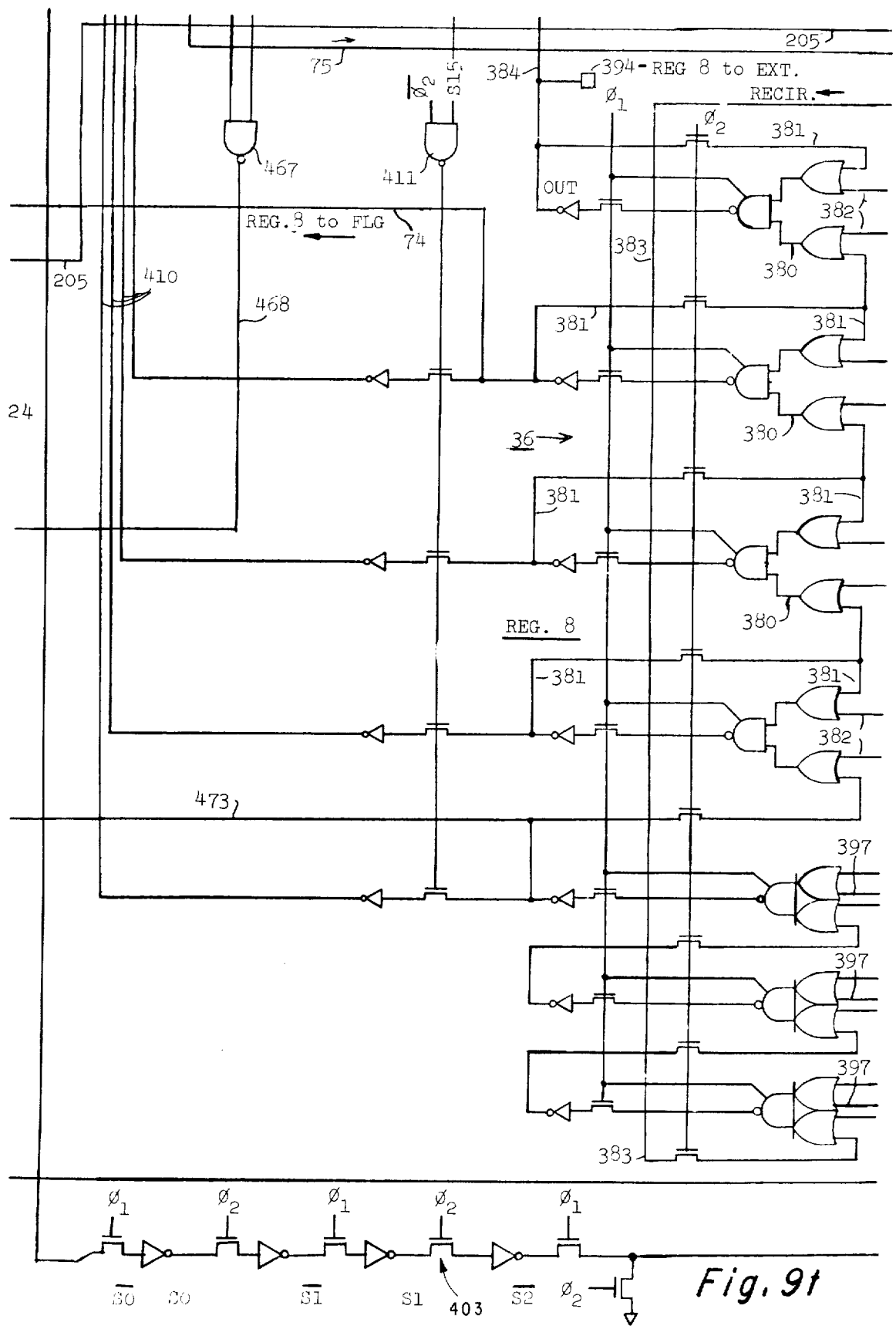
Figure 9U:
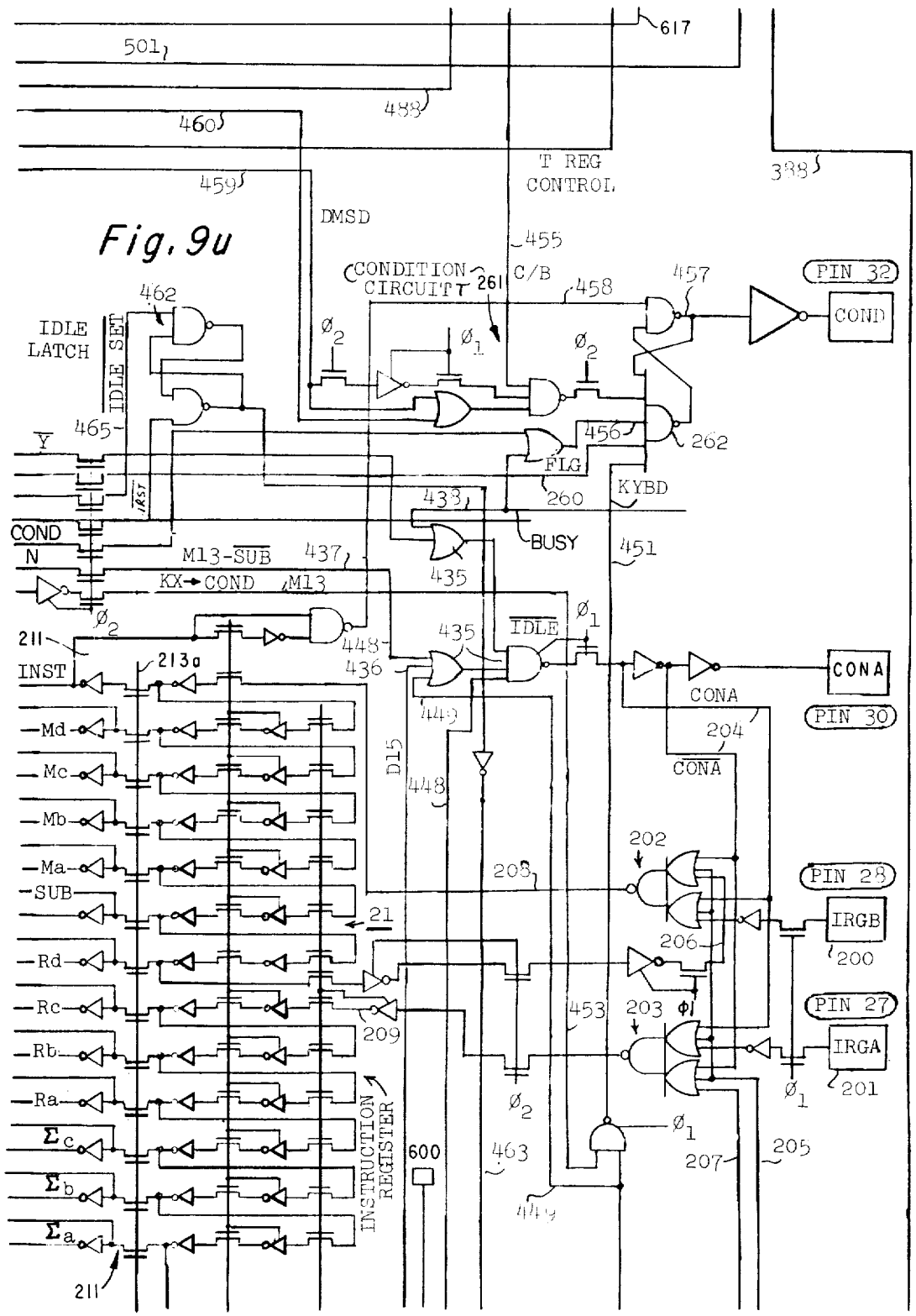

Referring to FIG. 9u, the instruction register 21 is seen to include a pair of inputs 200 and 201, also labeled PIN 27 and PIN 28, which receive the instruction word serially in two parts from the ROM chip. The instruction word of thirteen bits is broken up into seven bits coming in on the input 200 and six bits coming in on the line 201; this is merely to save time in transferring the words serially, and has no other significance in the logic of operation of the system. The instruction word is fed from the inputs 200 and 201 through two selection gates 202 and 203, which are controlled by several inputs. One pair of inputs 204, called CONA and $\overline{CONA}$, mean that an "inhibit increment" command is or is not present. When present, a new word is not accepted, but instead the one in the register 21 is recirculated. Another input 205, when present, causes the instruction word to be blocked from reaching the instruction register so that all zeros will be produced in the register; this is when a P Reg or program register instruction is sent to the ROM chip. The input on line 205 is obtained from a P register output, FIG. 9o, to be described below. Other inputs 206 and 207 are for recirculation from the instruction register 21, so the instruction word in the register will continue to recirculate when other conditions are met. The outputs of the gates 202 and 203 are fed by lines 208 and 209 serially into inputs of a thirteen stage recirculating shift register which is actually broken up into two separate registers of seven and six bits. The register is of conventional form, employing two inverters and $\phi_1$-$\phi_2$ switches in each stage. A fourteenth stage 210 is added at the end to introduce a delay so both parts of the register will be operating in synchronization. The thirteen outputs 211 of the instruction register 21 are labeled, as described elsewhere: Inst., M field, Sub, R field and sigma field. The complements of these 13 items are also included, so a total of 26 lines go into a control matrix 212, FIGS. 9r and 9s. The instruction word is being read in or is recirculating serially in two parts, so it is only at a particular time that the word in the register will have any meaning; thus, the contents of the register 21 are applied to the control matrix only when an output appears at a gate 213. One input to the gate 213 is a time signal $S_{14}$ or state time 14 on a line 214. The time $S_0$-$S_{13}$ is used for the register 21 to be filled in an instruction cycle. The state time $S_{15}$ is occupied by the delay in decoding in the matrix 212. A new instruction word is thus presented for operation at the end of an instruction cycle, i.e., one instruction cycle is used to load a new word, then the operation commanded by that word can be carried out while another word is being loaded.

Decoding the Instruction Word — The Matrices

The output of the instruction register goes to a control matrix 212 and also to a sigma and flag matrix 220, an R decode matrix 221, an M or mask decode matrix 222, as well as to other places as will appear. Each matrix is a programmable logic array of well known construction, described later with reference to FIG. 12. A vertical line such as a line 225 at the lower edge of the control matrix 212 represents a P diffusion, a horizontal line 226 (one of the sigma lines) represents a metal strip, and a circle 227 at an intersection represents a gate or thin oxide so that an MOS transistor is created. The other P diffusion line for drains is not shown. In some of the matrices of FIG. 9, the P diffusion lines are horizontal and the metallization lines are vertical, of course. As an example, the transistor 227 formed at the intersection of lines 225 and 226 is part of a NOR gate, with the other inputs for the vertical line 225 being at $sigma_b$, $sigma_c$, Ma, Mb, Mc, Md and Inst.; the presence of any of these changes the output on line 228, which incidentally is one of the inputs to the inhibit incrememt logic.

The R field of the instruction word is connected directly to inputs 230 of R decode matrix 221, FIG. 9m. That is, even though the Ra, Rb, Rc and Rd lines pass through the control matrix 212 at this point, the R field appears unaltered at the inputs 230. In addition, the Ra-Rd lines are inverted so that $\overline{Ra}$-$\overline{Rd}$ inputs 231 are also applied to the decode matrix 221. The four output lines 232 from the R decode matrix go to a set of 16 gates 233, FIG. 9k, l, m, which determine what main register output goes to the ALU. Thus, in order for the outputs 37 of A Register 30 to pass through the gates 233, a line 234 in the R decode output 233 must be on. This would be true for various combinations of presence and absence of the signals in the R field of the instruction word, depending on how the decode matrix 221 is programmed.

The sigma field lines 240 are applied from the output of instruction register 21 to inputs of sigma and flag matrix 220, FIG. 9c, along with subtact or Sub line 241, and their complements. This matrix 220 receives the outputs from the flag registers 34 and 35 which appear at inputs 242 and 243 to the matrix 220, and also these inputs are inverted as are other inputs to the matrix. Another input 244 to the flag matrix is from a line 244 on which the complement of $M_{15}$ appears. $M_{15}$ is decoded at a logic gate 245, FIG. 9m, which receives as inputs the mask or M field, Ma-Md, from the instruction register 21. $M_{15}$ is an indication that a flag operation is commanded, and is used in several places. Other inputs to the flag matrix include a flag mask indication on a line 246 which is generated at logic gates 247 as will be described. An input 74 to the flag matrix 220 is from an output of the recirculating special register 36 or Reg 8. Also, the lines 240, the Sub line 241, and the complement of $M_{15}$ on line 244 are all connected as inputs to gate 248, the output of which is an input 249 to the flag matrix.

The function of the sigma and flag matrix 220 includes decoding the sigma field from the instruction register 21, and also controlling recirculation of the flags in the flag registers 34 and 35. The decoded sigma outputs from the matrix 220 appear on groups of lines 255 and 256, FIG. 9b, after going through logic gates 257. One input 258 to these gates 257 is an output from the mask decoder 222, and functions as a digit mask to specify what part of the data word is operated on, i.e., mantissa or what.

The decoded sigma outputs 225 represent an instruction (or its complement) to transfer data between A and B registers or between C and D registers. The decoded sigma outputs 256 represent a recirculation command for A, B, C or D registers. The outputs 255 and 256 are connected to the sets of selector gates 56, 57, 58 and 59 on the lefthand side of the SAM, FIG. 9a, to control recirculation or exchange of data in the main registers. These outputs 255 and 256 are further connected to a sigma decode array 259 which is another programmable logic array (with saturated loads) that produces four outputs 260 to control further sets of selector gates 56, 57, 58 and 59 for the A, B, C and D registers on the righthand side of the SAM, FIGS. 9k, l, m; these selector gates control which one of the main registers receives the output 55 from the T register 46 in the ALU 24.

The sigma decode array 259 provides a dual hierarchy of decode. The sigma, SUB, and FMSK inputs are initially decoded by matrix 220 providing logic inputs 255 and 256 which actuate the left side selector gates controlling recirculation and data exchange, and then inputs 255/256 are themselves decoded for controlling the righthand selector gates and entry into the SAM registers of output data. Thus a dual level decode is provided maximizing the information transmitted on lines 255/256.

Other outputs from the flag matrix 220 include an output 260 which is inverted and connected back to a condition circuit 261, FIG. 9u, as one of the inputs to a gate 262 to indicate that two flags are the same. The condition circuit will be described later. Another output 263 goes to a gate at the chip output PIN 6, FIG. 9a, for comma indication and also to a set of gates 264 which control flag recirculate or exchange. An output 265 goes to the gates 264 and to selector gates for PIN 11 for flag A or FLGA output from the chip. The gates 264 also receive an output 261 from the matrix. The outputs of Flag A and Flag B registers, from the complements of lines 242 and 243 are connected through the flag matrix 220 and logic gates 266, FIG. 9h, to provide the connection 75 to the selector gate 76 for the eight bit register 36, FIG. 9v; this input provides the flag register input to the register 36 or Reg 8. One or the other of Flag A or Flag B registers is selected by the Sub line 241, since Sub and its complement are inputs to gates 266.

The mask decoder or M decode matrix 222, FIG. 9m, receives the M field and its complements from lines 270 at the output of the instruction register 21, and also the Inst. bit on line 271. If the Inst. bit is a zero, the instruction is a branch rather than an operation so no output commands are to be given by the mask decoder and to accomplish this circles are seen at every intersection for this input line 271 in the matrix 222. Mask outputs include a set of four lines 272 which provide a constant or N input to the ALU 24, or the input 43 to the Y bus of FIG. 3. Other outputs include the digit mask 258 going to the sigma selector gates 257 as mentioned above, and the other end of this output is also connected by a line 237 to a logic group 274 which controls in part right shift, left shift, carry/borrow, reset, as will be explained; this permits the part of the word to be right shifted to be controlled by a mask. Further inputs to the mask decoder 222 are outputs 275 and their complements, from a push-pull matrix 280, FIG. 9g; these comprise encoded state times, or $S_0$–$S_{15}$ encoded on four lines. Further, inputs to the mask decoder 222 from the push-pull matrix 280 include a decimal point or DPT indicator on line 276 which shows the line to be activated at $S_{15}$, meaning $S_0$ will be the programmed DPT time since the voltage on line 276 is gated into the matrix 222 on $\phi_2$ and lasts until the next $\phi_2$. Line 277 likewise defines the position of the exponent, here $S_0$ or actually $S_1$ time. Line 278 defines the mantissa as $S_2$ through $S_{14}$ by circles at address lines $S_1$–$S_{13}$.

The Sequentially Addressed Memory (SAM) and Push-Pull Matrices

The main A, B, C and D registers are contained within a random access memory arrangement 23 which is operated in a manner similar to a set of shift registers, as set forth in copending application Ser. No. 163,683. The SAM 23 includes an A register 30 which is comprised of four separate rows $A_1$, $A_2$, $A_4$ and $A_8$, in BCD format. Likewise, the B, C and D registers each comprise four rows $B_1$, $B_2$, etc.; these are interleaved to save space in interconnecting the registers on the chip. Each row includes sixteen cells 300 or one for each digit or character, with each cell being a conventional three transistor RAM cell. All the memory cells 300 in the SAM are exactly the same, and there are a total of 16 × 16 or 256 cells in the main A, B, C and D registers. The SAM also includes two flag registers 34 and 35, which are 16 bit rows, or 32 more cells, for a total of 288 cells in the SAM. Vertical lines in the SAM are address lines 301 of which there are seventeen, these bit lines being driven by a commutator 302, FIG. 9e, made up of a seventeen stage (or sixteen and one half stage) ring counter which circulates a zero in sync with state times. Indeed, the commutator 302 generates the state times $S_0$–$S_{15}$ for use throughout the system. Only one of the address lines 301 is energized at any one time, and the energized line shifts from right to left in the order $S_0$, $S_1$, $S_2$ ... $S_{15}$, $S_0$ one at a time, producing the signals seen in FIG. 5a. Each stage of the commutator comprises two inverters 303 and 304, and two switches 305 and 306 driven by $\phi_2$ and $\phi_1$. The outputs of the commutator stages are coupled through inverting gates 307 to the bit lines and to an OR gate line 308 in a push-pull matrix 310. A recirculate signal is coupled back to the beginning by line 308 when the zero propagating through the commutator passes $S_{14}$; thus, the $S_0$ line of both edges of the SAM will be energized at the same time.

On top and on bottom of the SAM 23 are located a pair of push-pull matrices 310 and 280 which function to generate a number of timing signals, as mentioned above. The combination of the SAM with the push-pull matrices is an important feature of the invention. Four lines 312 as outputs of the matrix 310 provide an encoded indication of the sixteen state times $S_0-S_{15}$ for conveying to the ROM chip through outputs, SA, SB, SC, SD at pins 1–4. Non-inverting buffers (or conversely a pair of serially connected inverters) are in series with these outputs, which are gated by the $\phi_1$ clock, as indicated in FIG. 9*kk* in conjunction with FIG. 9*k*. The lower push-pull matrix 280 includes seven outputs 275–278 to the mask decoder 222, as mentioned above, and also an output line 320 which generates an $S_{14}$ indication which is gates at $\phi_2$ and then used to generate an $S_{15}\phi_1$ time indication in a gate 321. $S_{15}\phi_1$ is used to indicate the beginning of an instruction cycle in generating digit or D times; this indication is used to open a set of gates 322 which are in series with a set of four lines 323 connected to the lower four output lines of the push-pull matrix 280 on which appears $S_0-S_{15}$, the sixteen state times encoded on four lines. These encoded state times are strobed at gates 324 by the output of a gate 325 which receives $\bar{\phi}_2$ and a strobe signal as inputs. The strobe signal on line 326 is obtained from an output 327 from a programmable strobe counter as will be described. A strobe signal appears on line 326 every fifteen state times; so the encoded S time number allowed through the gate 324 will count backwards. Two inverters are in series with each of the lines 323; the inverted output of three of the lines and twice inverted output of the fourth produces a $\overline{D}_1$ indication at a gate 328, the output 329 from this gate being used to initiate a set of display scans in a display scanner as will be described. Encoded digit timing is provided on the lines 330 which are the state times from lines 323 as allowed through by the strobe $\bar{\phi}_2$ gate 324 and $S_{15}\phi_1$ at gate 321. Encoded state times are available at this point on lines 331. The state and digit times are used in several places as will be described.

The lines 330 or D time output will never read zero. Fifteen D times as seen in FIG. 5*b* while the S time cycle through sixteen states. A strobe occurs every fifteenth S time. The lines 275 in matrix 280 are programmed to read out a number in binary which is one ahead of where the 0 is on so, when address lines; so, the $S_0$ line is actuated, the lines 323 are reading out a one instead of zero. This is seen in FIG. 5*c*, which is a table of when the gate 324 opens, when the gate 322 opens, and what appears on the lines 323, 319 and 330. No zero will be read out on lines 330; a zero will appear on lines 319 at $S_{15}\phi_2$ and will stay there until $S_{14}\phi_2$, but during this time $S_{15}\phi_1$ will not have occurred to open the gates 322, thus the zero will not reach lines 330.

Another output from the matrix 280 is a line 332 which provides an input $\overline{DBLK}$ or digit blank to the output NAND gates of the display scan. The timing signal $\overline{DBLK}$ on line 332 begins at $S_0$ and ends after $S_{14}$, for each instruction cycle. This functions to blank the display during $S_0$ and $S_{15}$, i.e., the display is activated only $S_1-S_{14}$. This is needed for some types of displays.

The operation of the SAM will now be described. When an energizing voltage or 0, a negative voltage, appears on the $S_0$ address line, all of the MOS transistors 340 (looking now at the $S_0$ cell for the B4 row in the B register) which act as the output switches for the memory cells 300 in the $S_0$ vertical column will be made conductive, so the gate storage capacitor of a cell will, if it is charged negative, cause the transistor 341 of the cell to be also conductive, and the output line 342 will be grounded. Thus, if an 0 is stored, a 1 will appear on output line 342; 1 is ground or $V_{SS}$, 0 is a negative voltage or $V_{DD}$. This output line 342 is inverted at 339 so the output line 40 will be in "false" rather than "true" logic; bits are stored in false or complementary logic. The output from the lefthand end of the line 342 goes into a one bit delay circuit 60. Each one bit delay includes two inverters and $\phi_1$, $\phi_2$ switches. Depending upon the settings of the sigma select gates 57, etc., this bit can be either recirculated, or passed through the ALU, left shifted, right shifted, etc. If the bit is to be merely recirculated, the gates 57 are set by the then present instruction word so it will pass through a complex gate 343, 344 to appear inverted on line 345, delayed by one and one half state times; that is, the bit leaves its storage capacitor on $\phi_1$ of a given state time, that state time proceeds through $\phi_1 - P_1 - \phi_2 - P_2$ as in FIG. 5*a* as the bit propagates through the delay 60; the $S_0$ address line becomes de-energized or goes to ground at the end of $\phi_2$, and $S_1$ goes negative on $\phi_1$ of the next state time as the commutator 302 switches to the next stage to the left. On $\phi_2$ of this next state time, gate 343 is enabled by $\phi_2$ which is one of its inputs, so the bit can proceed to line 345. Back at the cell, the transistor 346 is now conductive, and the bit will be re-entered into the same cell it came out of. All bits in all cells 300 of this first vertical column $S_0$ will be recirculated or refreshed during $S_0-S_1$ time, during every cycle, unless they are being transferred or operated on in the ALU, or shifted. If the bits in B register are being transferred to the A register, the gates 56 and 57 are activated by the decoded sigma field appearing on lines 255 and 256 in such manner that the bit on output line 342 will not go through gate 343 but instead will go by line 347 through gates 348 and 349 to A4 input line 350. As before, when line $S_1$ comes on in the next state time, the bit will go back into a memory cell, but this time it will go into cell 351 in A4. In this manner during one instruction cycle or digit time, all of the sixteen bits in the B register may be transferred one at a time into the A register. The bit may instead go through the ALU; if the B line of the output lines 232 from the R decode matrix 221 is on, the bit will go through a complex NOR/NAND/INVERT gate 352, 353 to Y4 bus 42. The gate 353 can also pass a bit on line 354 if a constant N is to be entered into the ALU from lines 272, as described elsewhere; in such case, the gate 352 would not pass the bit from B4. The bit on Y4, line 42 goes through the bit 4 path of the ALU 24 and the bit 4 path of the carry/borrow circuit, to appear on an output 355. Also, the bit could go into the T register 46. The output line 355 goes to the data output circuit, FIG. 9*pp* and into the $\overline{F4}$ input of a BCD corrector matrix, FIG. 9*q*, as will be described, from which it appears as an output 356 which goes into a left shift circuit 49. If neither right nor left shifted, it appears on T4 line 357 and then back through one of the sigma selector gates, the B4 gate 57 as controlled by decoded sigma lines 260, and through a right shift control gate 358 to reappear on line 345 and be re-entered into the same cell via the transistor 346, since $S_1$ line is now on. The time required for this path is again one and a half state times. The gates labeled 57 and 358 are actually part of a complex open-drain NOR/NAND/INVERT gate, rather than being separate.

The flag registers 34 and 35 operate in a manner similar to the A, B, C, D registers, except that the data in these register cannot go through the ALU. Output from flag register A on line 290, and output from flag register B on line 291 go into the flag matrix 220 via 242, 243 and inverted lines. Gates 292 to horizontal lines 293 provide a recirculation path to matrix outputs 263 and 265 as mentioned above. To swap or exchange a bit in Flag A with a bit in Flag Register B, lines have gates on the matrix output which are reversed, so exchange of flags is accomplished within the matrix, meaning that a proper combination of sigma, Sub and FMSK inputs will determine to the matrix whether bits are recirculated or exchanged. Other inputs to gates 264 are the out puts 295 and 296 which function to clear all A flags or clear all B flags when a certain combination of sigma and Sub fields exits, along with inverted $M_{15}$ on line 244.

All of the input and output lines for the SAM are precharged to $V_{DD}$ for each state time. All output lines such as line 342 are precharged at $P_2$ by switches 297, FIG. 9e. During $P_2$, all address lines are off, as seen from FIG. 5a. All input lines are precharged at $P_1$ by switches 298. Significant input information does not have to be present until $\phi_2$ of each state time, so precharging at $P_1$ does not interfere with the data. Precharging provides a DC power saving.

Left and Right Shift Circuits

The left shift circuit 49 functions to add a one state time or one bit delay to produce left shift. The control for left shift is a pair of lines 360 going to complex NOR/NAND/INVERT gates 361. When not energized for left shift, the path of the bit on line 356 is via line 362, on which it appears at $\phi_1$, and no delay occurs; but where energized for left shift, the path via line 362 is closed, and the bit is delayed until $P_2$ before reaching line 363 then is allowed to pass through the lower part of the complex gate 361 at the next state time. The bit will then follow the same path as before, i.e., T4 line 357, sigma select gate 57 and gate 358 to B4 input line 345; however, the $S_0$ and $S_1$ bit lines have by now both gone off, and $S_2$ is on, so the bit will be entered into memory cell 364, or the next one to the left.

Right shift occurs when a right shift command appears on a line 365, which goes to a right shift selector gate 366 which is a NOR part of a complex gate. The bit described above, read out from B4, at the beginning of $S_0$, goes through the path 342, 40, 352 and appears at the output of gate 353, from which it appears as an input 367 to gate 366. This gate is enabled. So, rather than being delayed one and a half state times, the bit appears immediately on B4 input line via gate 358; since $S_0$ is still on, rather than $S_1$, the bit cannot be re-entered into the same cell. Instead, the bit will be right shifted, and in this case, lost or discarded, because there are no cells to the right. If the bit had come out of one of the centrally located cells, it would go back into the one on its right during the same state time.

The shift commands are generated on a line 370 at the output of R decode matrix 221 when a predetermined combination of R inputs exists, in combination with the subtract command on line 371 which is derived via line 241 from the instruction register 21. Also, the digit mask on line 273 is an input to logic 274, and state 0 time from address line $S_0$ in the SAM, via line 369. The logic arrangement 274 produces the right shift enable on line 365 and the left shift commands on lines 360, and also disenables the subtract command at a gate 372 via a line 373. The subtract instruction from the instruction register cannot be used directly because it also determines left shift and right shift.

The Eight Bit Special Purpose Register

The special purpose register 36, FIGS. 9t, v, w, operates as a recirculating shift register. It is comprised of seven conventional shift register stages 380, and one bit is provided in the output of selection gating arrangement 76. The upper four of the stages 380 can recirculate internally via paths 381, as determined by SCAN and $\overline{SCAN}$ control inputs 382. The lower three stages 380, which are the first three stages of the register, cannot recirculate internally, but the entire register can recirculate. Data from selection logic 76 may be entered into the lower three stages, serially, via a line 383 when the entire register is recirculating via a path 384, and an add-1 command can be inserted at this path in the appropriate time slot by add-1 logic 385. The add-1 logic receives an input 386 from control matrix 212 upon the occurrence of the appropriate instruction word, and also receives a timing signal via line 387 derived from $S_{14}$ line 214. The input 386 from matrix 212 is also time related due to SC and SD inputs 376 and 277 which are applied to the matrix along with their complements. These are obtained from pull matrix 280; only SC and SD are needed since the time-related outputs of the control matrix 212 are all in quarters of a D time, i.e., four or eight S times.

Figure 9V:
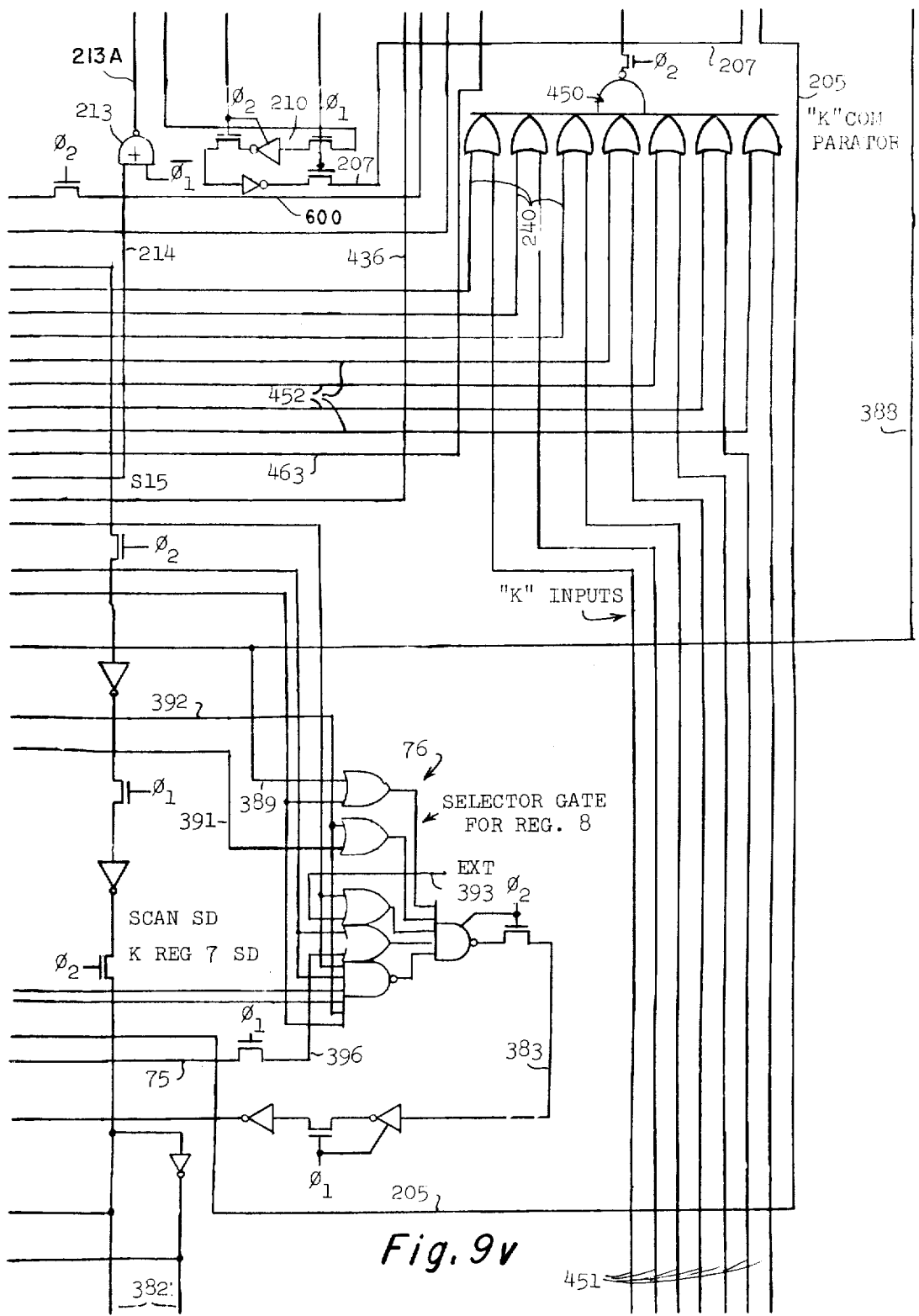
Figure 9W:
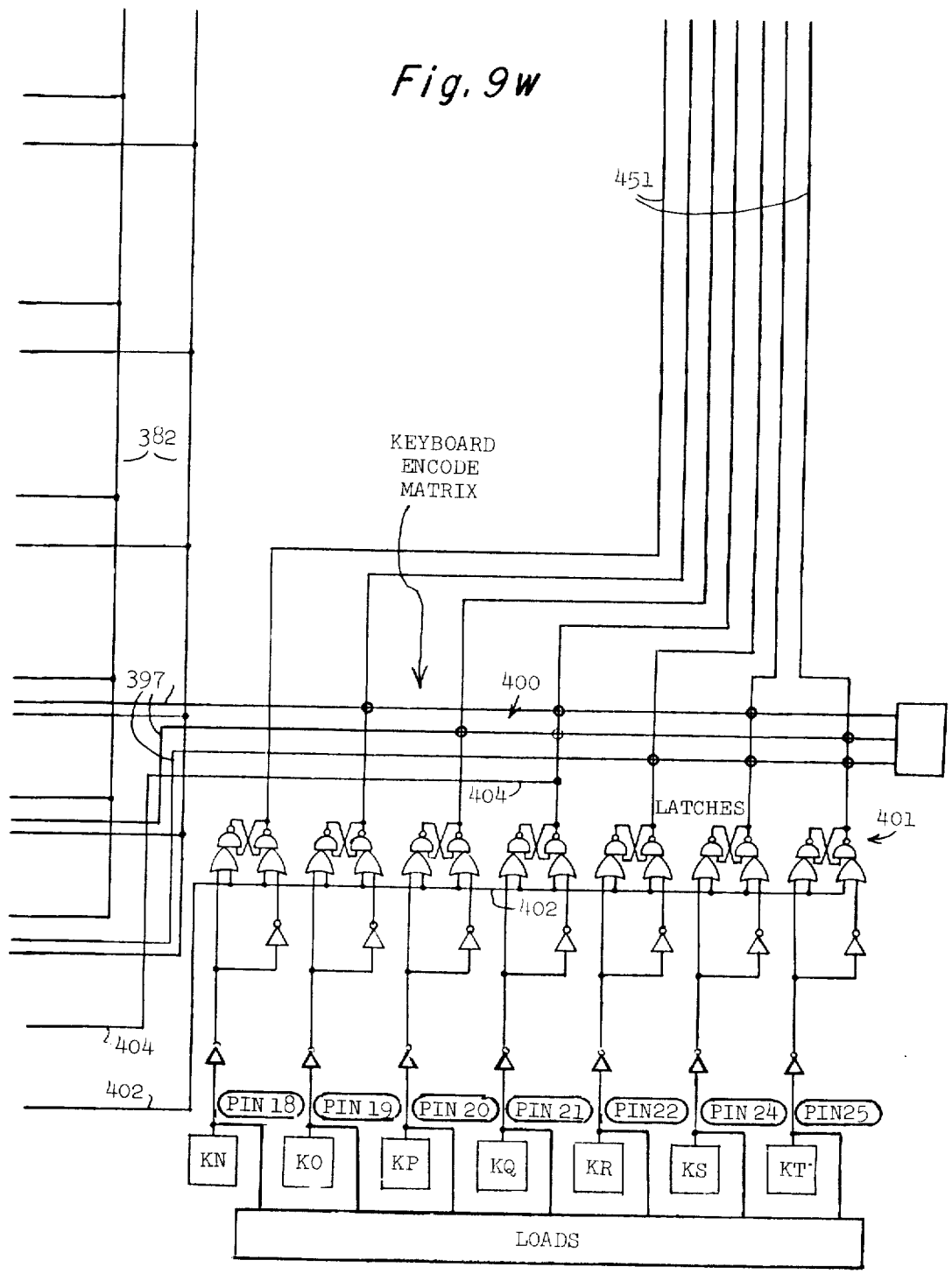
Figure 9K:
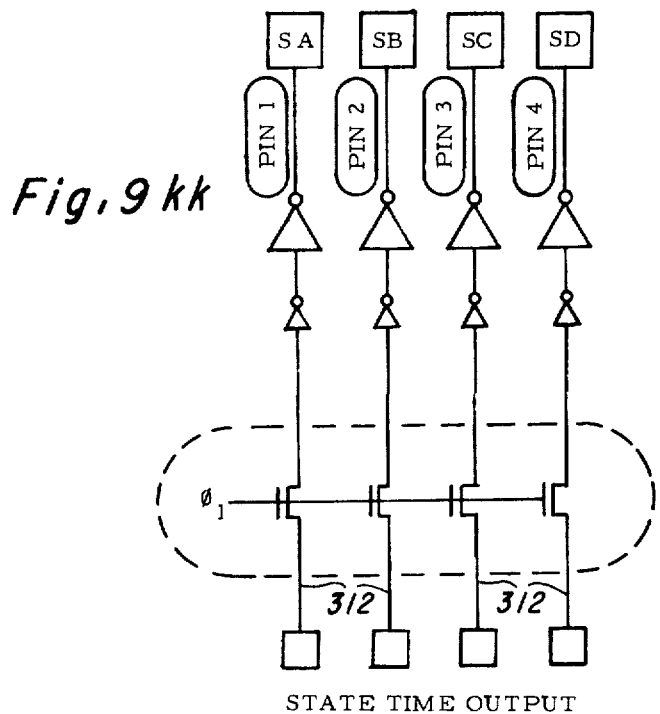
Figure 9U:
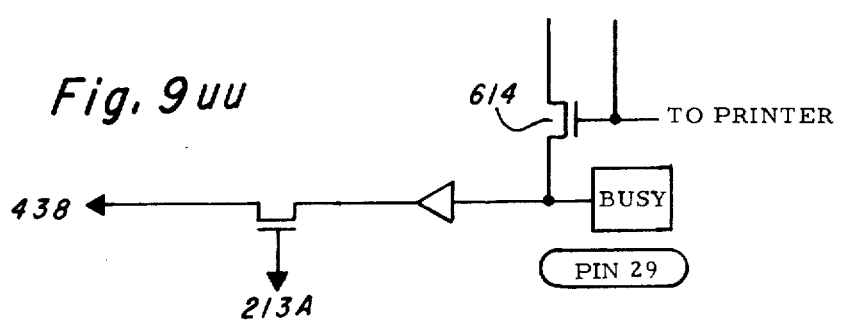

Other possible inputs to the register 36 include the T register output fro the ALU appearing serially on line 388 and going into the selection gates 76 via a line 389. Also, the serial output of D register or digit register 390 may be applied to the gate 76 via a line 391. The command for entering the D register into the eight bit register 36 is applied to selection gate 76 via a line 392 which is an output from the control matrix 212. This output 392 occurs upon a selected instruction word, and is time related due to the SC and SD inputs to the matrix. External inputs may also be entered into the register 36 via input line 393, and the register outputed serially via line 394. Line 393 is shown in FIGS. 9v-9vv$_1$ coupled to Pin 26, the EXT output terminal, earlier described, by a gate and inverter. FIG. 9vv$_1$ depicts a resistive coupling of the EXT line to $V_{DD}$ for the biasing thereof into a "normal" zero state condition. This allows zeros to selectively be entered into Reg 8 upon command for clearing Reg 8. The EXT input is controlled via line 395 from the control matrix 212. Output line 394, shown in FIGS. 9t and 9vv$_1$ is coupled via line 601 to the EXT output through logic arrangement 612 comprising a buffered NAND gate pin. Logic 612 is also responsive to commands from the matrix 212 in FIG. 9r at Reg 8 to EXTERNAL on line 602. The control for allowing exiting of the contents of Reg 8 through EXT is delayed one S time via the inverted $\phi_2\phi_1$ gate arrangement. Data from the flag registers is entered at an input 396 which is the same as line 76 of FIG. 3.

Keyboard K information is entered into the register 36 in parallel to the lower three bits or stages via lines 397 from a keyboard encode matrix 400. The seven parallel K or keyboard inputs to the chip are provided by Pin 18-Pin 25, which are applied to latch circuits 401 that function to hold a given key input for one D time or instruction cycle. The seven latch circuit outputs are encoded to three lines by the matrix 400, which is a programmed logic array. The keyboard is strobed, or the latches 401 set, by a timing signal on line 402 which is connected through a delay arrangement 403 to the timing line 387, as was derived from $K_4$ at line 214. In this manner, once every instruction cycle the K lines will be looked at and whatever they read will be entered into the latches 401 and a three line encoding of this is available on lines 397 to be entered into the lower three bits of special register 36. A direct output from the keyboard KQ input latch 01 via line 404 provides hardware clear; the "clear 1" key is thus connected by this path to bypass everything so if the machine is stuck in a program loop and cannot scan the keyboard then the unconditional clear operation will still work. The line 404 along with $D_{15}$ time on line 405 provide this function as inputs to a gate 406 in the P or program register output circuit as will be described.

When encoded keyboard data is coming into the lower three bits of register 36 in parallel via lines 397, the upper four bits recirculate upon themselves via 381 under control of commands on lines 382 from the control matrix. The four bits in the upper stages would often be BCD times from line 391, so a seven bit word provided in the register which defines the keyboard input by D's and K's.

Four bits may be conveyed in parallel from the register 36 to the Y bus off the ALU 24 via lines 410, at $_{15}\phi_2$ under control of gate 411, the lines 410 go into selector gates 412 which are controlled by an output 413 from the control matrix 212 and another command on line 414 from the left-right shift logic 274. The other output from register 36 is the line 74 going to flag logic 220 and thus to the flag registers.

The register 36 is used mainly for interfacing with the keyboard, but it also may be loaded from the flag registers, from the ALU, or from the digit time register, and may be incremented by one. The contents of the register may be sent to the flag registers or the Y input of the ALU.

The Digit Register and Decimal Point Logic

The D register 390, FIG. 9i, receives the fifteen encoded D times or digit times in parallel on input lines 330 encoded in binary, and a delayed $S_{14}$ time on input line 415, to drive a four stage shift register 416, from which D times are read out serially in four bits, on the line 391. The recirculation in the four bit register is under control of $\phi_1$ and $\phi_2$; a complete readout occurs four times within an instruction cycle, once every four state times, then a new D time is entered by lines 330.

One use made of the serial D time output is in a decimal point comparator 420, which has the D time output line 391 as one of its inputs and an adjusted decimal point or DPT value on line 421 as another input, and functions to compare the four bit number appearing serially on one line to the four bit number appearing serially on the other. The remaining input to the DPT comparator is an $S_{15}$ time signal on a line 422. The comparator circuit includes a latch 423 which latches on when the DPT value and the D time is the same, and this produces an output via 424 which goes to Pin 5, DPT. This output is used by the display to energize a decimal point indicator at the selected digit.

The adjusted decimal point indication on line 421 going into the comparator 420 is generated in DPT adjustor circuit 430, which receives one input 431 from the push-pull matrix 280 and another input 388 from the T register. The line 431 has a recurring four bit number appearing serially on it, as programmed in the push-pull matrix; in the embodiment shown, this four bit number is a three, or 0011 in binary, and it is repeated four times every instruction cycle. The circles on address lines (intersections of line 432) $S_0$, $S_1$, $S_4$, $S_5$, $S_8$, $S_9$, $S_{12}$ and $S_{13}$ indicate that a one is produced on the line 432 at these S times, thus reading out "1-1-0-0-1-1-0-0 . . .". This part of the matrix is thus programmed to generate a constant binary number 0011, and this constant is added to a binary number received at line 388 from the T register 46. The T register output is also a four bit serial number, as derived in the ALU, and in this case would be the position of the decimal point. The number 3 is added because the first two places are used for exponent and DPT in the main registers, and the DPT indicator on line 424 should appear before the digit for which the DPT is reached in the MSD to LSD display scan or D scan. So, if the number in the T register says the DPT should appear in the fifth place, as to display 1234.56789, a constant 3 added to this makes the DPT indicator to appear at output 424 at $D_8$ rather than $D_5$.

State Time/Digit Time/Flag Comparators

A comparator 440, in FIG. 9n, receives as one set of inputs the R field on lines 441 from the instruction register; a flag operation occurs only when $M_{15}$ occurs and this is present on line 244 as one input to logic arrangement 442, the output of which also appears as input lines 443 to the comparator 440. The complex logic gates 442 receive state times from lines 331 as one set of inputs, and receives D times from lines 330 as the other set of inputs. The output 443 of logic 442 is encoded state times when $M_{15}$ is present, i.e., a flag operation is commanded, and is D times at all other time. The output 445 of comparator 440 will be a comparison of a particular flag from R field and a particular state time, and this goes into logic gate 247, the output 246 of which is the flag mask input to the flag matrix 220. The other input 444 to the gates 247 is an indication from control matrix 212 which means data from register 36 is being put into the flag registers. Flag indication $M_{15}$ from line 244 is also applied to gates 247. The output of the comparator 440 is also applied by a line 446 to gate 447 going to the "inhibit increment" logic.

Inhibit Increment and CONA

A connection from Pin 30, FIG. 9u, to the ROM chip functions to prevent or inhibit the program counter 25 from being incremented; this is referred to as CONA or inhibit increment. This command is generated by a complex gate 435 which receives one input via line 448 from gate 447 just mentioned above, another input 449 from a comparator 450 to be described below, and a third input via line 436 inverted from the $D_{15}$ line 405 in FIG. 9o. A fourth input via line 437 from the M field and Sub in the control matrix 212 indicates $M_{13}$ - $\overline{SUB}$. A busy signal from Pin 29 is input via line 438; this is used if a printer were attached, and indicates, for example, that the printer is still busy and the program counter should not be incremented until printing of previous data is completed. FIG. 9uu depicts the BUSY input terminal which is gated by line 213a at time $S_{14}$ on line 438.

The K comparator 450 specifies a particular keyboard input and produces outputs to inhibit increment and also to the condition circuit 261 which produces COND, Pin 32. Inputs to the comparator 450 include the three bit sigma field on lines 240, the seven K inputs on lines 451 from the keyboard matrix 400, and the four bit R field on lines 452 from the instruction register output. When the K field is the same as that specified by sigma and R fields, the comparator 450 output on line 451 appears as an input on the gate 262 in the condition circuit 261. When a signal on gate 614 is received from the printer, a 1 condition is impressed upon line 438 indicating the "busy" condition of the printer.

The Condition Circuit

The condition circuit 261, FIG. 9u, further receives a carry/borrow input on line 455 from the BCD decoder, as well as a busy condition indication on line 456 (not used in this embodiment). The flat input 260 means that two flags are the same. A "condition" or COND output is used for branch instructions; the output is through a latch 457 operated by an Inst. output from the instruction register 21 appearing through a NAND gate on line 458. Inverted digit mask is applied to the C/B part of the condition circuit via line 459, and $\overline{S_0}$ is applied via line 460.

Idle Latch

An idle latch circuit 462 produces an output on a line 463 which goes to Pin 11, FLGA output to the display and to gate 613 for controlling the CONB output. During a software loop which scans the keyboard for a key to be depressed, the A flags are displayed, thus the latch output to the flag display output. Also, this latch output goes to a latch 464, FIG. 9d, in the control for the display scan of FIG. 9j. During the idle loop, the A register is displayed, so idle latch enables the display. A "set idle latch" input 465 from the control matrix 212 sets the latch when specified by the program, and the latch is reset by an input 466 from the matrix. This "idle reset" command on line 466 is also applied to a NAND gate 467, FIG. 9t, which receives $S_{15}$ as its other input (from 214); the NAND output is applied via line 468 to a power up clear circuit 470, FIG. 9d. Input 613 to the gate 613 of the CONB circuit of FIG. 9vv$_2$ sets CONB so as to indicate the particular "idle" or "not idle" state of the calculator.

CONB

FIG. 9vv$_2$ depicts the CONB terminal at Pin 31 for indicating whether or not the calculator is in the "idle" condition. As above indicated, the idle latch output on line 463 is coupled to gated logic 613 as also is line 600 coupled from control matrix 212 under software control. The CONB signal is provided, therefore, by the idle latch output at pin 31 in response to an instruction word. The output is coupled to pin 31 from logic 613 by the $\phi_1$ gate, inverter and buffer arrangement.

Power Up Clear

The power up clear circuit 470 assures that the machine is initialized correctly. The program counter 25 is forced to zero. A "reset idle latch" at location 0 forces the machine out of location 0. The circuit 470, upon receiving the reset command on line 468 generates 0 on line 469 going to P Register output circuit 471, FIG. 9o. When power is turned on, all the register contents, values of flags, etc., are unknown and should be cleared or set to known values.

The Program Register Output Circuit

An output to the program register 25 in the ROM chip is provided at Pin 17. This output is controlled by circuit 471. When an address is to be sent to the ROM chip, a command is made to appear at output 472 from the control matrix 212. The address to be sent out is coupled from special register 36 via line 473 as an inverted input NAND gate 474. When an address is sent, it always is eight bits long and starts with 0; when the ROM chip sees a 0 at $S_4$, it knows that the data chip is sending an address. The next seven bits are the address. A lach 475 is provided to keep putting out zeros to the end of the instruction cycle. The latch is set by an input 476 from the command input, and reset by an input 477 from delayed $S_{14}$ line 387.

The Arithmetic Logic Unit

The ALU 24 comprises a binary adder made up of four sets of complex gates 480 and 481. The 480 sequence is a complex logic gate having SUB, $\overline{SUB}$, X, $Y_1$, $\overline{Y_1}$ inputs. The 481 sequence is NOR/NAND with the same five inputs. These function to add or subtract a binary number appearing on $X_1$ and $Y_1$ lines 39 and 42, and to produce a carry/borrow input to C/B circuit 482. The logic arrangement chosen was to provide fast operation, i.e., to allow the ALU operation to occur within one state time to simplify timing considerations. The $X_2$-$Y_2$, $X_4$-$Y_4$ and $X_8$-$Y_8$ parts of the ALU are the same as $X_1$-$Y_1$. The data into the ALU is BCD, yet it is operated on as if it were binary, so to convert back to BCD a corrector matrix 485 is used. The 1 output, F1 on line 486, need not be corrected so it bypasses the corrector. The F2, F4 and F8 and C/B lines go through the corrector 485 which is a programmable logic array. Other inputs are SUB on line 487, and CKILL or corrector kill on line 488 which prevents the corrector from operating on $S_0$ which is the decimal point location. So, DPT is carried to straight binary rather than BCD. CKILL on line 488 is generated in push-pull matrix 280, by a gate $S_0$. Outputs from the corrector 485 include 2, 4 and 8 inputs to the left shift selector 49, and C/B, C/$\overline{B}$ outputs on lines 455 and 499. The carry/borrow output goes to a C/B gate circuit 500 which keeps C/B from propagating over from prior bit. Inputs are SUB from line 487, and C/B reset on line 501 which is generated from a digit mask edge by shift control circuit 274. The output 502 from C/B gate circuit 500 is connected to a transistor 503 in the first bit of C/B circuit 482. The carry circuit operates as explained in copendng application Ser. No. 176,667 now abandoned, replaced by continuation U.S. patent application Ser. No. 441,917, entitled "Precharge Arithmetic Logic Unit", assigned to the assignee of this invention. C/B output is provided at 504, from which it is connected to corrector 485 for BCD correction.

ALU Output — TREG, DATA IN, DATA OUT

Figure 9P:
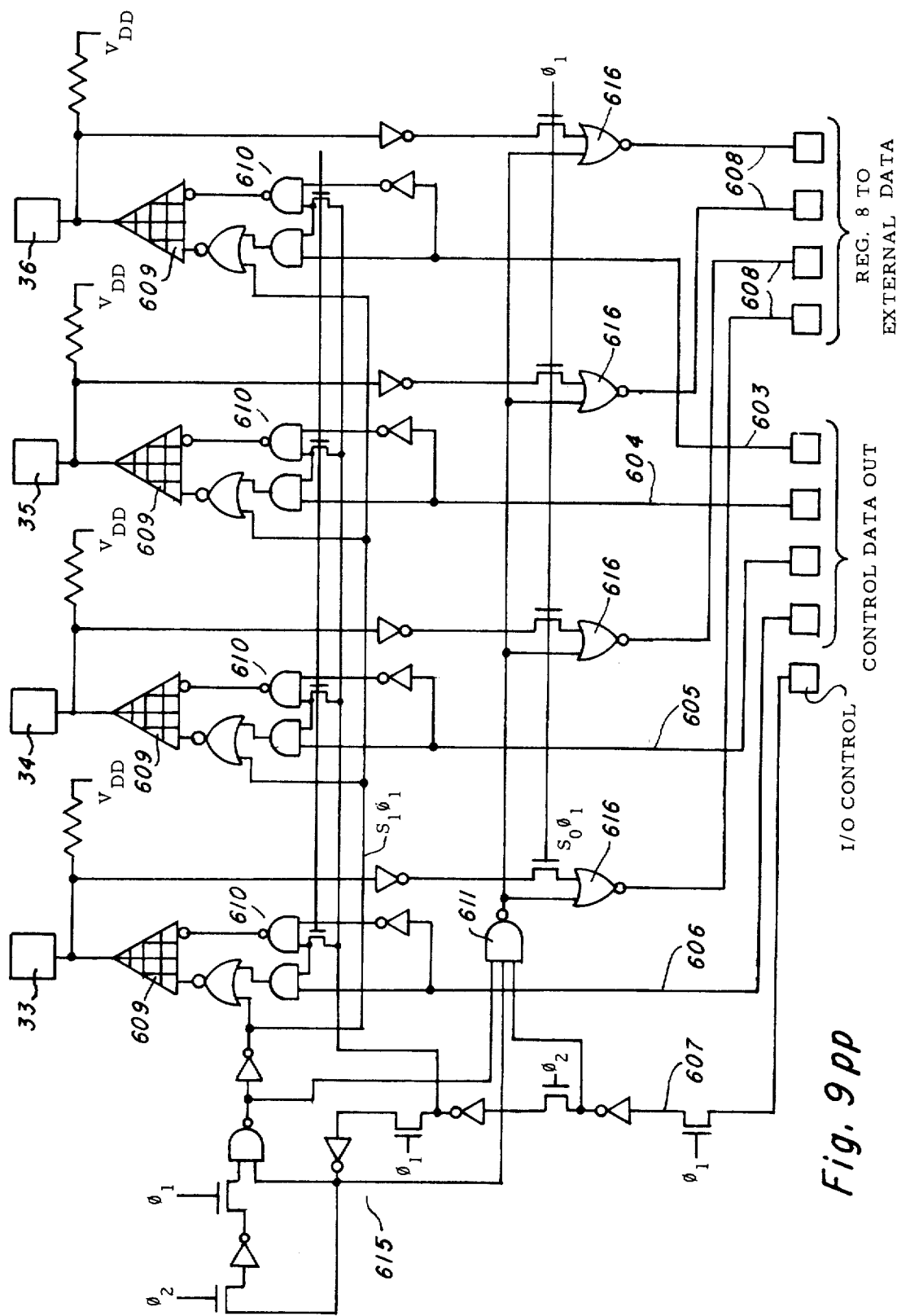

After the ALU has operated on the $X_1Y_1$, $X_2Y_2$, $X_4Y_4$ and $X_8Y_8$ data input, the output appears on lines 355 as earlier described, and are coupled, in addition to corrector 485, to data output circuitry, FIG. 9pp on lines 603–606. Line 607 is a control line from control matrix 212, FIG. 9r, for enabling the buffered logic arrangements 610 receiving outpus 603–607. Arrangement 615 provides delay to the control signal on line 607 so that data is outputed at $S_1\phi_1$ through Pins 33–36, notwithstanding line 607 being actuated at $S_0$.

Pins 33–36 are also utilized as input pins, as well as the output pins as above described. Logic gate 611 provides actuation from control line 607 at $S_0\phi_1$ into gates 616 which are coupled to pins 33–36 via a gate- /inverted series. The input data appears on lines 608 from logic gate 616 and are coupled to Reg 8 to EXTERNAL DATA connections, FIG. 9r, for entry into the ALU via lines 272. Entry into the ALU via lines 272 from Reg 8 has heretofore been described.

Referring again to the output of the ALU on lines 355, the output data is selectively entered into the T register 46 (T-REG) at the leading edge of a mask, in accordance with carry/borrow reset line 501 from shift control circuit 274. Matrix 212 also provides logic control via line 617 when data is being entered into TREG. Since the first three places of the data word is utilized for exponent and decimal point location information, data entered into TREG prior to the mantissa mark is indicative of decimal point location. This information recirculates in TREG and is communicated to the Decimal Point Adjust circuit 430 via line 388 to indicate location of the decimal point as earlier described.

Thus, data may be entered into the ALU externally from terminals 33–36, as well as from Reg 8 and the SAM data register. Also, the Reg 8/SAM output through the ALU may be externally communicated to other chips for control purposes through pins 33–36.

The Display Outputs and Zero Suppress

The contents of the A register 30 may be read out to Pins 7, 8, 9, 10, FIG. 9a, to a suitable display arrangement. The output lines of $A_1$, $A_2$, $A_4$ and $A_8$ appear on lines 510. These outputs are strobed into a zero suppress circuit 511 by a strobe line 512 which is energized once every fifteenth state time by a programmable strobe circuit as will be described, the same source as produced the strobe input 326 to D time generator gate 324. The time of occurrence of the strobe will thus count backwards, like $S_{15}$, $S_{14}$, $S_{13}$ . . . $S_1$, $S_0$; this provides zero suppress from MSD first. The $A_1$-$A_8$ bits strobed out are held and allowed into zero suppress upon $S_0\phi_1$ as determined by the output of gate 513 which is activated from a line 514 in the push-pull matrix 310, so all readouts will start at the same state time. The zero suppress arrangement comprises an eight input NAND gate 515 which received all of the $A_1$-$A_8$ inputs from lines 516 as four inputs as well as begin and end signals on lines 517 and 518 which are generated in matrix 310. Zero suppress is unconditionally ended by these signals so that the last digit will be displayed even if it is a zero; if the result is all zeros, the last one will be displayed. The lines 517, 518 can be programmed to begin and end at any desired points. The begin line goes through a gate 519 which operates as a latch with the gate 515. DPT indication on line 424 is also an input to gate 515. The first non-zero or decimal point reached sets the 515-519 latch, and the output of the latch is applied to four output NAND gates 520 via line 521, allowing everything that follows to pass through. The output NAND gates receive the $A_1$-$A_8$ data on lines 516, and also the line 463 idle set output as well as a blanking signal on line 522, derived from matrix 310, which controls which digits can be displayed, e.g., $S_1$-$S_{14}$. The outputs from gates 520 are applid through suitable non-inverting output buffers to Pin 7 to Pin 10 going to the display. Commas may be generated by an algorithm and stored in $B_2$, from which they are outputed at Pin 6, upon the occurrence of a proper instruction word.

The Strobe Circuit

A strobe generator circuit 530 of FIG. 9d produces a strobe signal on line 327 and on Pin 16 once every fifteen S times. Depending upon the type of display elements used in the calculator, and how often they should be strobed, the circuit 530 may be programmed to produced a strobe at longer intervals, such as every 31, or 63, or 127 S times. These are all one less than a multiple of sixteen so that the D times are counted backwards. The strobe circuit 530 comprises an eight stage recirculating shift register 531 of conventional form, along with a matrix 532 programmed in this case to count to fifteen along with an output matrix 533. The arrangement operates as a serial shifting counter that will count to (2N – 1); only four states are used so the embodiment shown counts to 15.

The Read Only Memory

Figure 10:
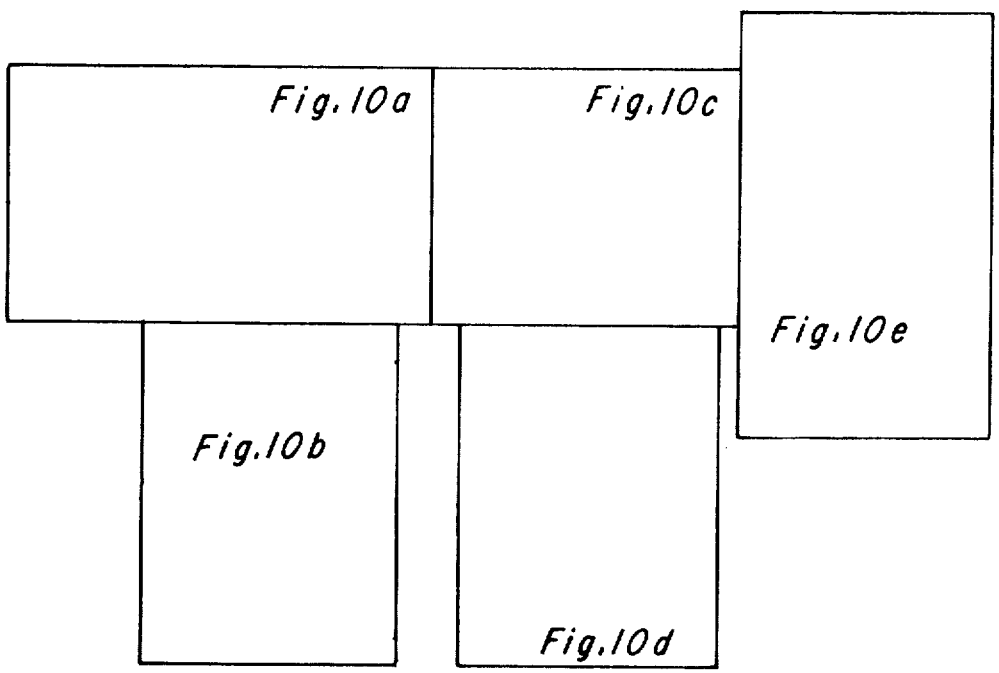
FIGS. 10a–10e are a composite schematic diagram of the circuit of the "ROM chip" part of the system of the invention.
Figure 10B:
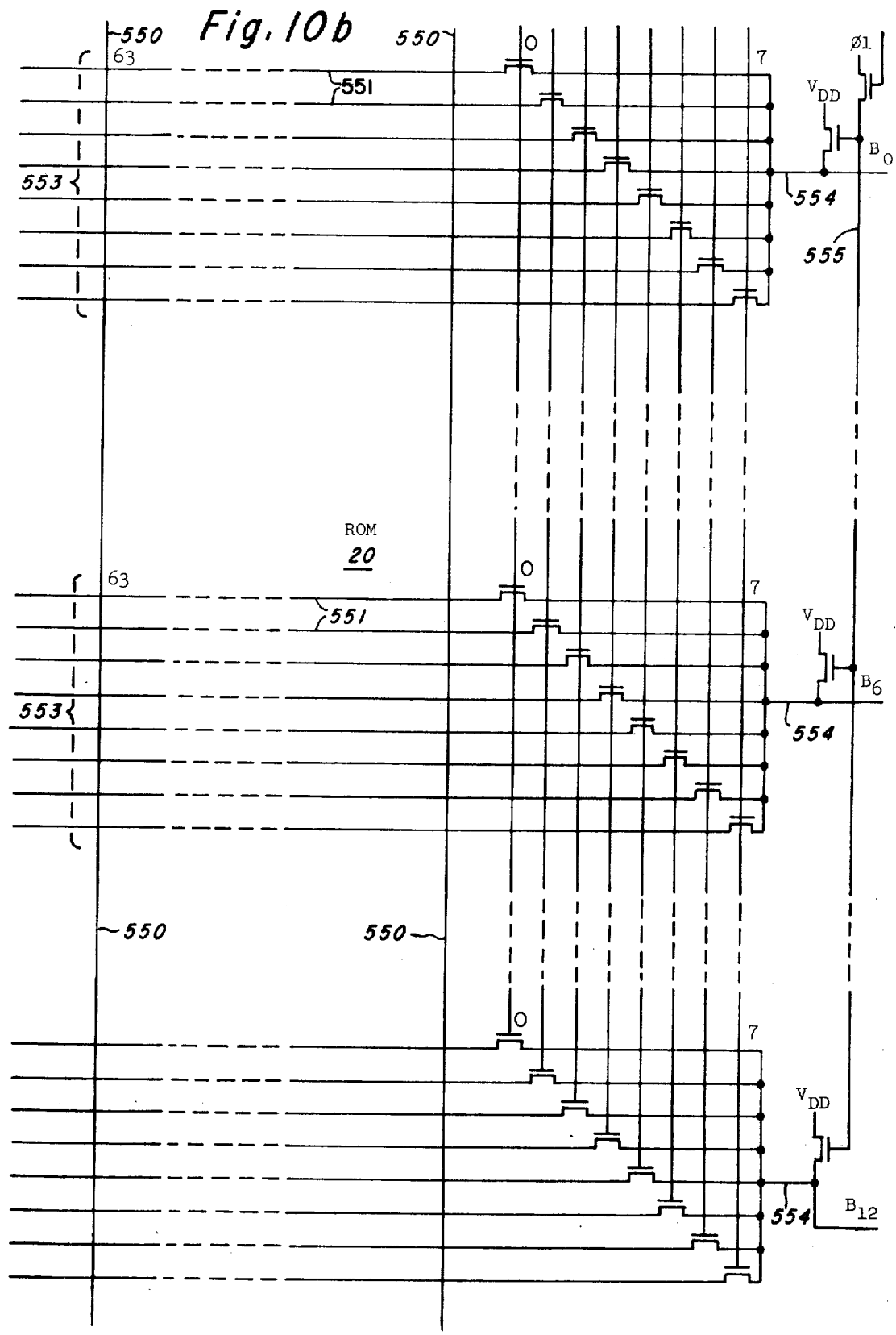
Figure 10C:
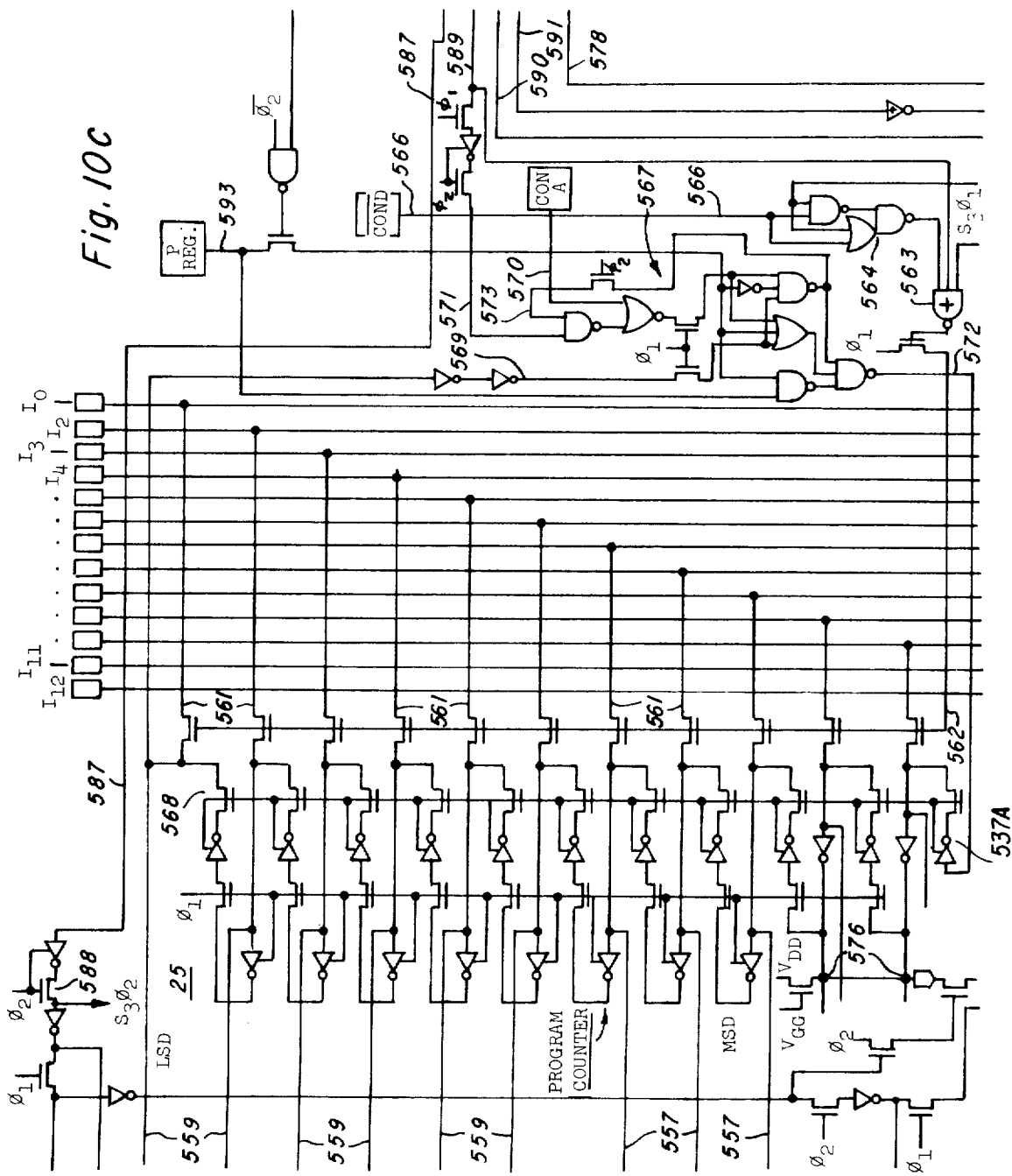
Figure 10D:
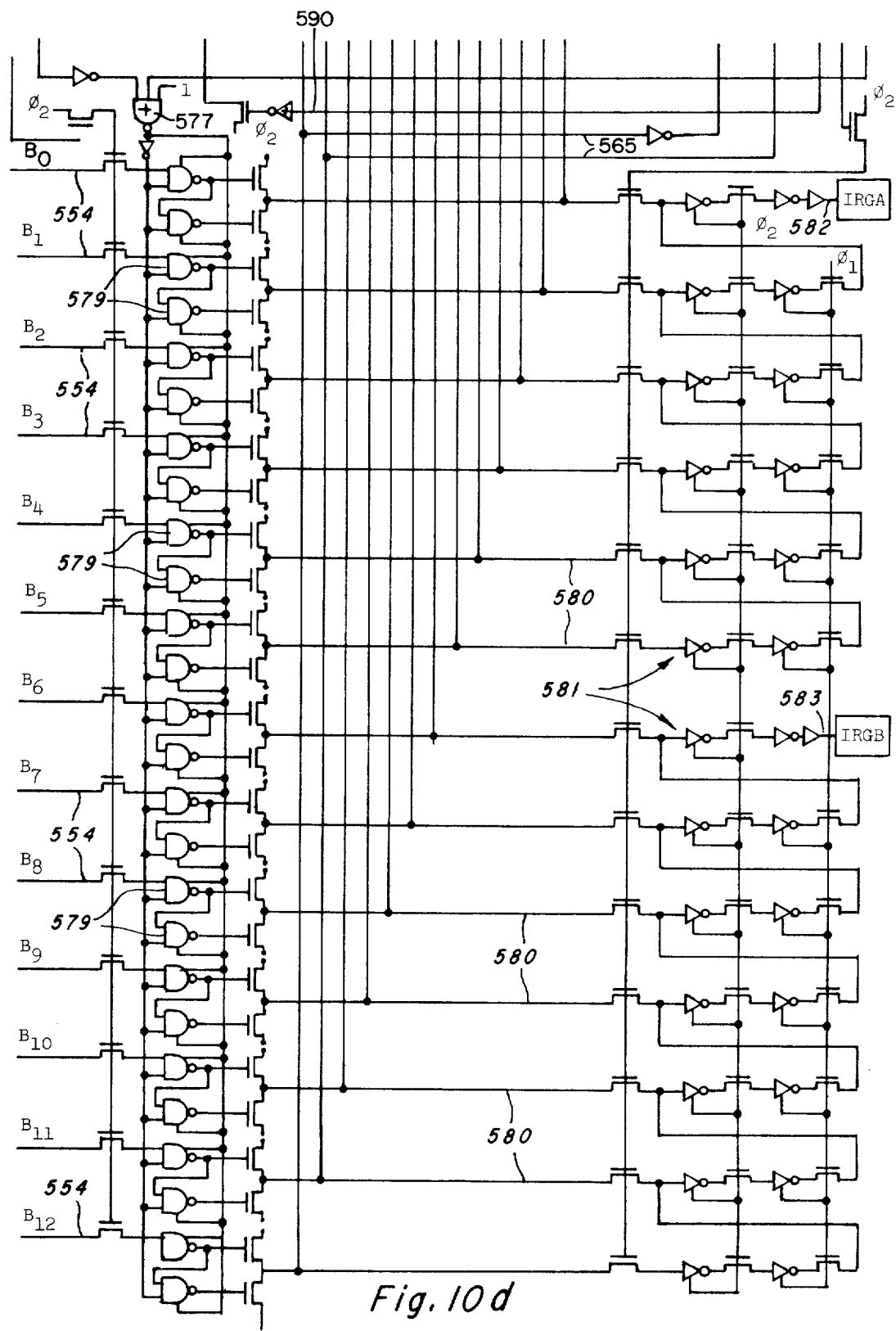

Turning now to the second chip, referred to as the ROM chip, FIG. 10, this device includes a ROM 20 made up of a 64 × 8 × 13 or 6656 bit read only memory for storing 512 thirteen bit instruction words. The ROM is programmed as set forth in U.S. Pat. No. 3,541,343, by thinning the oxide where a gate is needed. Sixty-four X address lines 550 are provided (only two are illustrated) and 104 Y lines 551. The X lines 550 are metal strips and the Y lines 551 are P diffusions. The X lines are precharged to $V_{DD}$ at $S_4\phi_1$ via line 552. The Y lines are arranged in groups 553 of eight to provide 13 outputs 554 (only three are shown); these output lines are precharged at $S_5\phi_1$ via line 555. Only one of the lines 551 in each group 553 is selected by means of Y address select arrangements 556, of which there are eight (only two are shown). These selector matrices are driven from three Y address lines 557. The matrices 556 change three line encoded to eight line unitary. Likewise, selector matrices 558 select only one of the sixty-four X lines 550 for energization, based on the encoded six bit X address appearing on lines 559. Gates 560 save DC power by gating the X and Y addresses on for only a state time, rather than being on all the time.

The Program Counter

The program counter 25 comprises an eleven stage shift register from which the six X address lines 559 and the three Y address lines 557 are outputed in parallel. The program counter operates by either being incremented by one for each instruction cycle, in which case it would cause the instruction words to be read out of the ROM 20 in numerical sequence, or secondly an instruction word can be forced into the counter from input lines 561, as for a branch. The lines 561 are connected into the program couner 25 and address lines 557, 559 via transistors gated by a line 562, which is controlled by gates 563 andd 564. These gates receive inputs 565 from bits $I_{11}$ and $I_{12}$ which are used for branch/operation, and condition. An address would be forced in via lines 561 only for branch indicated on $I_{12}$, and if it is a conditional branch this would be indicated on the $I_{11}$ line. The condition is met or not met as indicated on the COND input 566, which is received from COND output of the data chip. So, line 562 goes negative only if a branch is ordered and if conditional, when the condition is met. An add-1 operation is accomplished by a selector circuit 567, which receives the output of upper stage 568 in the program counter 25 via line 569, and CONA or inhibit increment on line 570. A time signal $S_3\phi_2$ is applied via line 571. The output 572 from this selector circuit is applied to the input of the lower stage 573a of the program counter. The program counter 25 recirculates through the Add-1 selector 567 least significant digit first, and at the time the LSD is going into the selector a one is added at a time controlled by the 8 input 571, if CONA or inhibit increment is not on. If a carry is generated, it is coupled back via line 573 to be added to the next bit. The system is designed to use more than one ROM chip if more than 512 words of stored instructions are needed, so the $I_9$ and $I_{10}$ lines are for chip select. These lines are applied to a logic array 576, the output of which is applied to a select gate 577. The other inputs to this gate are an $S_1$ to $S_7$ timing signal on line 578, and a 1 input which in expanded embodiment would be a CONB input.

Output from ROM

The output of gate 577 enables a set of output buffers 579 which are in series with the thirteen ROM output lines 554, also labeled $B_0$–$B_{12}$. The outputs of the buffers 579 are applied via lines 580 to a thirteen bit instruction register 581. This is a two part shift register which shifts the instruction word out via suitable buffers and two lines 582 and 583 going to IRGA and IRGB pins, and thus to the data chip inputs 200 and 201. If more than ROM chip is used, instruction words may be conveyed from one to the other, as for branching, via input/output pins $I_0$–$I_{12}$ (these are not used in the embodiment described).

Timing Decoder

State times are conveyed from the data chip to the ROM chip via inputs SA, SB, SC, SD, which are applied along with their complements to a timing decoder 585 to regenerate state times $S_0$–$S_{15}$. These are applied to a matrix 586 which generates several time signals. One output 587 provides $S_3$ to the gating generator 588 for input buffers 560 in the X and Y address inputs. An output 589 produces times inputs to the Add-1 selector and the gate 563. An $S_5$–$S_{15}$ is generated on a line 590 for producing an eleven bit timing signal for operating the eleven stage shift register of the program counter 25. An $S_7$ output 591 is used to gate the word on line 580 into the instruction register 581. $S_1$–$S_4$ on line 578 is an input to gate 577 as mentioned above. An $S_4$ signal is applied directly from timing decoder output 585 via line 592 to gate the P Reg input 593 into the selector circuit 567. The seven bit word in the special register 36 of the data chip may be read into the program register 25 via the selector circuit 567; when the P Reg signal is present, Add-1 is ineffective.

The Display Scan

Figure 10E:
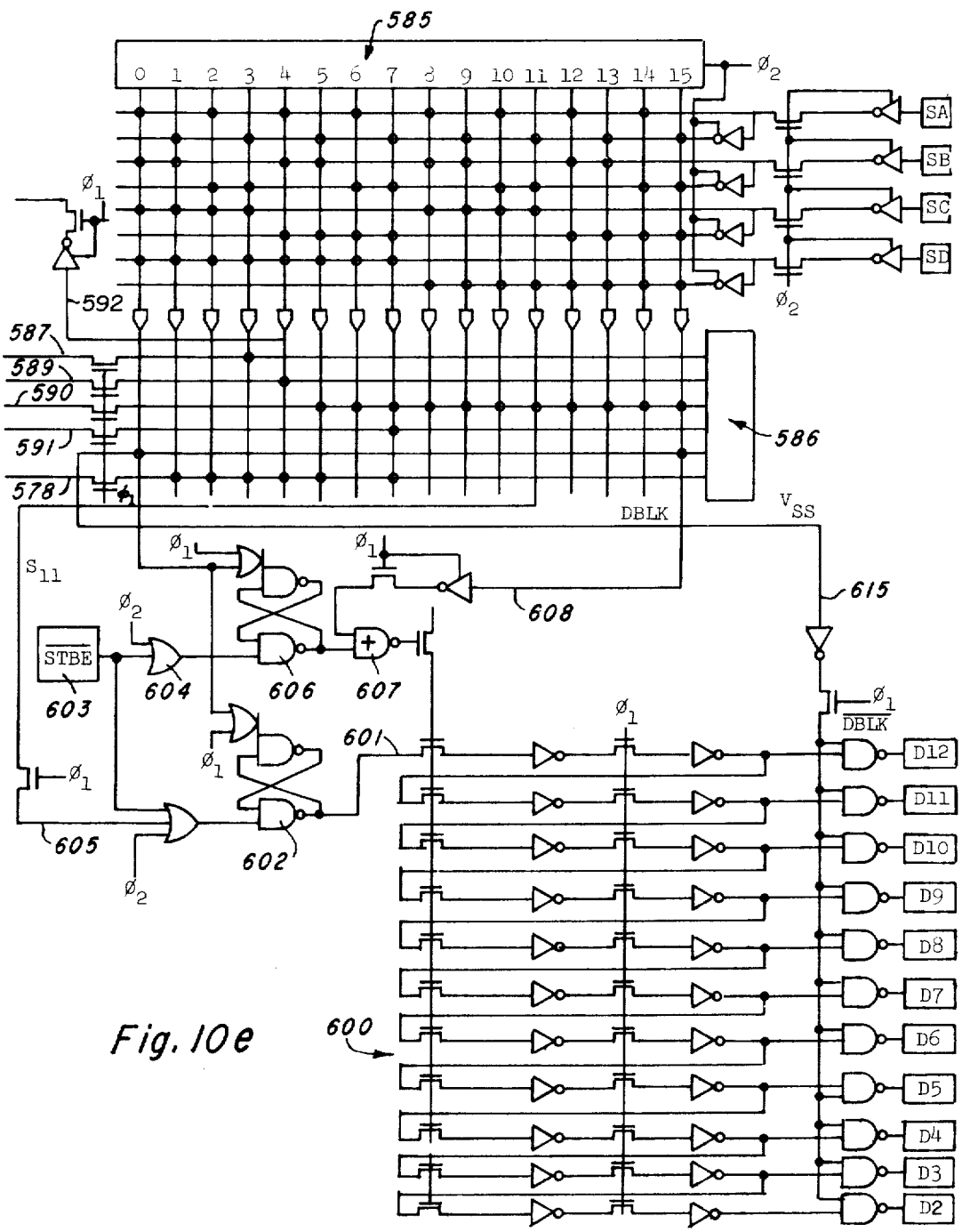

Merely for convenience in placement of pins for the integrated circuit packages, the embodiment of FIGS. 9 and 10 has the display scan split up into two sections, with $D_2$–$D_{12}$ on the ROM chip and $D_{13}$–$D_{15}$ and $D_1$ on the data chip. in FIG. 10e, the display scan outputs $D_{12}$–$D_2$ are generated in an eleven stage shift register 600 which receives an input 601 generated in a latch 602 operated by strobe input 603, $S_O$ input 604, and $S_{11}$ input 605. This latch operates with another latch 606 and gate 607 having an $S_{15}$ input 608, to select a specific D time, e.g., $D_{11}$, which is then shifted through the register to actuate $D_{12}$–$D_2$ in sequence.

The display scan on the data chip, FIGS. 9d and 9j, uses a four stage shift register 610 which is started by a $D_1$ signal on line 329. A latch 464 receives a delayed strobe input from 327 on line 611. $S_{15}$ is applied to a NAND gate 612 via line 613, and the latched strobe signal is the other input. The register 610 is started by $D_1$ and counts $D_{15}$, $D_{14}$, $D_{13}$, then at this point the display scan of FIG. 10e takes over.

In both FIGS. 9j and 10e, the outputs are blanked by lines 332 and 613 on $S_0$ and $S_{15}$, so that a gap will exist between D outputs; this is needed for some displays.

The Gate Circuits

Referring now to FIGS. 11a–11r, detailed views of the inverters, NAND and NOR gates, and complex gates used in FIGS. 9 and 10 are shown. FIGS. 11a and 11b are static and dynamic NAND gates, FIG. 11c is a "bootstrap" NAND gate, and FIG. 11d is an open drain, no load NAND, FIG. 11e is a unique bootstrap type gate which is the subject of another patent application. FIGS. 11f, g, h are static, dynamic and open drain NOR gates. FIGS. 11i, j, k, l are inverters of the static, dynamic, bootstrap and open drain types, respectively. FIGS. 11m–11r are complex gates using only one load.

The Programmable Logic Arrays

An example of a programmable logic array, like those used in the decode matrices of FIGS. 9 and 10, is shown in FIG. 12. A and B inputs are presented to the first half (decoder) of the PLA in both true and complemented polarities. In this example, four product terms, or decode outputs 620 are presented as inputs to a second (encoder) array. The circuits for the decoder gates and encoder gates are identical shunt gates; that is, NAND gates. However, since NAND-NAND logic reduces to AND-OR logic, it is convenient to use sum-of-product notation to describe the PLA circuit implementation where the dependence of a particular product term on a particular input is indicated by a circle at that junction. The circles also correspond physical placement of MOS gates by a programmable gate mask used in fabrication of the MOS embodiment. PLA's are known in the art and need not be detailed herein.

The Push-Pull Matrix

Figure 13A:
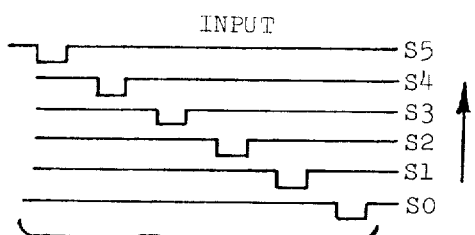
FIGS. 13a–13d depict input and output signals for a specific programmable logic array featured in the invention.
Figure 13B:
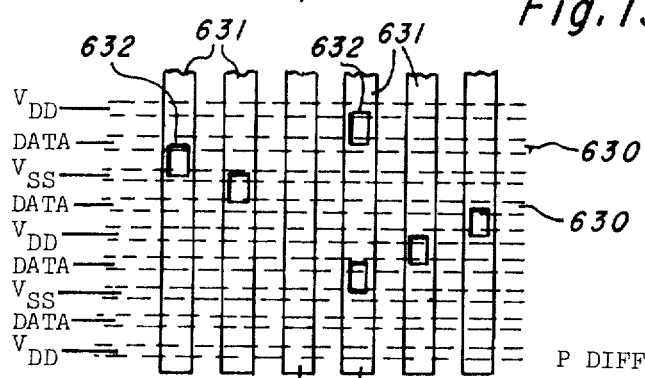
Figure 13C:
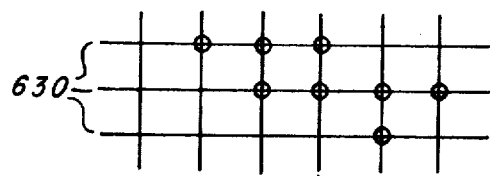
Figure 13D:
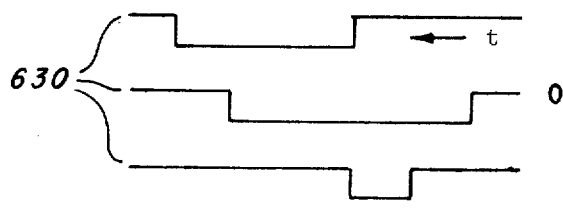

FIGS. 13a–13d depict operation of a push-pull matrix. FIG. 13b shows a push-pull matrix such as the matrix 280 or 310 in FIG. 9. This differs from a PLA in that it has no loads and uses no DC power. Output lines 630 for the PLA are P diffusions, represented by dashed lines. Input lines 631 are metallization, represented by solid lines. Gates are provided by thin oxide at locations 632, represented by rectangles. When input lines 631 go to 0 or minus voltage, as shown in FIG. 13a, being sequentially strobed to zero during $S_0$–$S_5$, and a gate 632 is present, the negative output line 630 goes to $V_{DD}$ as a channel will be created. This output line will stay at $V_{DD}$ until another gate appears between 630 and $V_{SS}$, when it will go to ground, as shown in FIG. 13d. It is assumed that the lines 631 are being driven one at a time to a 0 voltage, from right left, as shown in FIG. 13a, just as the matrix 280. The notation used in FIG. 9 for push-pull matrices is that whenever an output line 630 is to be at a logical 1, there is a circle; this is different from the physical embodiment. FIG. 13c shows the notation used for the embodiment of FIG. 13b, wherein the respective output lines 630 in FIG. 13d, also respectively symbolized in FIG. 13c, are shown going to a logical 1 at $S_2$–$S_4$, $S_0$–$S_3$, and during $S_1$, respectively from the upper output line 630 to the lower output line 630 in FIG. 13d.

The Program Stored in the ROM

Tables VI, VII, VIII and IX are hereby incorporated by reference from the copending parent case, Ser. No. 255,856, from which this application is a continuation.

Table VI is a listing of the instruction words stored in the ROM 20 for a standard revision of the calculator of the invention, to produce the operation functions according to the examples of Table V. The first three digit column in Table VI counts the ROM locations (program counter outputs in hexadecimal code from $000_{16}(0_{10})$ through $1FE_{16}(511_{10})$). The next eleven digit column reflects the binary code contents of the ROM at each of the locations of the first column; this is the word read into the instruction register including the $I_0$–$I_{12}$ fields, and is executed by the system. The third column beginning with 0005 is merely line numbers for the printout. The remaining columns give programming labels by which some routines are known, and instruction mnemonics, and comments relating to the operational meaning of the instructions, as appropriate.

Table VII is another listing of the program instruction words stored in the ROM, listed by ROM address. The words are in hexadecimal. Table VIII is a similar listing in binary instead of hexadecimal. Table IX is a layout of the ROM to produce the instruction words of Tables VI, VII and VIII, wherein each X is a gate in the MOS embodiment of the ROM.

Figure 14A:
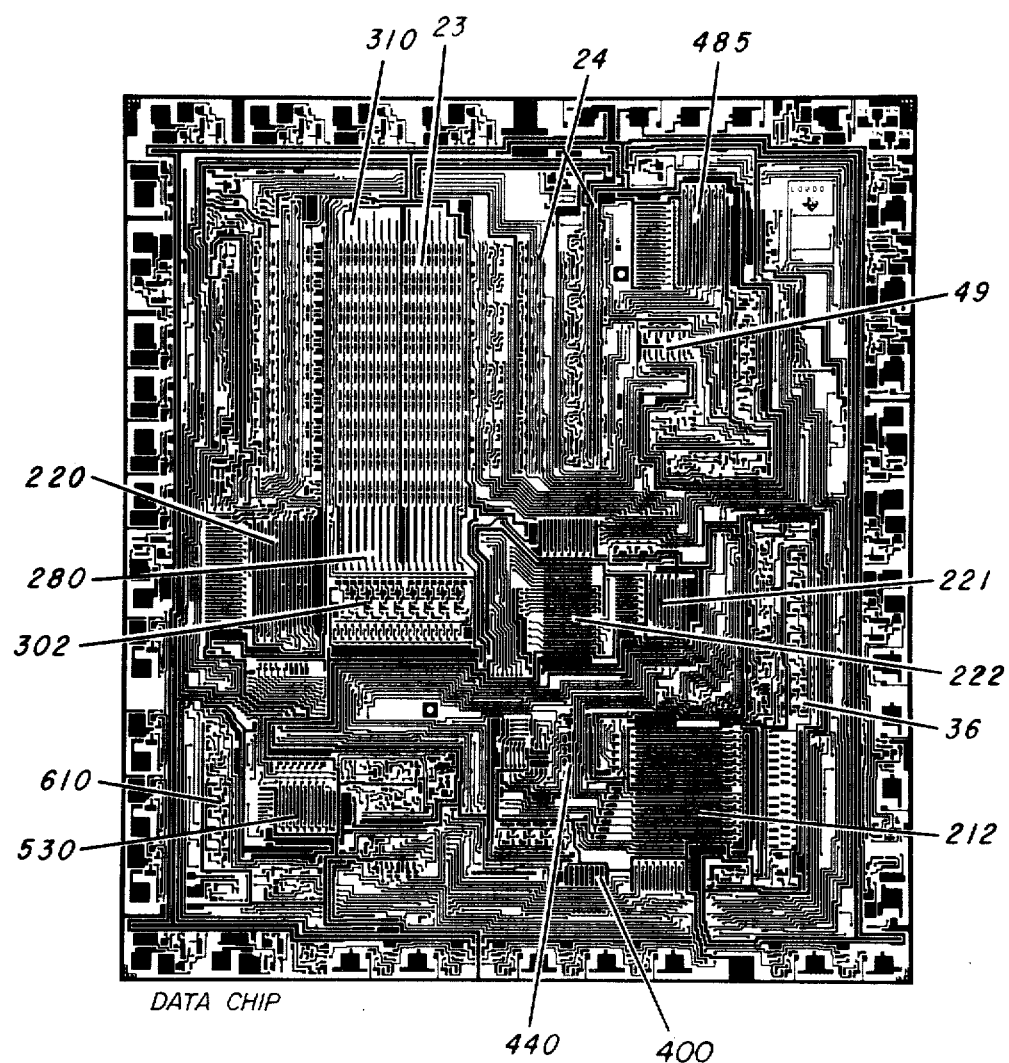
FIGS. 14a–14b depict expanded processing masks for the "data chip" and "ROM chip", respectively.
Figure 14B:
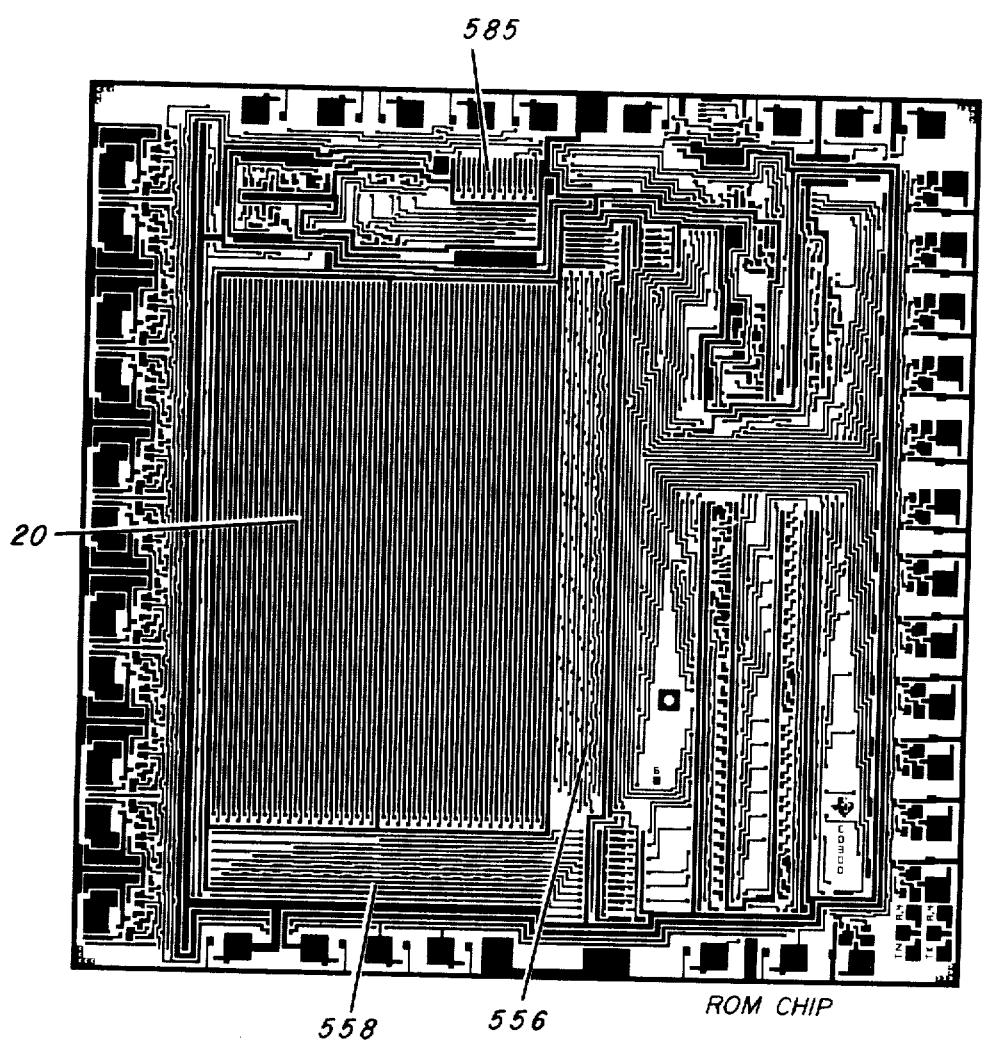

FIGS. 14a and 14b are top views of actual chip layouts for the data chip and ROM chip, respectively, as embodied in MOS/LSI. Various parts of the system, such as the main register 23, the ROM 20, and others, are labeled with the same reference numerals as in FIGS. 2, 3, 9 or 10.

Although the invention has been described with reference to a specific embodiment, various modifications of this embodiment as well as other embodiments of the invention will become apparent to persons skilled in the art. It is therefore contemplated that the appended claims will not be construed in a limiting sense and will cover any such modifications or embodiments as fall within the true scope of the invention.

What is claimed is:

1. An expandable electronic calculator system implemented on at least one semiconductor chip and having at least one auxiliary semiconductor chip, comprising:
   a. keyboard input means on the one chip for entering data and functions into the calculator system;
   b. addressable memory means including a plurality of data registers on the one chip for storing in parallel a plurality of multibit words of coded information;
   c. addressable storage means on the one chip for storing a plurality of program instructions to control the operation of the calculator system;
   d. parallel arithmetic logic means of the one chip connected to the data register for performing parallel arithmetic and logic operations on said multibit coded words;
   e. control means on the one chip for receiving the program instructions and generating control connections according to the program instructions, further connected to the parallel arithmetic logic means and to the data registers for causing selected portions of selected ones of the multibit coded words to be entered into the arithmetic means and for re-entering the output word from the parallel arithmetic logic means into a pedetermined one of the data registers;
   f. display output means on the one chip for displaying the results of calculations made by the calculator system;
   g. timing means on the one chip for producing timing signals for sequential addressing of the addressable memory means one bit at a time from least to most significant bit;
   h. means for generating scanning controls for the keyboard input means and the display output means on the one chip by employing the timing signals;
   i. auxiliary timing means on the auxiliary chip for producing timing signals thereon; and
   j. first expanded output means for providing a signal at a selected time to the auxiliary semiconductor chip indicative of whether the system is calculating or displaying, the signal also being used for synchonizing synchronizing timing of the auxiliary semiconductor chip.

2. The electronic calculator system of claim 1 wherein said addressable memory means include at least one flag register and said system further comprises a flag output means for communicating the stored information in said at least one flag register to the auxiliary semiconductor chip.

3. The electronic calculator according to claim 1 wherein the keyboard input means includes an interface register responsive to the scanning controls and operatively connected to the addressable memory means for communicating with said addressable memory means in timed relationship, and said system includes second expanded output means for externally inputting information into said interface register and for outputting external information from said interface register.

4. The calculator system according to claim 1 and further including busy input means responsive to receive information from said display output means for indicating that said display output means is unable to receive further input.

5. The calculator system according to claim 1 and further including expanded input means selectively controlled by said control means for receiving data information external to that contained in the plurality of data registers, said external data information being coupled into said parallel arithmetic logic means.

6. An electronic calculator system implemented in a plurality of semiconductor integrated circuit units, one unit having timing signal generating means for providing cycle timing and means responsive to the signal generating means for providing subcycle timing, memory means for storing numerical data, arithmetic means selectively coupled to the memory means for operating on the numerical data, and control means for causing selected internal operating conditions, the system comprising:
   a. keyboard input means operatively connected to the memory means for generating the numerical data;
   b. display means for selectively displaying the contents of the memory means, the display means being strobed by signals occurring at given cycle times;

c. means for generating on the one unit a signal indicative of the current internal operating condition of the one unit, the signal having a timed relationship with the subcycle timing; and d. means for coupling the indicative signal from the one unit to at least one other unit of the plurality of semiconductor integrated circuit units.

7. An electronic calculator system according to claim 6 wherein the keyboard input means is strobed in common with the display means and wherein encoded keyboard input signals are generated by the keyboard input means and stored in a keyboard register and means are provided for outputting the encoded keyboard signals from said register for transmitting to other units of the plurality of units.

8. An electronic calculator system according to claim 7 wherein one unit of the plurality of units includes a permanent store memory containing instruction codes for operating the system, and wherein the encoded keyboard input signals are transmitted to addressing means in such units for selecting instruction codes from the memory.

9. An electronic calculator system according to claim 8 wherein means are provided in said one unit to generate a second signal indicative of another internal operating condition of the system, and means are provided in the other unit of the plurality of units for activating the addressing means for selecting instruction codes in response to the second signal.

10. An electronic calculator system according to claim 8 wherein said means for outputting the encoded keyboard signals includes first means for serially communicating to the other unit the contents stored in said keyborad register representing an address and second means for communicating in parallel to the other unit the contents stored in said keyboard register representing data.

11. An electronic calculator system implemented on at least one semiconductor chip and having at least one auxiliary semiconductor chip having key switch input means for receiving data and instruction words, arithmetic means responsive to the instruction words for operating on the data, and timing means for generating cycle timing, comprising:
 a. scanning means on the one chip responsive to the cycle timing, and operatively connected to selectively scan the key switch input means;
 b. means on the one chip for generating a signal in a first state representing that a key switch scanning operation is being executed and in a second state representing that an arithmetic operation is being executed; and
 c. means for transmitting the signal to the auxiliary semiconductor chip.

12. An electronic calculator system implemented on at least one semiconductor chip and one auxiliary semiconductor chip comprising:
 a. instruction memory means on the one semiconductor chip for storing a plurality of instruction words and having addressing means for selecting instruction words;
 b. arithmetic means on the one semiconductor chip operatively connected to the instruction memory means, responsive to a selected instruction word and having input means and output means for providing an output in bit parallel-digit serial format;
 c. keyboard means coupled to the addressing means for selecting instruction words to control the arithmetic means, the keyboard means having an array of switches;
 d. timing means on the one semiconductor chip for generating cycle timing;
 e. scanning means responsive to the cycle timing and connected to selectively scan the array of switches so as to identify particular key actuation;
 f. data memory means on the auxiliary semiconductor chip for storing data words and having output means for providing selected output data words in bit parallel-digit serial format; and
 g. input/output means connected to the input and output means of the arithmetic means, operatively connected to the instruction memory means and responsive to the instruction words for selecting coupling data from the data memory means to the input means of the arithmetic means and for selectively transmitting data from the output means to the auxiliary semiconductor chip.

13. The electronic calculator system according to claim 12 wherein said keyboard means includes storage means for storing encoded keyboard input signal representations identifying particular keyboard means key actuation and said input/output means is coupled to said keyboard storage means through said arithmetic means for outputting to the auxiliary chip said encoded representations.

* * * * *